United States Patent

[11] 3,599,156

[72] Inventors Gerald K. Miller;
William D. Sauter, both of Fairfield County, Conn.

[21] Appl. No. 703,427
[22] Filed Feb. 6, 1968
[45] Patented Aug. 10, 1971
[73] Assignee Schlumberger Technology Corporation New York, N.Y.

[54] METHODS AND APPARATUS FOR TRANSMITTING DATA BETWEEN REMOTE LOCATIONS
31 Claims, 157 Drawing Figs.

[52] U.S. Cl. .......... 340/172.5
[51] Int. Cl. .......... G11b 5/00, G11b 15/00
[50] Field of Search .......... 340/172.5, 18, 15.5, 174.1, 174.1 A; 235/157, 61.11; 179/100.2

[56] References Cited

UNITED STATES PATENTS

| | | | |
|---|---|---|---|
| 3,365,705 | 1/1968 | Lux et al. | 340/172.5 |
| 3,333,247 | 7/1967 | Hadley et al. | 340/172.5 |
| 3,193,801 | 7/1965 | Grondin | 340/172.5 |
| 3,192,509 | 6/1965 | Durand et al. | 340/172.5 |
| 3,139,607 | 6/1964 | Grondin | 340/172.5 |
| 2,534,060 | 12/1950 | Roberts | 340/172.5 |
| 3,391,400 | 7/1968 | Chao | 340/174.1 |
| 3,454,930 | 7/1969 | Schoeneman | 340/174.1 |
| 3,474,429 | 10/1969 | McCowen et al. | 340/174.1 |
| 3,487,389 | 12/1969 | Gwillim et al. | 340/174.1 |

*Primary Examiner*—Gareth D. Shaw
*Attorneys*—Donald H. Fidler, Edward M. Roney, William R. Sherman, Stewart F. Moore, Terry M. Presson, Leonard R. Fellen and William J. Beard

ABSTRACT: In accordance with an illustrative embodiment of the invention, a system for transmitting data between remote locations is disclosed. The data transmission system is especially desirable for the transmission of well logging data derived from an exploring means moved through a borehole. More specifically, data is read from a magnetic tape at a transmitting location and supplied to a transmission link for transmission to a receiving location. At the receiving end of the transmission link, the data is received and subsequently written on a magnetic tape. The transmitting and receiving ends of the transmission link are synchronized with each other by a periodically transmitted sync word which can be inhibited to allow for the transmission of borehole depth words. Additionally, apparatus is provided for displaying data and recording it on photographic film during transmission. Provision is also made for playing back a tape for recording on film or display.

Gerald K. Miller
William D. Sauter
INVENTORS

BY Edward M. Roney
ATTORNEY

Gerald K. Miller
William D. Sauter
INVENTORS

BY Edward M. Roney
ATTORNEY

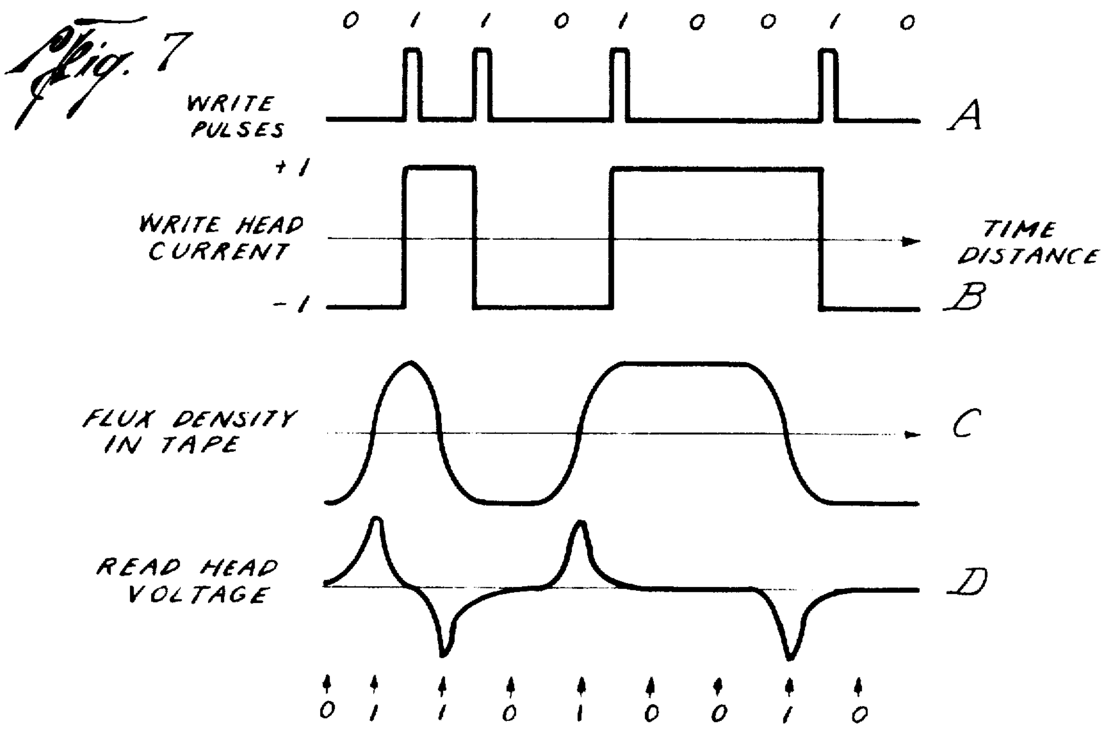

Fig. 7

| TRACK | CHARACTER 1 | CHARACTER 2 | CHARACTER 3 |
|---|---|---|---|
| 7 | PARITY | PARITY | PARITY |
| 6 | | | |
| 5 | | SIGN | |
| 4 | $2^{11}$ | $2^7$ | $2^3$ |
| 3 | $2^{10}$ | $2^6$ | $2^2$ |
| 2 | $2^9$ | $2^5$ | $2^1$ |
| 1 | $2^8$ | $2^4$ | $2^0$ |

Fig. 3A

TAPE FORMAT FOR DIGITIZED DATA WORDS

DEPTH WORD AND FILE NO. ONLY →

| TRACK | CHARACTER 1 | CHARACTER 2 | CHARACTER 3 |
|---|---|---|---|
| 7 | PARITY | PARITY | PARITY |
| 6 | R1 | R2 | R3 |
| 5 | | | |
| 4 | $2^3$ | $2^3$ | $2^3$ |
| 3 | $2^2$ | $2^2$ | $2^2$ |
| 2 | $2^1$ | $2^1$ | $2^1$ |
| 1 | $2^0$ | $2^0$ | $2^0$ |
| | 1000'S | 100'S | 10'S |

Fig. 3B

TAPE FORMAT FOR DEPTH WORD (WORD1) & ID DATA

| TRACK | CHARACTER 1 | CHARACTER 2 | CHARACTER 3 |
|---|---|---|---|
| 7 | PARITY | PARITY | PARITY |
| 6 | | | SYNC |
| 5 | | | SYNC. |
| 4 | | | |
| 3 | | | |
| 2 | | | |
| 1 | | | |

Fig. 3C

TAPE FORMAT FOR SYNC WORD (WORD 12)

TAPE WORD FORMAT (REG. & CDM LOGS)

Gerald K. Miller
William D. Sauter
INVENTORS

BY Edward M. Roney
ATTORNEY

PATENTED AUG 10 1971

3,599,156

SHEET 04 OF 22

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M Roney
ATTORNEY

ALL WORD, CDM MODES

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney

ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

SHIFT PULSE GENERATOR WAVE FORMS

Gerald K. Miller
William D. Sauter
INVENTORS

BY Edward M. Roney
ATTORNEY

TERMINATION OF TRANSMISSION

Gerald K. Miller
William D. Sauter
INVENTORS

BY Edward M. Roney

ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

Gerald K. Miller
William D. Sauter
INVENTORS

BY Edward M. Roney
ATTORNEY

METHODS AND APPARATUS FOR TRANSMITTING DATA BETWEEN REMOTE LOCATIONS

This invention relates to data transmission systems and particularly to methods and apparatus for reading data off of a magnetic tape, transmitting the data to a remote location, and reproducing the data at the remote location.

It is an object of the invention to provide new and improved methods and apparatus for transmitting data from one location to another.

Another object is to provide such a data transmission system for use in the transmission of well logging data derived from an exploring means moved through a borehole drilled into the earth.

For a better understanding of the present invention, together with other and further objects thereof, reference is had to the following description taken in connection with the accompanying drawings, the scope of the invention being pointed out in the appended claims.

Referring to the drawings.

Figure 4:
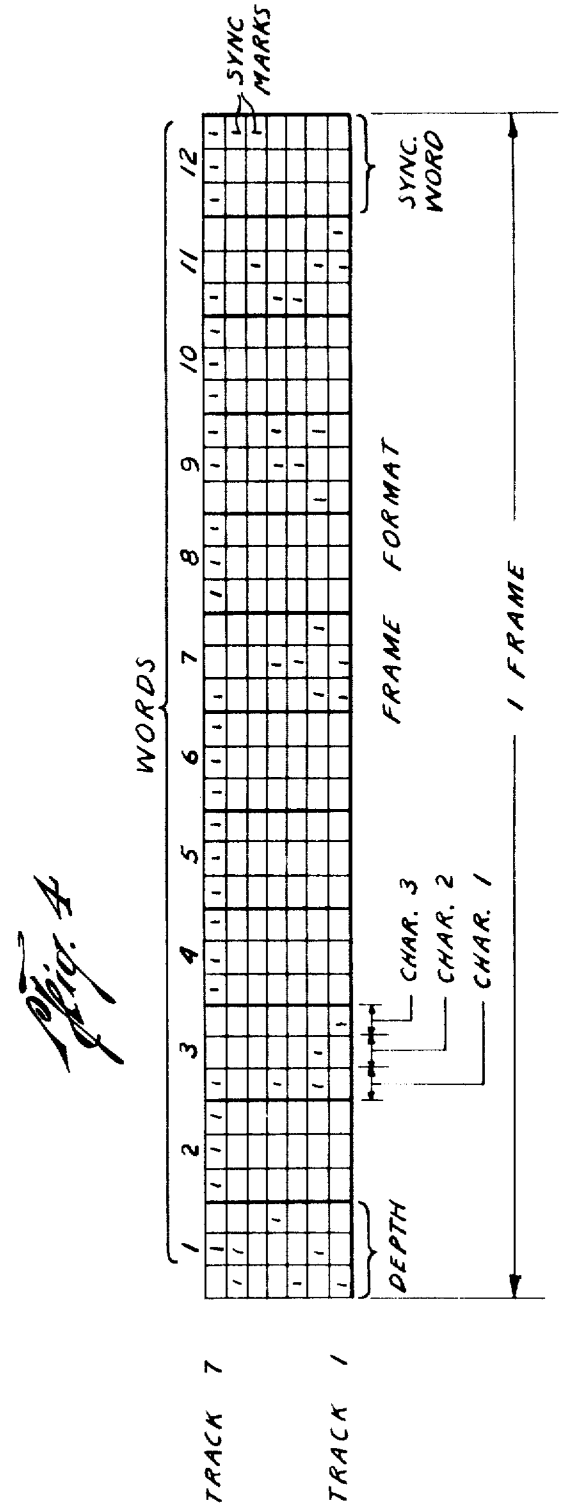
Figure 5A:
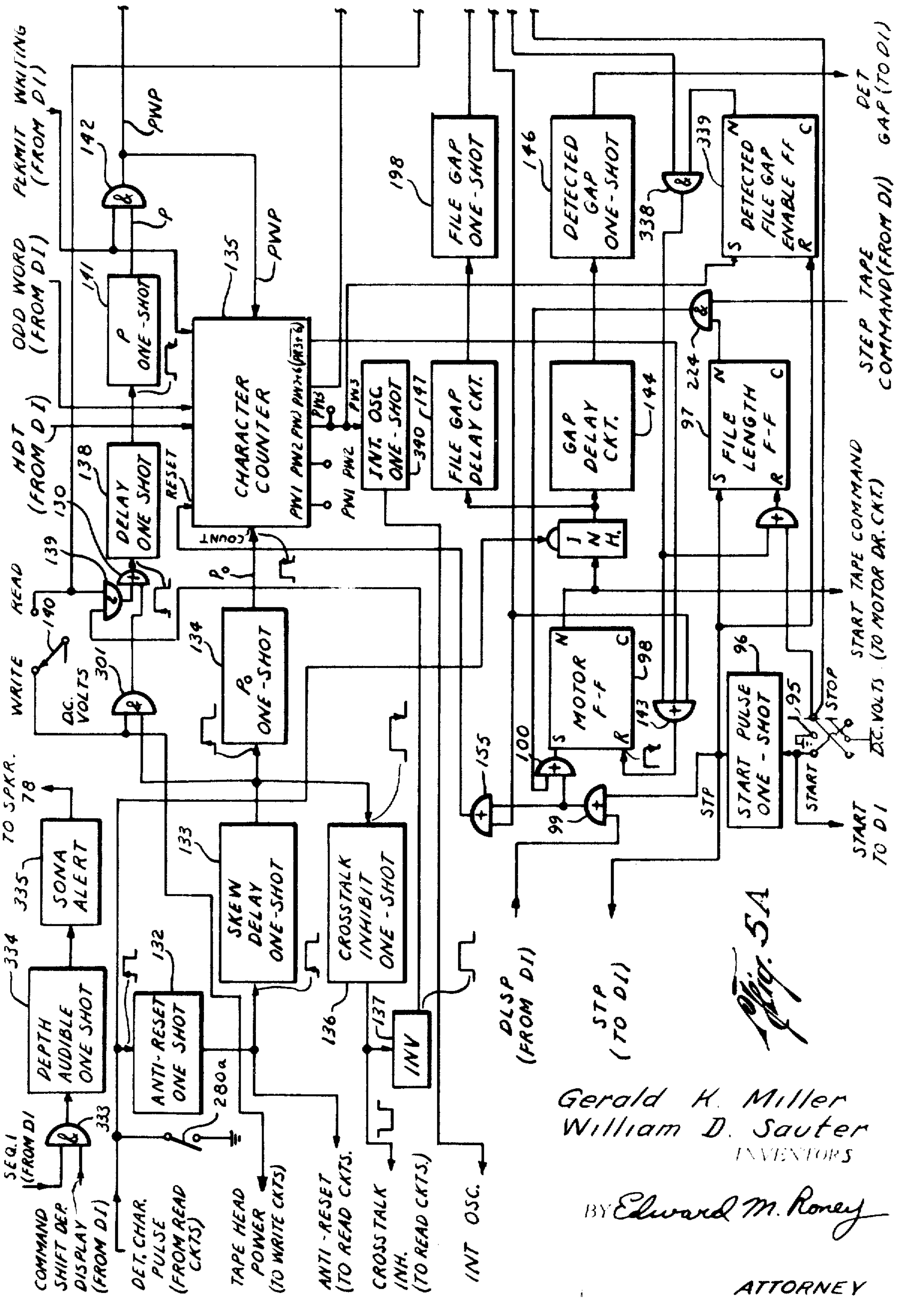
Figure 5B:
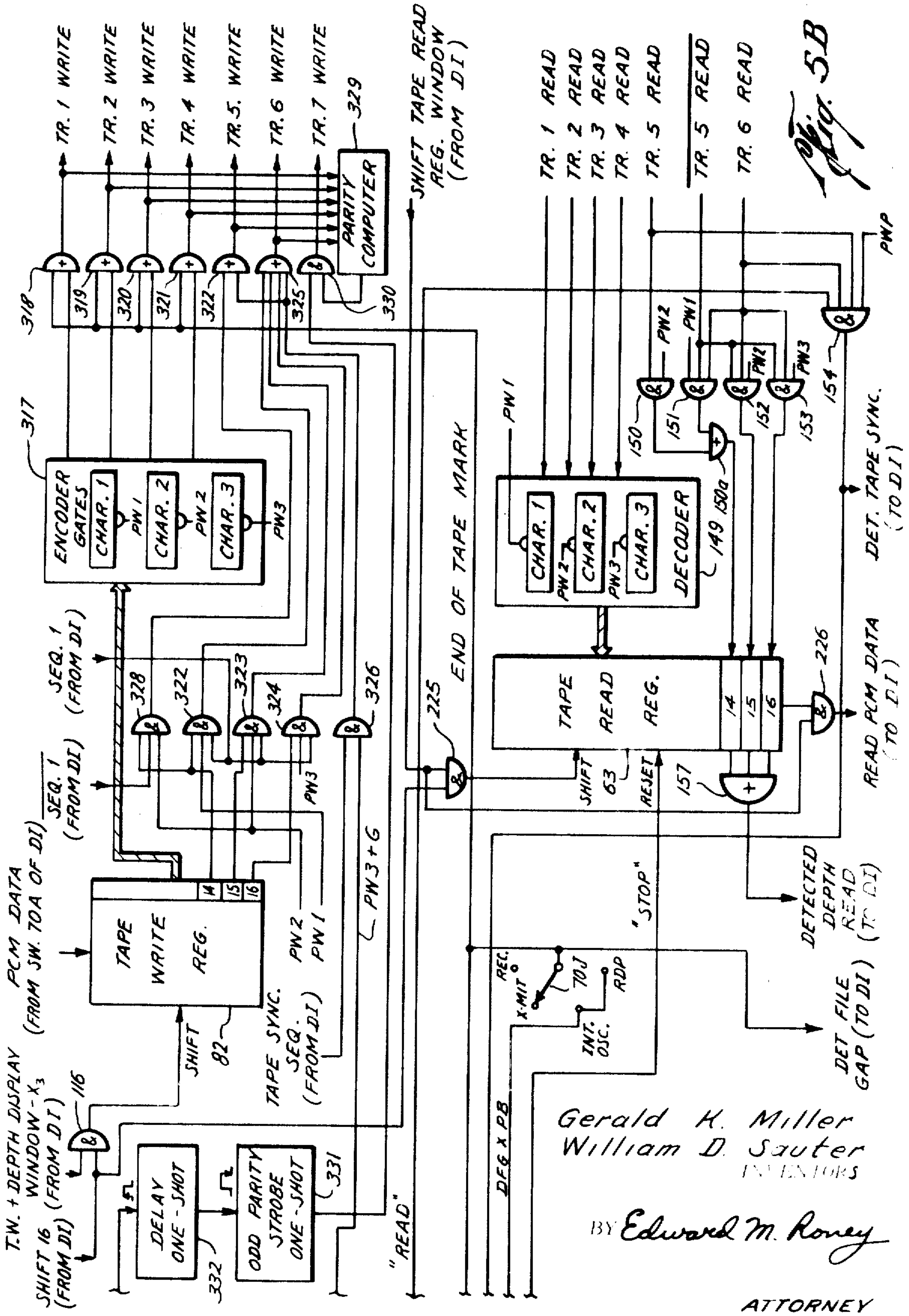
Figures 6, 8:
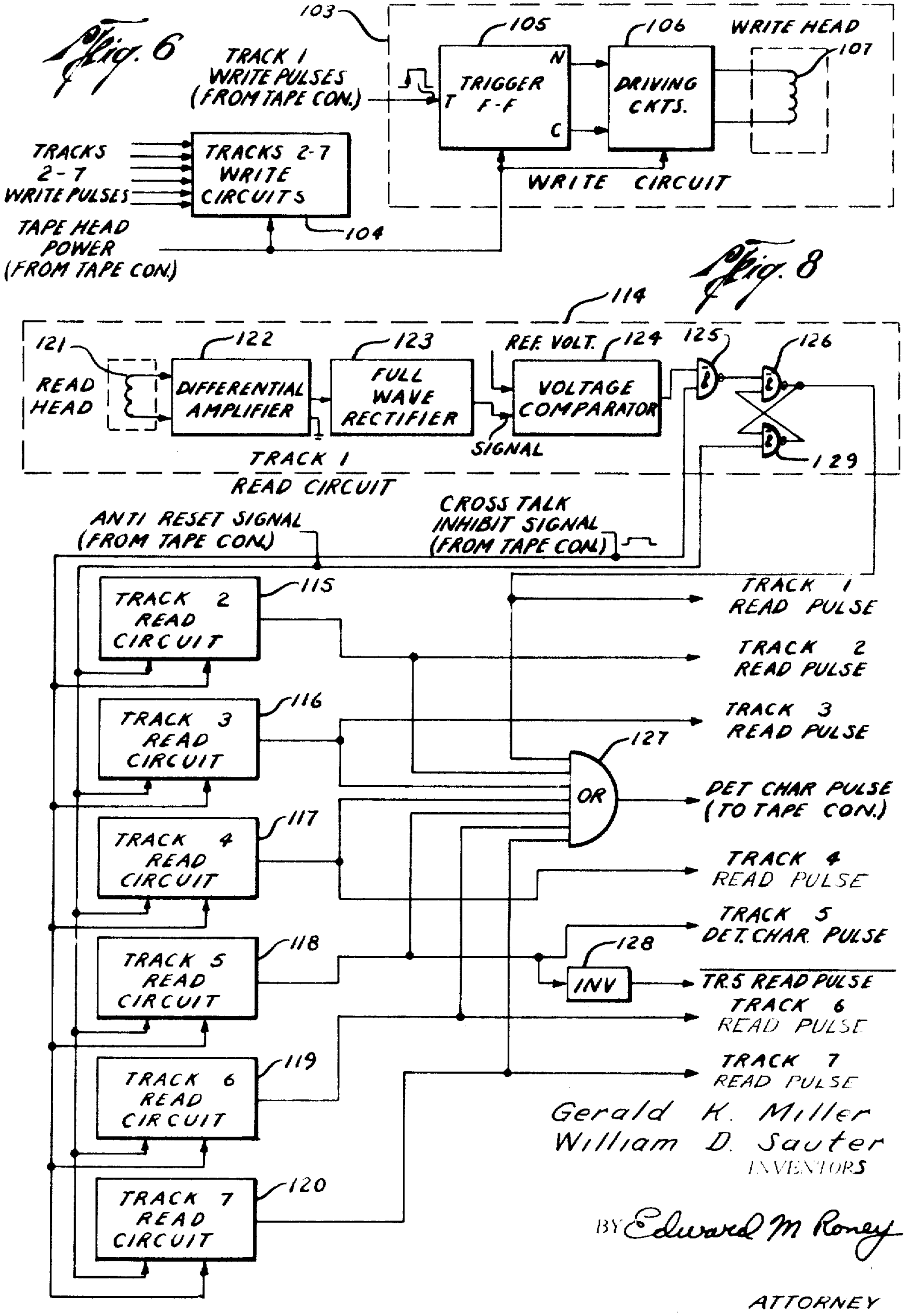
Figure 25:
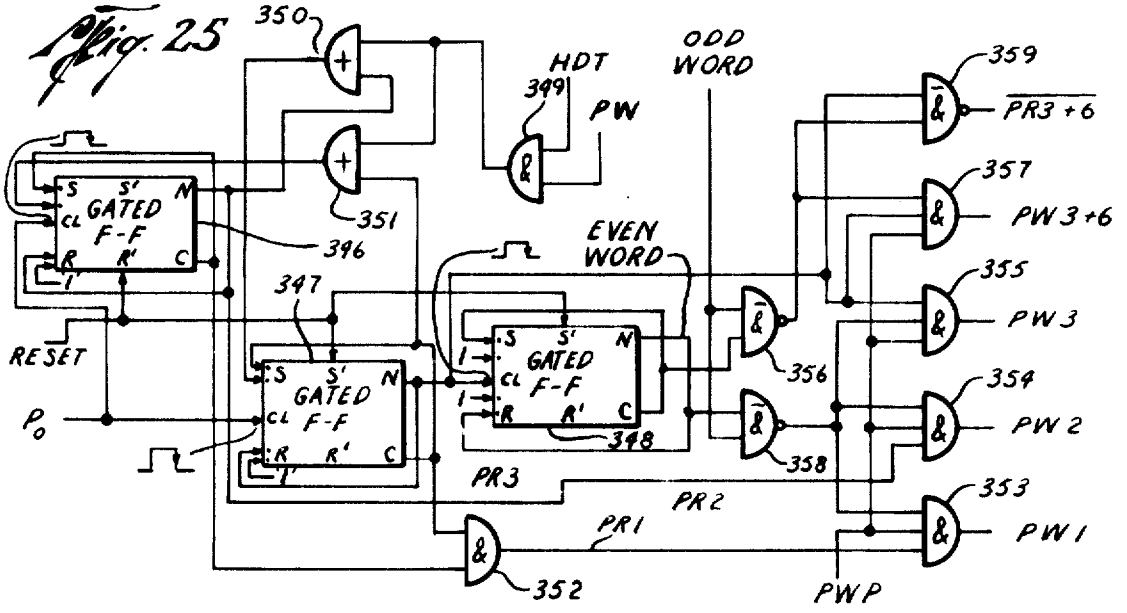
Figure 19:
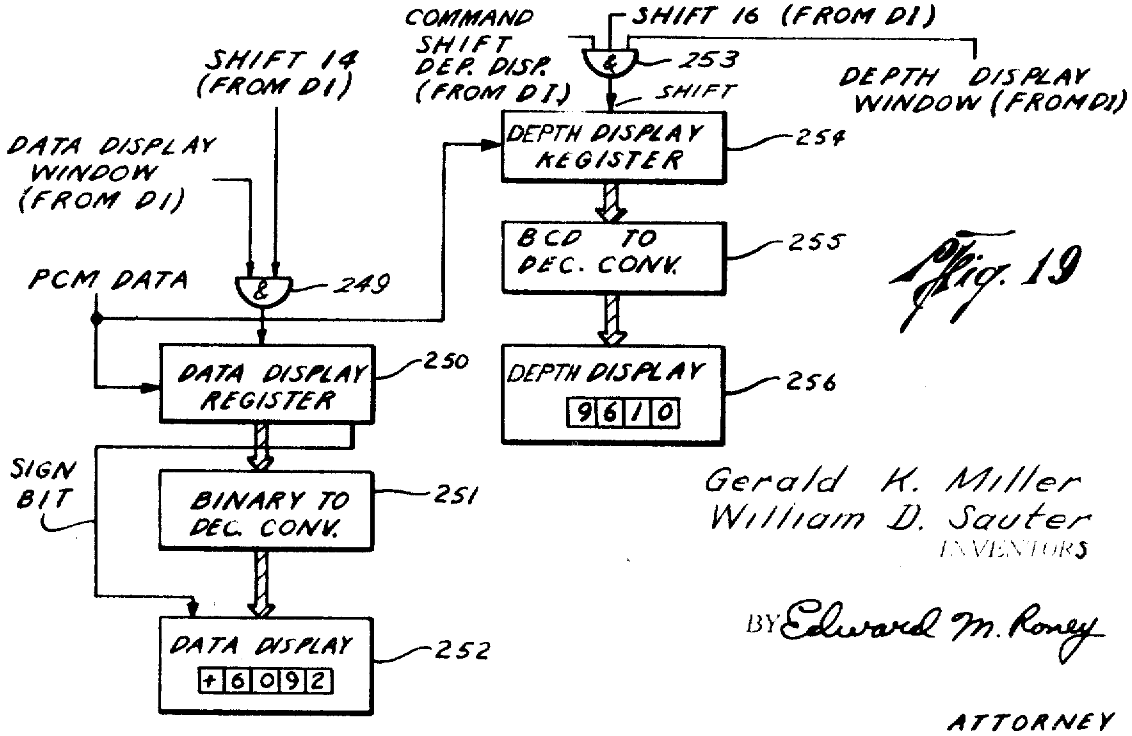
Figure 12:
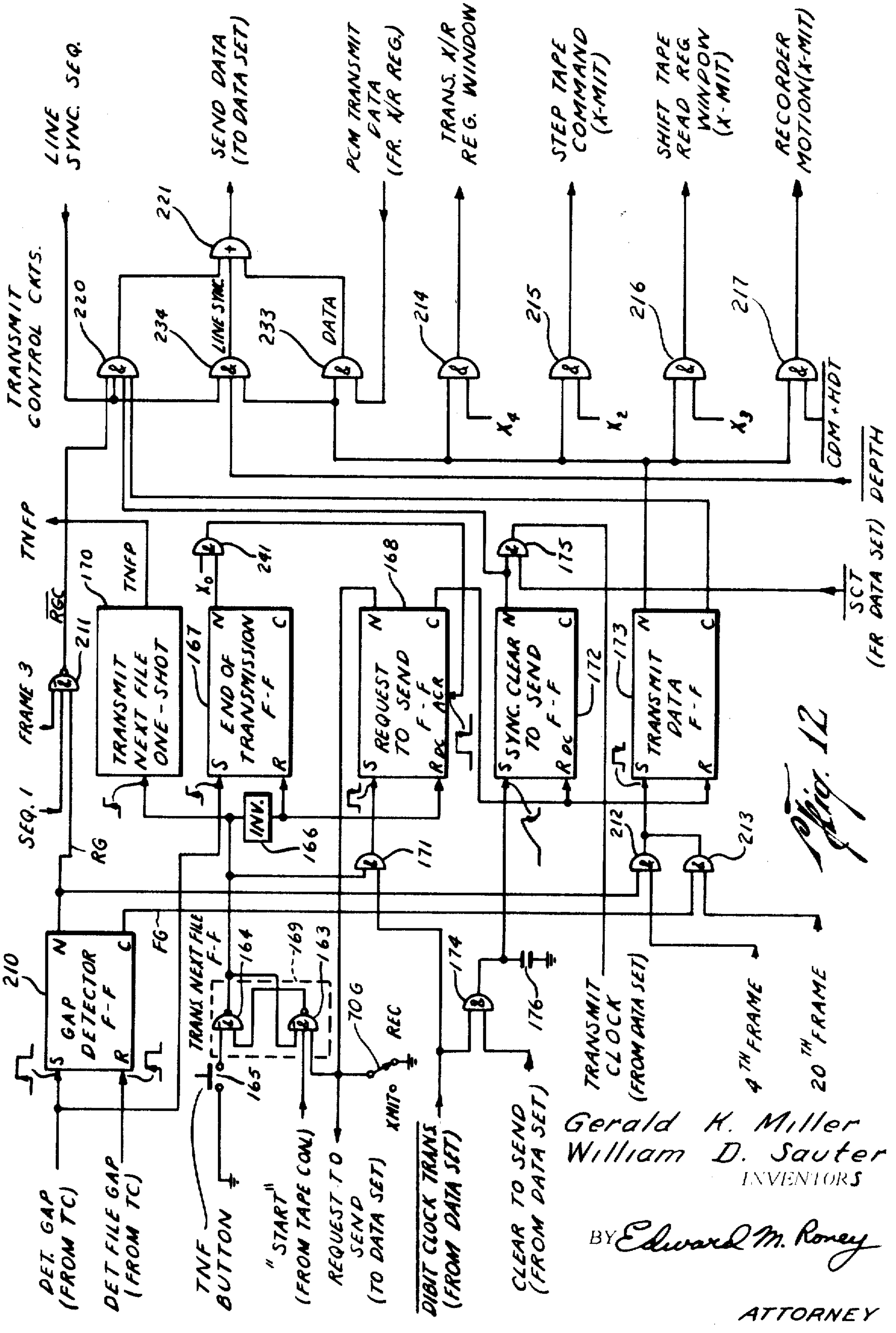
Figures 14, 24:
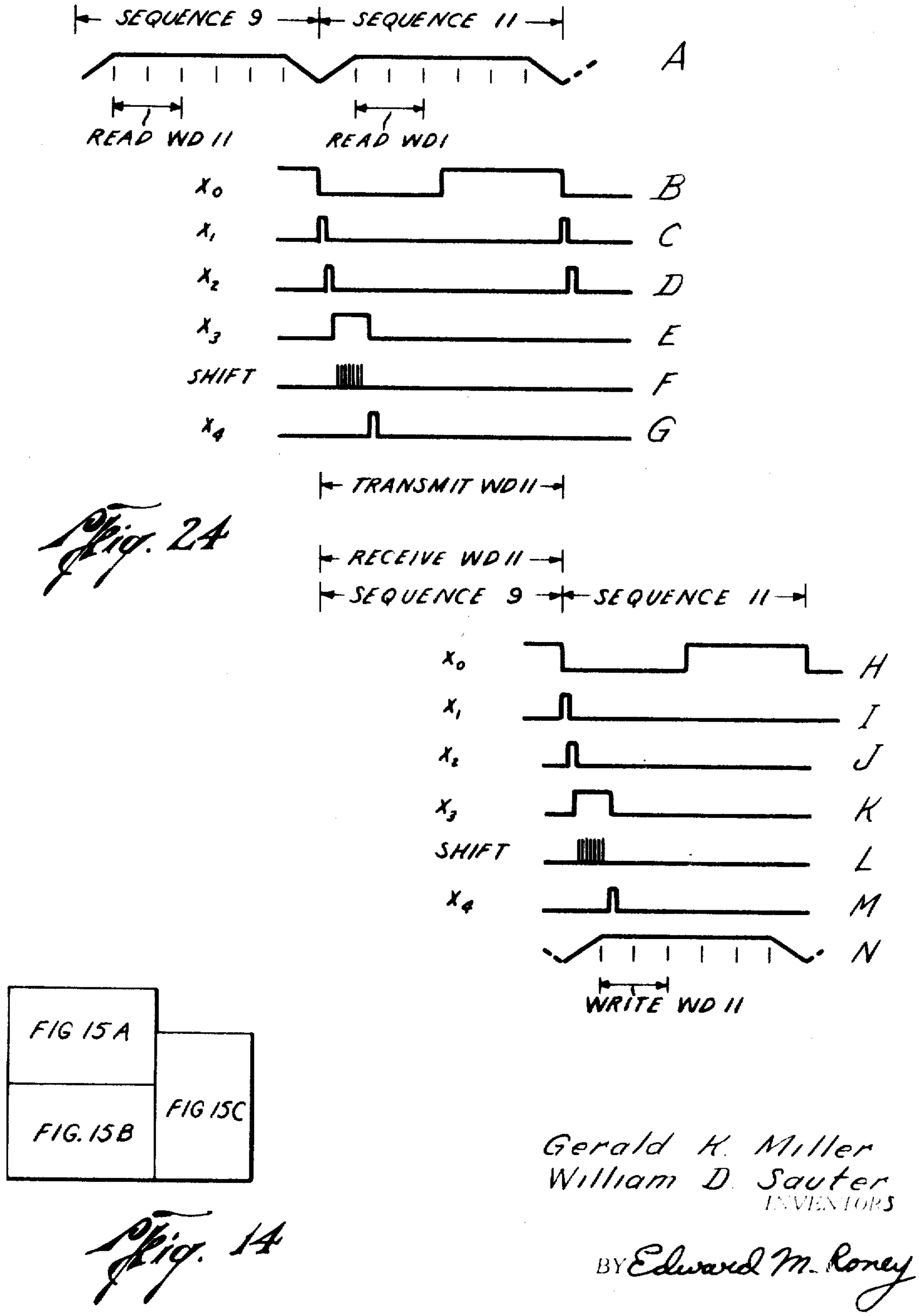
Figure 15A:
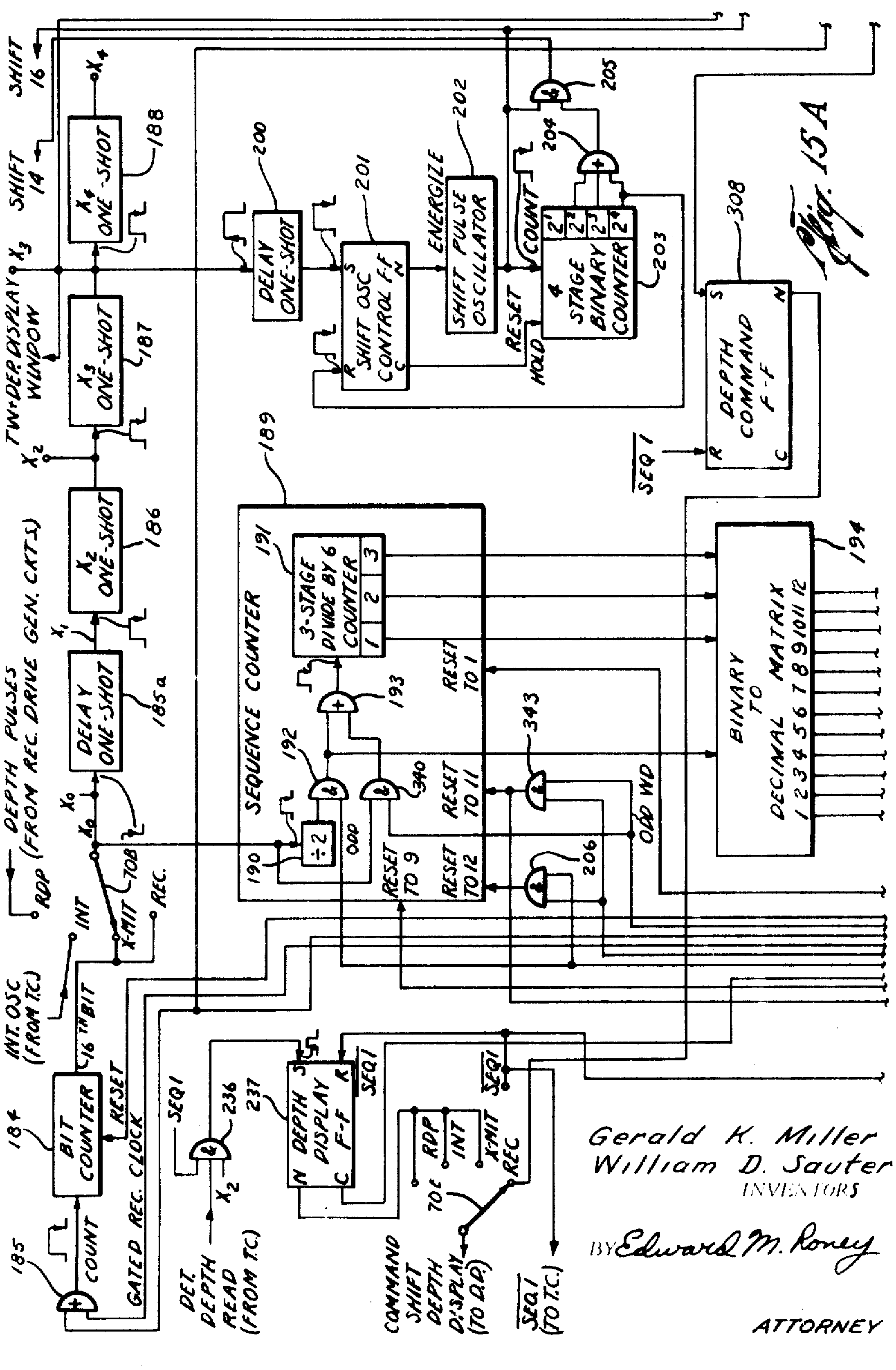
Figure 15B:
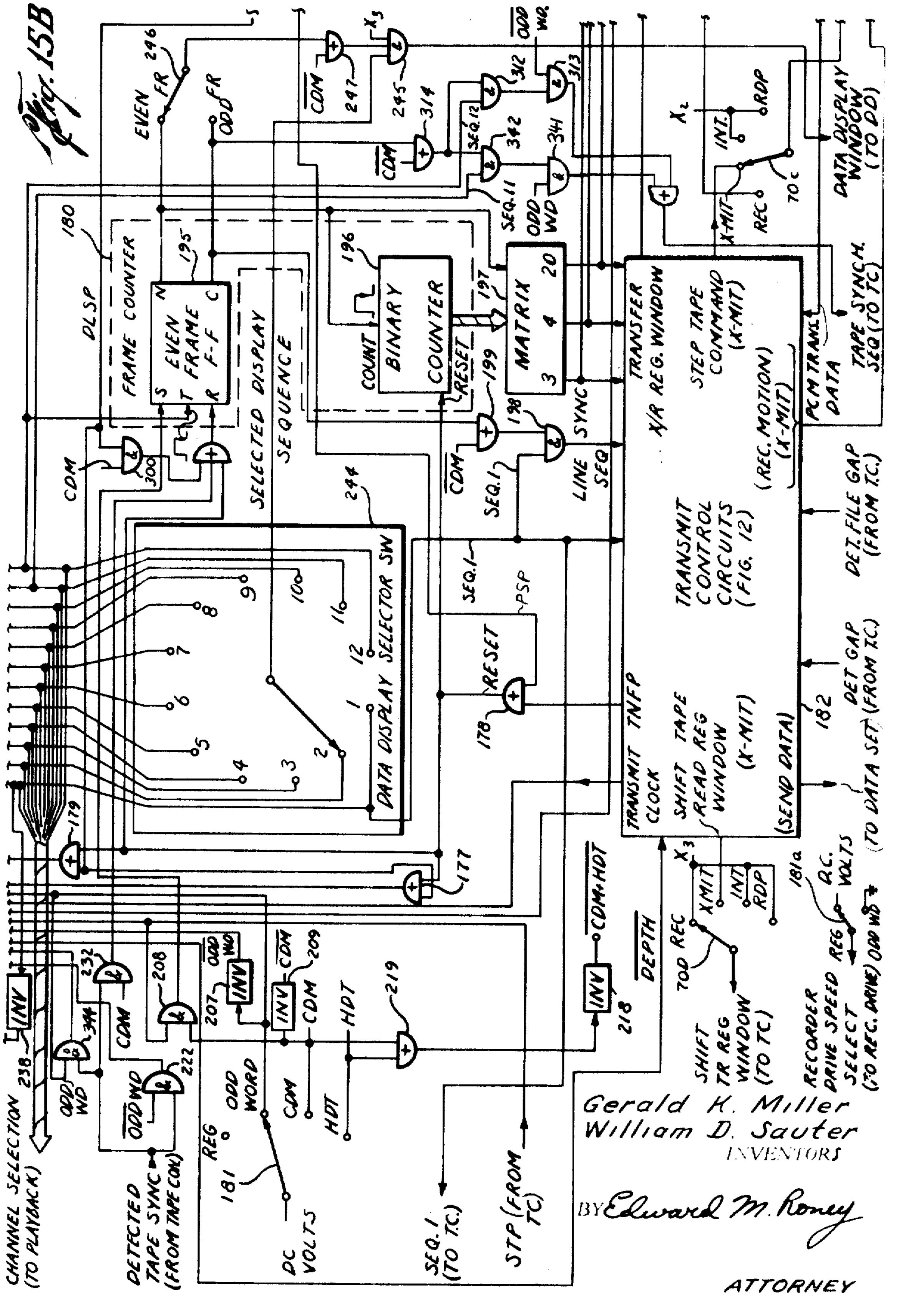
Figure 15C:
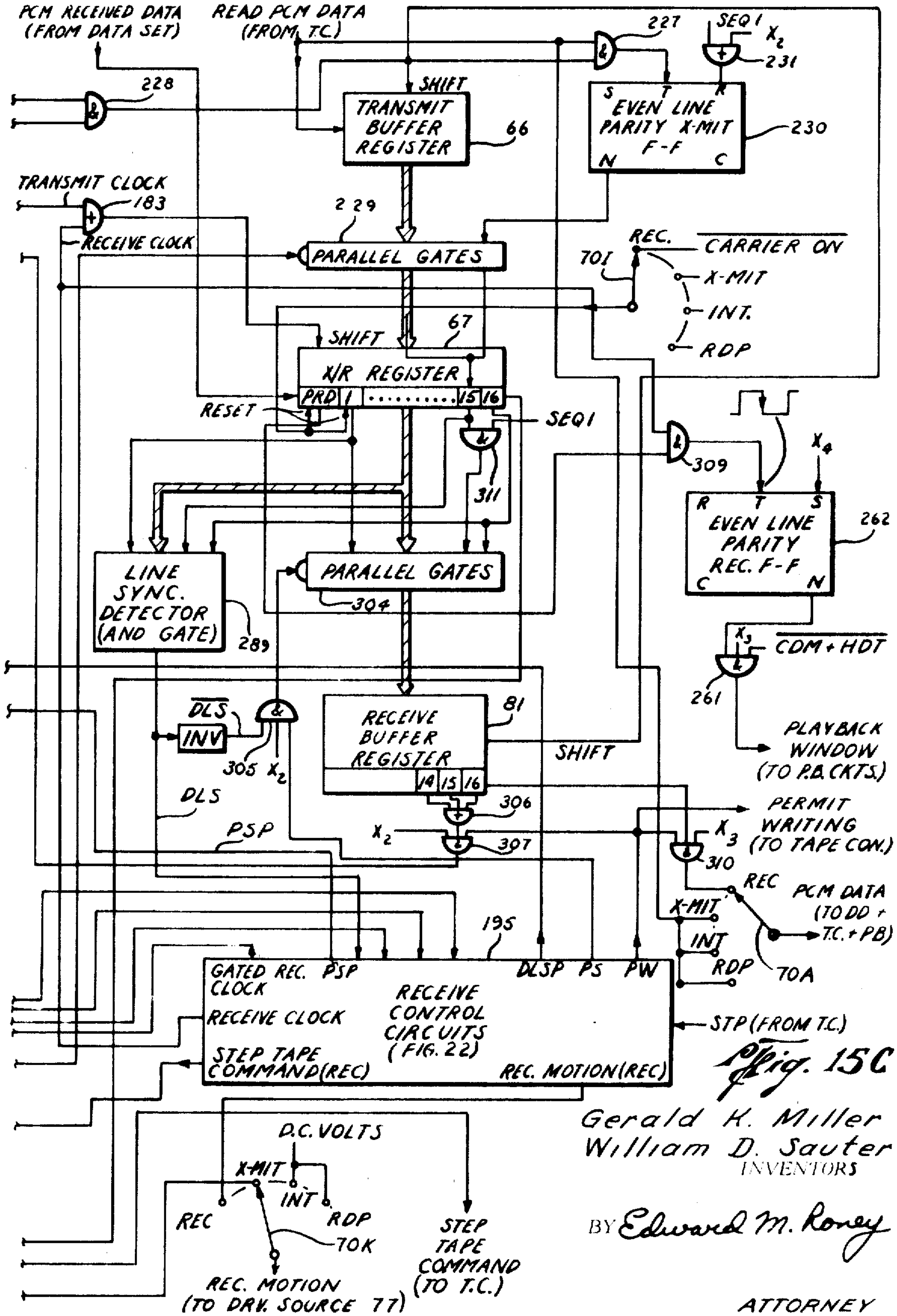
Figure 20:
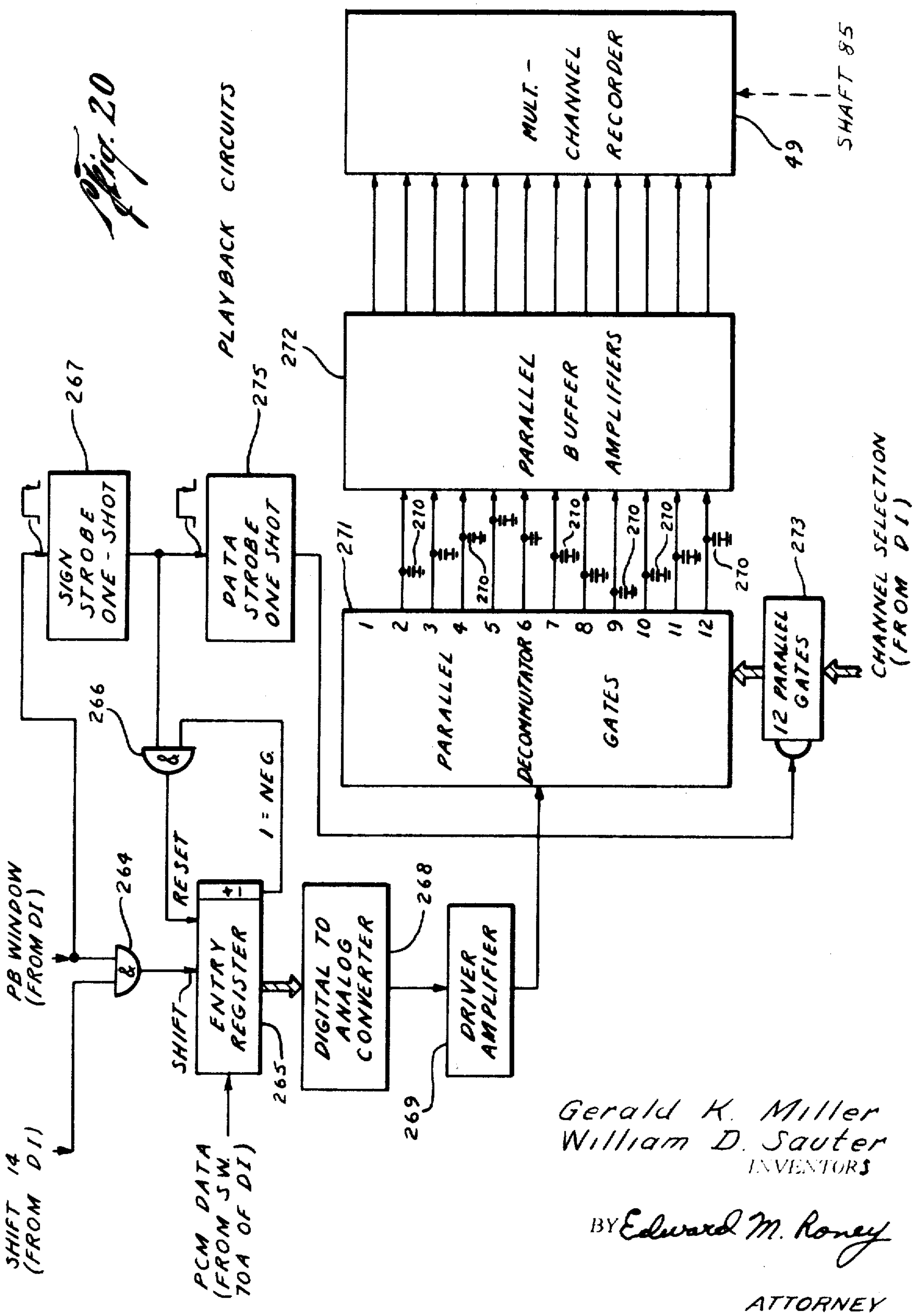
Figure 22:
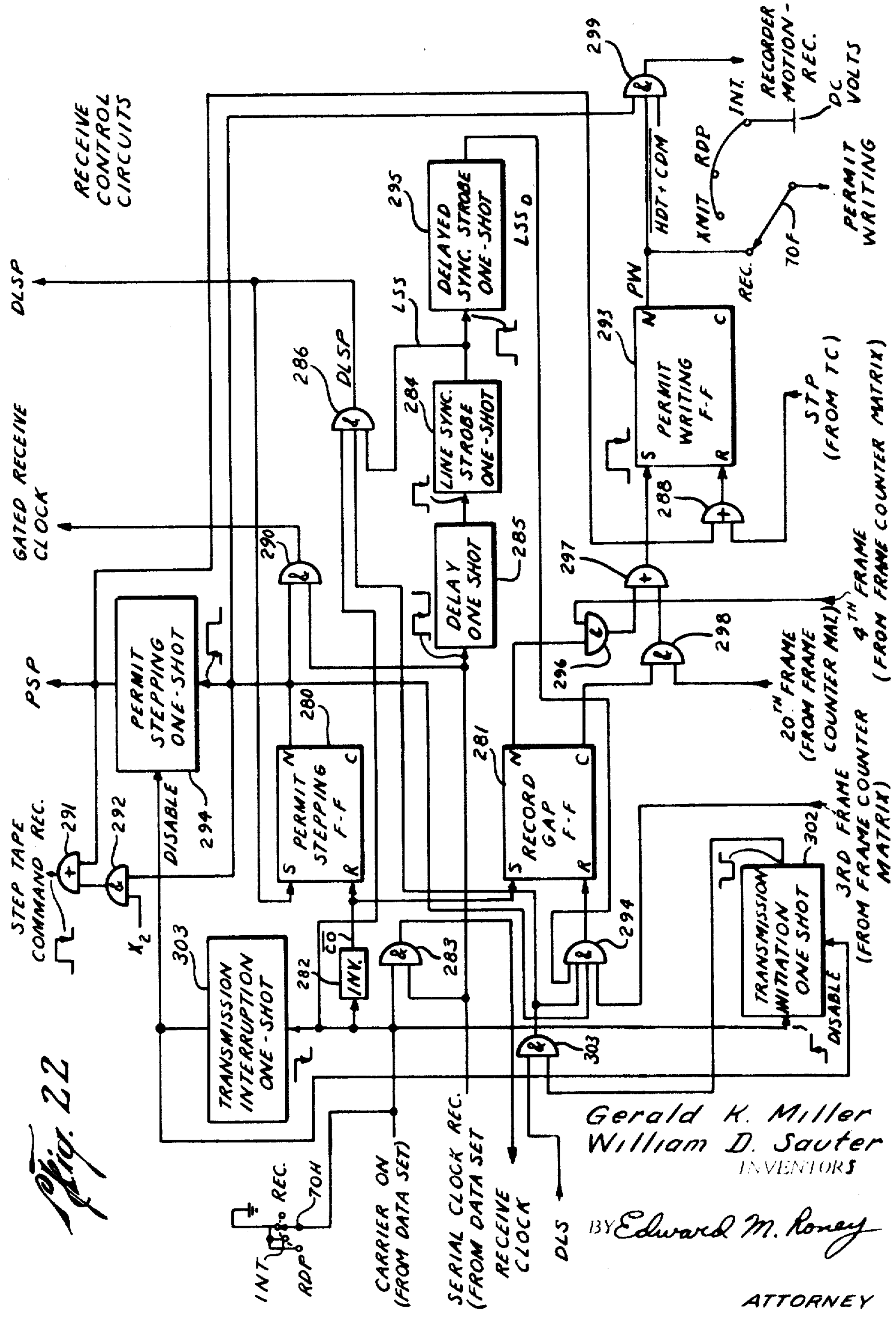
Figure 27A:
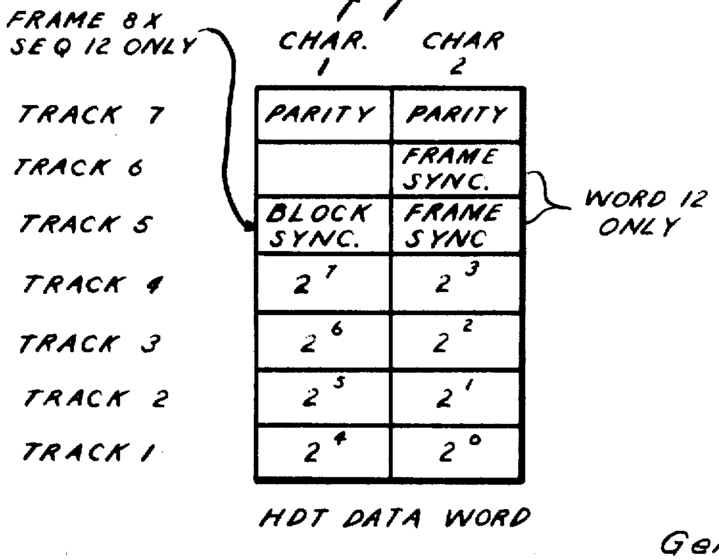
Figure 27B:
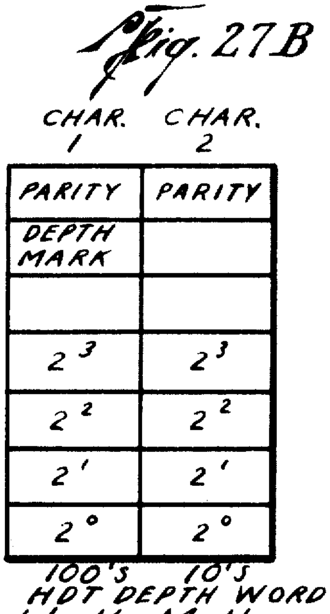

FIGS. 3A—3C show an example of the tape word format used with the data transmission system of the present invention;

FIG. 4 illustrates a typical example of the frame format utilized with one form of the present invention;

FIGS. 5A and 5B schematically show the tape control circuits utilized with the data transmission system of the present invention;

FIG. 6 shows circuits for writing data on magnetic tape in accordance with the present invention;

FIGS. 7A—7D illustrate timing diagrams useful in understanding the writing and reading of data on magnetic tape;

FIG. 8 shows circuits for reading data from magnetic tape in accordance with the present invention;

FIGS. 9A—9J show timing diagrams useful in understanding the operation of the write and read circuits of FIGS. 6 and 8;

FIGS. 10A—10K show timing diagrams useful in understanding one form of operation of the tape control circuits of FIGS. 5A and 5B;

FIGS. 11A—11F show the serial word format utilized with the data transmission system of the present invention;

FIG. 12 shows circuits for controlling the transmission of data in accordance with the present invention;

FIGS. 13A—13J show voltage diagrams useful in understanding the operation of the FIG. 12 apparatus;

FIG. 14 illustrates how the drawings of FIGS. 15A—15C fit together to make a complete view thereof;

FIGS. 15A—15C show interface circuits for preparing data read from magnetic tape for transmission and preparing received data to be written on tape, as well as circuits for controlling various operations in the apparatus of the present invention;

FIGS. 16A—16I show voltage diagrams useful in understanding the operation of a portion of the apparatus of FIGS. 15A—15C;

FIGS. 17A—17Q represent timing diagrams which show in a general way how data is transmitted and received in one form of operation of the data transmission system of the present invention;

FIGS. 18A—18L show timing diagrams useful in understanding how a transmission is terminated;

FIG. 19 schematically illustrates apparatus for displaying data in accordance with the present invention;

FIG. 20 shows apparatus for converting digital data words to analog signals for recording on photographic film in accordance with the present invention;

FIGS. 21A—21I show voltage diagrams for illustrating the operation of the apparatus of FIG. 20;

FIG. 22 shows apparatus for controlling the reception of transmitted data in accordance with the present invention;

FIGS. 23A—23M show voltage timing diagrams for illustrating the operation of the apparatus of FIG. 22;

FIGS. 24A—24N show timing diagrams representing another form of operation of the data transmission system of the present invention;

FIG. 25 illustrates a portion of the tape control circuits of FIG. 5A in greater detail;

FIGS. 26A—26K show timing diagrams representing another form of operation of the tape control circuits of FIGS. 5A and 5B;

FIGS. 27A and 27B show the tape word format of data derived from a well logging exploring device of a different nature;

FIGS. 28A—28J show timing diagrams representing the operation of the tape control circuits of FIGS. 5A and 5B when processing the data corresponding to the tape word format of FIGS. 27A—27C.

Figure 1:
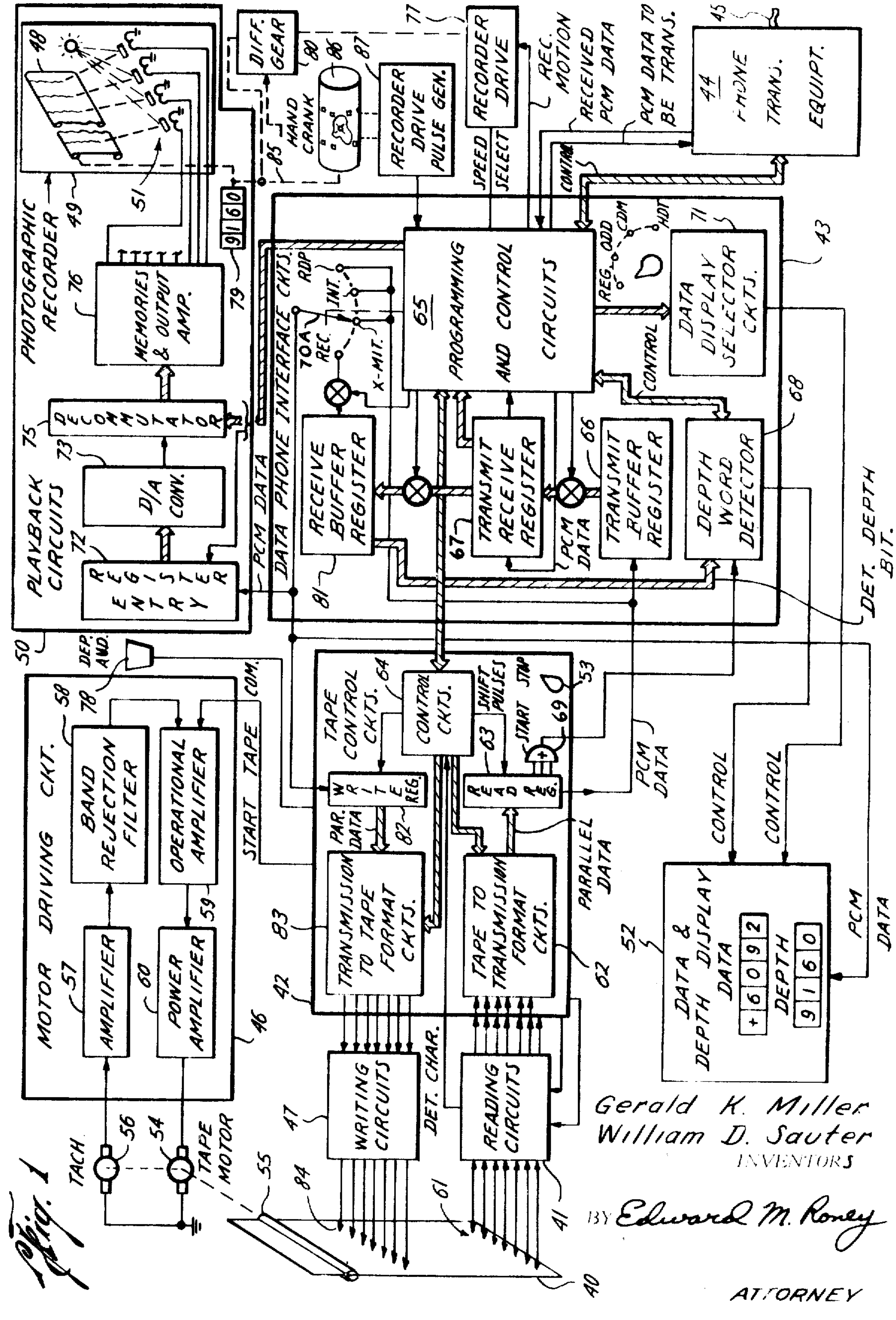
FIG. 1 shows in a schematic manner a representative embodiment of a data transmission system for reading data from a magnetic tape and reproducing it at a remote location in accordance with the present invention.

Referring to FIG. 1, there is shown a block diagram of the transmission equipment of the present invention. The system of FIG. 1 represents the equipment at one end of the communication link. However, the same subsystems which are utilized for transmitting data are also utilized for receiving data and thus the apparatus shown in FIG. 1 constitutes both the transmitting and receiving apparatus.

The transmission equipment of FIG. 1 is adapted to read data off of the magnetic tape 40, when moved by a motor driving circuit 46, through the action of a plurality (7 in this case) of parallel read heads 61 and reading circuits 41 for application to tape control circuits 42. Among other things, these tape control circuits act to convert the read data from the tape format to the serial transmission format and supply the data to dataphone interface circuits 43. These interface circuits 43 act to serially shift the data to the telephone transmission equipment 44, sometimes called "dataset," for transmission over a telephone line 45. At the receiving end (utilizing FIG. 1 also for the receiving end), the data is received by the telephone transmission equipment 44 from the telephone line 45 and applied via the dataphone interface circuits 43 to the tape control circuits 42. These tape control circuits convert the data from the serial transmission format back to the tape format and cause it to be written on the tape 40 by the writing circuits 47 and write heads 84.

While data is being transmitted or received, it can also be recorded on a film 48 by a photographic recorder 49. This photographic recorder 49 comprises part of playback circuits 50 which act to convert the transmitted or received digital data into analog form and separate the data into separate channels for recording on the film 48 by a galvanometer controlled mirror arrangement 51. While receiving or transmitting data, a selected channel of well logging data as well as borehole depth can be numerically displayed by a data and depth display subsystem 52. Additionally, the tape 40 can be played back to allow the photographic recorder 49 to record an analog trace of the digital data contained on the tape 40, as well as providing a numerical display of depth and one channel of data even though data is not being transmitted or received.

Now going into the transmission equipment of FIG. 1 in greater detail and first considering the transmission operation, when a start-stop switch 53 in the tape control circuits 42 is moved to the start position, the tape control circuits 42 supply a "start tape command" signal to the motor driving circuits 46 which in turn supplies power to a tape motor 54 to rotate a tape capstan 55 for moving the tape 40. To obtain high acceleration and deceleration of the tape 40, a tachometer 56 monitors the velocity of the tape 40 and supplies a signal representative thereof back to the motor driving circuits 46. In the motor driving circuits 46, this velocity signal is amplified by an amplifier 57 and applied via a band rejection filter 58 (to filter out electromechanical resonance signal) to one input of an operational amplifier 59 which compares this velocity signal with the "start tape command" signal generated from the tape control circuits 42. The differential signal from operational amplifier 59 is then supplied via a power amplifier 60 to the tape motor. By this means, power supplied to the tape motor 54 will initially be very high and decrease as the tape velocity increases so as to produce a fast acceleration of the tape 40. The same thing happens in reverse when the "-start tape command" from tape control circuits 42 is removed, i.e., a fast deceleration of the tape.

Since only seven recording tracks are utilized and each data word is greater in length than seven bits, each data word is recorded at several different side-by-side positions along the length of the tape. Each of these positions is called a character. With the tape 40 moving, the reading heads 61 detect changes in magnetic flux to enable the reading circuits 41 to supply all of the bits of each character on the tape to transmission format circuit 62. Suitable control circuits 64 of the tape control circuits 42 keep track of the characters which are being read off of the tape so as to instruct the tape to transmission format circuit 62 which shift register stages each character is to be placed in.

To provide the timing requirements for this format conversion process, the magnetic marks on the tape are utilized. To this end, the reading circuits 41 combine the outputs of the read circuits of each track so as to supply a "detected character pulse" indication back to the control circuits 64 each time a character is detected. (This is possible because each character has one track set aside for odd parity which insures that there will be a magnetic mark in at least one track.) These "detected character pulses" advance a character counter which in turn controls the format conversion process and turns off the "start tape command" signal to stop the tape movement after a given number of characters have been detected on the tape. The tape control circuits 42 also supply "-crosstalk inhibit" and "antireset" signals back to the reading circuits 41 for purposes to be described later.

As will be discussed in more detail later, the tape to be transmitted has data gaps (lengths where no data is recorded) recorded thereon. The tape is initially placed in a gap and when the start-stop switch is operated the tape control circuits detect the presence of this gap by the absence of "detected character pulses" and informs the programming and control circuits 65 of the dataphone interface of, not only the presence of a gap, but also what type of gap. The tape then advances through the gap and reads the first word of the first file, converts it to a serial format, and stores it in the tape read register 63. The tape then stops. Then, the datasets at the transmitting and receiving ends establish bit synchronism with one another, after which the programming and control circuits 65 of the dataphone interface 43 transmits the gap. (This gap transmission takes the form of transmitting zero data in every word but sync words, which sync words occur once per frame. A frame is 12 words.) During the gap transmission, the transmitter informs the receiver how long the gap will be so that the receiver can prepare its circuits to write the received data on tape when it begins arriving.

Now, with the first data word in the tape read register 63 waiting to be transferred to the dataphone interface circuits 43 and dataset 45 to be placed on the telephone line, the programming and control circuits 65, after the gap is transmitted, supplies a signal to the control circuits 64 of the tape control circuits 42 which causes the data word contained in the read register 63 to be shifted to a "transmit buffer register" 66 in the dataphone interface 43. The data word is stored in register 66 until the programming and control circuits 65 cause it to be shifted to a transmit/receive register 67 when it is time to transmit this data word. The data word in the transmit/receive register 67 is then shifted to the programming and control circuit 65 for application to the dataset 45 to be placed on the telephone line.

The dataset supplies the programming and control circuits 65 of the dataphone interface 43 with a clock signal which is utilized to shift the data from the dataphone interface 43 to the dataset (i.e., the dataset tells the dataphone interface 43 how fast it wants to receive the data). The programming and control circuits 65 also use this clock signal to determine when each word has been transmitted so as to start the tape movement and read each word off of the tape for application to the read register 63 and thence to the transmit/receive register 67. (Actually, each word is read off of the tape while the last preceding word read from the tape is being transmitted.) A "line sync word" is transmitted once per frame (word 01 in this case) to maintain the receiver in synchronism with the transmitter.

Additionally, this transmission process is repeated over and over again until the entire file of data has been transmitted. When the tape reaches the end of a file of data (and thus enters a file gap), the tape control circuits 42 inform the programming and control circuits 65 of this and transmission is stopped. When the operator initiates transmission again, the same operation, just discussed, begins again. This process continues over and over again until every file on the tape has been transmitted.

Since the data that is being transmitted is well logging data derived from an exploring means moved through a borehole drilled into the earth, each data word corresponds to a given depth level in the borehole. It is important to know precisely what the depth levels corresponding to each well logging data word are. In this connection, the magnetic tape 40 will have a depth word recorded thereon at periodic intervals of borehole depth. Each depth word is flagged by suitable coding on the tape. When the depth word is converted to the serial transmission format and placed in the read register 63, one or more of the last three stages of this register 63 will have a "1" located therein if a depth word has been read off of the tape 40. This fact is indicated to a depth word detector 68 in the dataphone interface 43 via an OR gate 69. The depth word detector 68 then instructs the programming and control circuits 65 of the dataphone interface to substitute the read depth word for the line sync word during the frame that the depth word is detected.

Additionally, the depth word detector 68 also instructs the depth display circuits of the data and depth display subsystem 52 to accept the serial pulse code modulated (PCM) data being shifted out of the read register 63 and display it. This PCM data from the read register 63 is supplied to the depth display circuits through a mode selector switch 70*a* which has four positions designated REC, X–MIT, INT, and RDP which stand for receive, transmit, internal oscillator and "recorder drive pulses" respectively.

Additionally, one data word per frame can be displayed by the data display circuit portion of the depth and data display circuits 52. To this end, the programming and control circuits 65 of the dataphone interface 43 keep track of which word is being processed at any time and provides this information to a data display selector circuit 71. The selector circuit 71 selects a desired word of each frame (which corresponds to a given channel of information) and instructs the data display circuits 52 to receive that particular word for data display. This data word for display is transmitted from the tape read register 63 to the display circuits 52 via the X–MIT position of the mode switch 70*a*.

While transmitting data over the telephone line, the playback circuits 50 can produce an analog recording of the transmitted data on the film 48 during transmission. To this end, the programming and control circuits 65 of the dataphone interface 43 instructs an entry register 72 to receive the pulse code modulated data from the tape read register 63 of the tape control circuits 42 via the mode selector switch 70*a*. This digital data in the entry register 72 is converted to an analog quantity by a suitable digital-to-analog converter 73. The programming and control circuits 65 of the dataphone interface 43 sequentially energize selected parallel gates of a decommutator 75 so as to separate the words being shifted into the entry register 72 to their proper channel for application to a plurality of parallel memory units 76. These analog quantities are then stored by the memory units for application to the galvanometers 51 of the photographic recorder 49.

The film 48 is driven by a suitable driving source 77 by way of a shaft 85 upon command from the programming and control circuits 65 of the dataphone interface 43. To synchronize the photographic film 48 of the photographic recorder 49 with borehole depth, the tape control circuits 42 cause a loud speaker 78 to emit an audible beep every time a depth word is read off of the tape 40. Since a depth word occurs at equal intervals of borehole depth (i.e., every 10 feet), the operator merely adjusts the depth drive, if necessary, to the photographic recorder 49 by turning a hand crank connected to a differential gear 80 so that the depth indicator 79 will read the proper multiple of ten feet each time the beep occurs.

Now concerning the reception of the data transmitted over the telephone line, the receiving dataset first becomes synchronized with the transmitting dataset and then supplies a clock signal to the programming and control circuits 65 of the dataphone interface 43. When the first sync word is received, the programming and control circuits 65 begin counting the clock pulses to cause the tape to step each time a complete word is received. Since a file gap is initially transmitted, no data will be written on tape while this file gap is being produced on the tape. During the transmission of the file gap, the transmitter instructs the receiver how long the gap will be. Now, when the first data word is received by the dataset 44, it is supplied to the programming and control circuits 65 and then shifted into the transmit/receive register 67. When the first word has been completely entered into the transmit/receive register 67, the programming and control circuits 65, having been instructed how long the gap is and counting the clock pulses to determine when each complete word has been entered into the transmit/receive register 67, causes the data to be parallel shifted from the transmit/receive register 67 to a receive buffer register 81 at precisely the right time. Then, upon command from the programming and control circuits 65, the data word contained in the receive buffer register 81 is serially shifted via the receive position of the mode selector switch 70A to a tape write register 82 contained in the tape control circuits 42.

Meanwhile, the programming and control circuit 65 of the dataphone interface has instructed the tape control circuits 42 to start moving the tape 40. To facilitate the writing of each data word on the tape 40, the tape 40 desirably has marks prerecorded in at least one track thereof. Thus, when the tape 40 begins moving, the reading circuits 41 will supply the "detected character pulse" back to the control circuits 64 of the tape control circuits 42 so that the data word can be written in the desired format and at the desired locations on the tape 40. Thus, the control circuits 64 instruct the transmission to tape format circuits 83 to connect the proper stages of the write register 82 to the writing circuits 47 at the proper time to write the word on tape in a plurality of characters.

This process is repeated over and over again until every word of the file has been written on the tape 40. When the transmitter reaches the end of a file, it removes the carrier from the telephone line and the receiving apparatus stops operating. When the carrier is again placed on the telephone line, the receiving apparatus operates in the same manner as just discussed to create a data gap of just the right length, as informed by the transmitter, and start writing data on tape at precisely the right time. This process continues over and over again until every file of the tape at the transmitting location has been received and written on the tape at the receiving end.

While receiving data, the depth and data words can be displayed by the display circuits 52 and recorded on film in the same manner as when transmitting a tape. The primary difference is that the depth word detector 68 interrogates the last three stages of the receive buffer register 81 to detect the presence of a depth word, during the sequence when a depth word is expected, instead of the tape read register 63. Additionally, the PCM data being shifted out of the receive buffer register is passed to the display and playback circuits 52 and 50 instead of the data being shifted out of the tape read register 63.

The data transmission system of FIG. 1 also has the capability of playing a tape back for recording by the photographic recorder 48 and display by the display circuits 52. This can be accomplished either through the action of an internal oscillator contained within the control circuits 64 of the tape control circuits 42 or by synchronizing the movement of the tape 40 with the movement of the film 48. When using the internal oscillator mode of playback, the control circuits 64 generate a signal which is sent to the programming and control circuits 65 of the dataphone interface 43 to initiate tape movement and cause the data to be read off of the tape and supplied to the read register 63. The programming and control circuits 65 then send the data via the "INT" (internal oscillator) position of the mode selector switch 70A to the playback circuits 50 and display circuits 52. This operation takes place in the same manner as when the system is in the transmit mode of operation.

The internal oscillator signal from the control circuit 64 is also utilized by the programming and control circuits 65 to keep track of which word is being processed at any given time. By so doing, the desired gate of the decommutator 75 can be energized at the proper time to separate the data words into their respective channels for recording by the photographic recorder 49. Also, the data display selector circuits 71 can select the proper data word, as well as each depth word, for display.

Now, when the transmission circuits are synchronized to the film 48 movement for playback, (i.e. the RDP switch position) the same shaft 85 which drives the film 48 also rotates a drum 86 which has a plurality of slots at given intervals on its periphery. A suitable light source is contained within the drum 86 so as to pass light through the slots of the drum 86 to suitable photosensitive diodes contained within a recorder drive pulse generator 87. The recorder drive pulse generator 87 then generates pulses at a frequency proportional to the speed of the film 48. Since the film 48 is scaled in its longitudinal direction as a function of depth, the frequency of the pulses generated from the recorder drive pulse generating circuits 87 will be proportional to increments of depth on the film 48. These "depth pulses" from the circuits 87 are supplied to the programming and control circuits 65 of the dataphone interface where they are substituted for the internal oscillator pulses from the tape control circuits 42 so as to play back the tape for recording on the film 48 and display by the display circuits 52.

Before proceeding with the detailed description of the data transmission system of the present invention, it would first be desirable to describe the word format of the data recorded on the magnetic tape 40. Thus, looking at FIG. 2, there is shown the tape format utilized with the transmission equipment of the present invention. There is an initial preprinted section of the tape followed by an initial erased section having an initial reflective marker. This initial reflective marker indicates to the operator where the initial erased section is located on the tape. The initial erased section is followed by a file gap of 20 frames length. (In actuality, this will merely appear as a longer erased section.) The initial file gap is then followed by a plurality of files with a file gap separating each file which file gaps identify where one file ends and the next one begins on the tape. The first file is typically an identification file of 20 frames length. This 20 frame identification file is typically followed by a 20 frame file gap and a calibration file. This calibration file is typically followed by another file gap and the log file. Pulses" represent the detected binary representations read from the tape.

Figure 2:
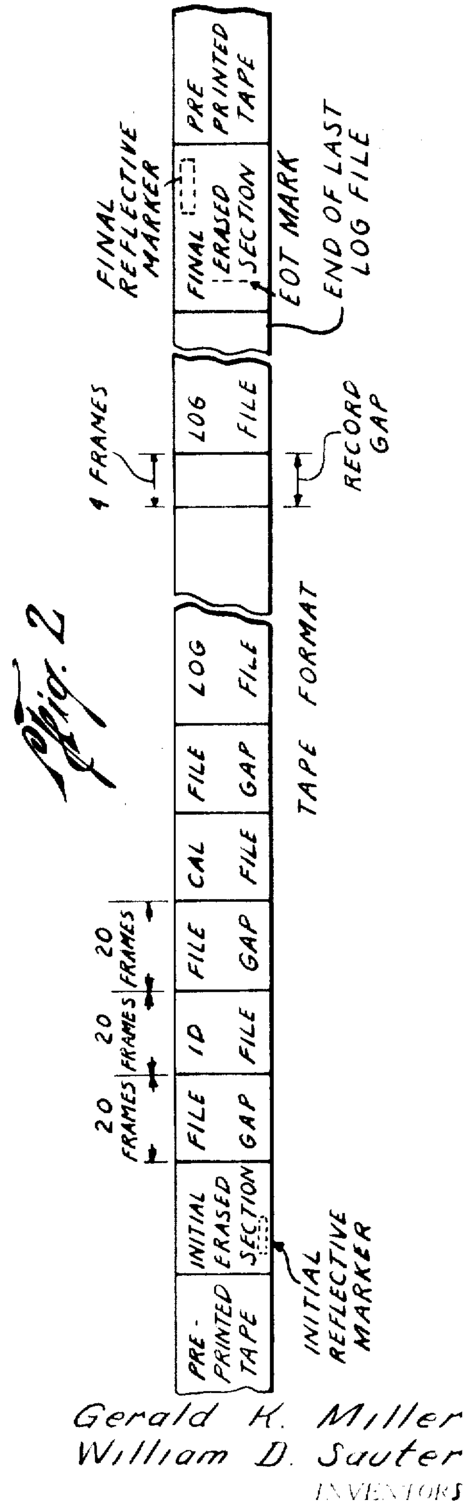
FIG. 2 illustrates a typical example of a tape format that can be utilized with the data transmission system of the present invention.

The log file contains all of the well logging data which was derived initially from an exploring means which was moved through a borehole drilled into the earth. Thus, the log file is spaced on the tape as a function of borehole depth. This log file may or may not have record gaps located periodically along the tape. In FIG. 2, one record gap is illustrated in the log file but many such record gaps may be present. These record gaps are sometimes placed in lengthy files, which are to be computed, to give the computer memory a chance to digest the data. At the end of the log file, a final erased section having an "end of tape mark" and final reflective marker is located. A tape can be recorded with this format by the tape recording apparatus disclosed in U.S. Pat. No. 3,457,544 granted to G. K. Miller et al. on July 22, 1969. It is the primary purpose of the transmission equipment of the present invention to reproduce this tape of FIG. 2 at a remote location.

Now referring to FIGS. 3A, 3B and 3C, there is shown the tape word format utilized for "Regular" and "Continuous Dipmeter" (CDM) logs. The term "Regular log" denotes all kinds of well logs except dipmeter logs, e.g., induction log, sonic log, radioactivity log, etc. FIG. 3A shows the tape format for the well logging data words. The horizontal rows correspond to tracks 1—7 of the tape and the vertical columns correspond to the three characters which make up each word. It can be seen from FIG. 3A that tracks 1—4 of character 1 contain the weighted binary values $2^0$—$2^3$; tracks 1—4 of character 2 contain the weighted binary values $2^4$—$2^7$; and tracks 1—4 of character 1 contain the weighted binary values $2^8$—$2^{11}$. The sign bit is contained in track 5 of character 2, and track 7 of all characters is set aside for odd parity.

Looking at FIG. 3B, there is shown the tape format for the depth word which is found in word 1 of each frame. (A frame is 12 words.) The depth word is recorded in a binary coded decimal format wherein characters 1, 2 and 3 correspond to the thousands, hundreds, and tens digits respectively. The weighted binary values $2^0$—$2^3$ are found in tracks 1—4 of each character. When the tape was originally recorded at the well site, the same tape may have been utilized for recording data derived from more than one run through the borehole. One particular tape recorder for providing this interlacing of well logging data is shown in U.S. Pat. No. 3,360,774 granted to J. S. Smith et al. on Dec. 26, 1967. Thus, the data on the tape will be depth synchronized even though the data was obtained on different runs in the borehole. In recording this data, the tape recorder inserted "run number marks" in a given character of track 6 of each depth word for each run through the borehole that was recorded on the tape. More particularly, character 1 corresponds to run number 1, character 2 to run number 2 and character 3 to run number 3. Thus, if the data on a given tape was obtained by three separate runs in the borehole, there will be a binary "1" in all three characters of track 6 of the depth word. Additionally, there will be a "1" in track 6 of word 1 for identification files. Track 7 is again set aside for parity in the depth word.

Now referring to FIG. 3C, there is shown the tape format for the tape sync word, which always occur in word 12. To indicate a tape sync word, "1's" are recorded in tracks 5 and 6 of the third character of each tape sync word. A well logging data word may or may not also be recorded in the tape sync word and parity is again recorded in track 7 of all three characters. If the particular tape contains the so-called "Regular logging" data, word 12 of every frame will be a sync word. On the other hand, if CDM data is recorded on the tape, the sync word will be recorded during word 12 of every odd frame only.

Now, referring to FIG 4, there is shown a typical example of a frame of 12 data words as they might appear on the tape. It can be seen in FIG. 4 that word 1 is the depth word which occurs every 10 feet of borehole depth. That this particular word 1 of the frame shown in FIG. 4 is a depth word is apparent because of the depth marks recorded in characters 1 and 2 of track 6. The fact that characters are recorded in both characters 1 and 2 indicates that the data contained on this tape was derived from two separate runs in the borehole. It can be seen that in this FIG. 4 example, well logging data is recorded in words 3, 7, 9 and 11 only. The sync marks are shown in tracks 5 and 6 of character 3 of word 12.

Now concerning the detailed description of how the transmission equipment of the present invention operates, refer first to FIGS. 5A and 5B, which show the tape control circuits 42 in detail, in conjunction with the timing diagram of FIGS. 9A—9J. To make one complete view of the tape control circuits 42, FIGS. 5A and 5B are to be placed end-to-end horizontally with FIG. 5A on the left. The transmission equipment of the present invention has the capability of transmitting and receiving several different types of tapes, as well as transmitting only odd numbered words of each frame. The description of the transmission equipment when transmitting, receiving, and playing back Regular and CDM logging tapes will be discussed first before going into other formats. (NOTE: The "Continuous dipmeter tool" is sometimes referred to as the "powered dipmeter tool." However, the particular label is unimportant.)

Figure 9:
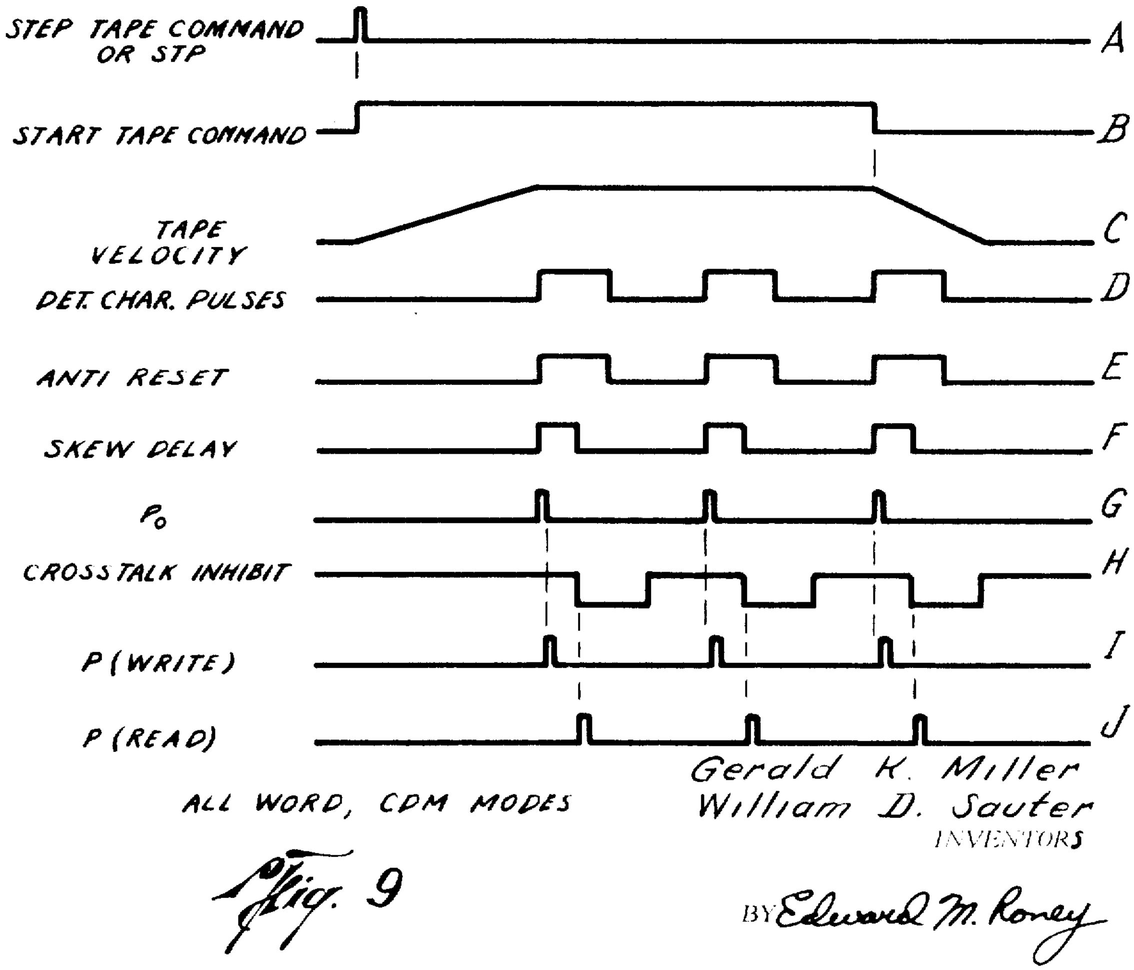

Before initiating a transmission, the tape should be positioned so that the tape heads are somewhere within the initial erased section. To initiate transmission, a start-stop switch 95 (FIG. 5A) is utilized. The start-stop switch 95 supplies a "1" to one position and a ground to the other position thereof, e.g. a "1" on the "stop" terminal and a ground on the "start" terminal. When moved to the other position, it reverses the "1" and ground, e.g., a "1" is then on the "start" terminal and a ground on the "stop" terminal.) When in the stop position, the "tape read register" 63 (FIG. 5B) and a "file length flip-flop" 97 (FIG. 5A) are held in the reset position. Upon the start-stop switch being moved to the start position, a "start pulse one-shot" 98 (FIG. 5A) is energized on the rising edge of the start signal to generate a "start pulse," designated STP shown in FIG. 9A. STP is applied to the dataphone interface to reset various circuits therein and is also utilized to set a "motor flip-flop" 98 via a pair of OR gates 99 and 100 (FIG. 5A). The normal output of the motor flip-flop 98 then supplies the "start tape command" of FIG. 9B to the motor driving circuit 46 of FIG. 1 so as to start the tape motor. The resulting tape velocity is shown in FIG. 9C.

Before proceeding with the description of the tape control circuits, it would first be desirable to describe how data is written and read off of the magnetic tape. Thus referring to FIG. 6, there is shown the track 1 write circuit 103 in detail, the tracks 2—7 write circuits being constructed identically the same. These write circuits are only operative when "tape head power" is supplied from the tape control circuits. The track 1 write pulses derived from the tape control circuits of FIG. 5 trigger a trigger flip-flop 105 on their leading edges. The normal and complementary outputs of the trigger flip-flop 105 cause suitable driving circuits 106 to pass current in one direction or the other through a write head coil 107. The particular direction of the current through the coil 107 depends on the state of the flip-flop 105.

Referring now to FIGS. 7A—7D to explain how this writing operation works, FIG. 7A shows a typical example of write pulses supplied to the track 1 write circuit 103 with the binary designations for this FIG. 7A example shown above the write pulses. FIG. 7B shows the current that passes through the write head 107 in response to the write pulses of FIG. 7A. It can be seen that the current in the coil will change direction each time a binary 1 is received by the trigger flip-flop 105. The resulting flux density in the tape is shown in FIG. 7C. Now, when the tape having the flux density pattern of FIG. 7C is passed by a read head coil, the voltage developed in the read head coil will be as shown in FIG. 7D since a voltage is induced in the read head coil each time it passes a "change in flux density" in the tape. The resulting binary representations for this read head voltage of FIG. 7D are shown below the read head voltage waveforms and correspond with the binary representations of the original data word of FIG. 7A, as expected.

Now referring to FIG. 8, there is shown the track 1 read circuit 114 in detail, the tracks 2—7 read circuits 115—120 being identically the same therewith. A read head coil 121 senses the changes in magnetic flux density in the tape as it passes by, and supplies the resulting read voltage pulses to an amplifier 122 which provides a ground reference potential for these read head voltage pulses. Since the voltage pulses induced in the read head 121 can be of either polarity, a full-wave rectifier 123 is utilized to convert all of the pulses to one polarity and supplies them to the signal input of a voltage comparator 124. The voltage comparator 124 compares these read head voltage pulses with a reference voltage set at a level to accurately detect where a magnetic mark (i.e., a change in magnetic flux) has in fact occurred, and thus ignore noise.

The resulting output pulse from voltage comparator 124 is supplied to one input of a NAND gate 125, the other input thereto being a "crosstalk inhibit signal" from the tape control circuits of FIG. 5. This "crosstalk inhibit signal" is normally at the "1" level, and thus the output of NAND gate 125 will go to "0" forcing the output of a NAND gate 126 to the "1" level. The output of NAND gate 126 represents the output of the track 1 read circuit. The output of the tracks 1—7 read circuits 114—120 are all supplied via an OR gate 127 to the tape control circuits of FIG. 5 as the signal designated "detected character pulse." Additionally, the outputs from each read circuit are supplied to the tape control circuits as the "Read Pulses" for each track. These "Read Referring back to FIGS. 5A and 5B, the leading edge of this "detected character pulse" energizes an "antireset one-shot" (FIG. 5A) which supplies the "antireset signal" of FIG. 9E back to the write circuits of FIG. 8. The leading edge of this "antireset signal" energizes a "skew delay one-shot" 133 whose trailing edge energizes a "crosstalk inhibit one-shot" 136 (See FIG. 9F). The output of the "crosstalk inhibit one-shot" 136 is normally at the "1" level until energized, at which time it goes to the "0" level, as shown in FIG. 9H.

Briefly referring back to FIG. 8, this "antireset signal" is supplied to one input of another NAND gate 129 which is connected in back-to-back fashion with the NAND gate 126. Since the output of NAND gate 126 is presently at the "1" level (because the output of NAND gate 125 is "0") and the "antireset signal" is now at the "1" level, the output of NAND gate 129 will go to the "0" level to force the output of NAND gate 126 to the "1" level for the time duration of the "antireset signal," as shown in FIG. 9D. Thus, it can be seen that the track 1 read circuit output will be at the "1" level for the duration of the "antireset signal" provided a magnetic mark had been detected in the first place.

The "crosstalk inhibit signal," when it goes to the "0" level, effectively inhibits the detection of any further magnetic marks by forcing the output of NAND gate 125 to the "1" level. Since the "crosstalk inhibit signal" is not generated until after a delay for skew as shown in FIGS. 9F and 9H, the read circuits will not be inhibited until after this delay for skew so as to insure that any magnetic marks on the tape will be detected even if the read heads are askew with respect to the tape. Thus, with these "antireset," "skew delay," and "crosstalk inhibit" functions, the read circuits will be less sensitive to noise without producing errors due to skew, and yet the read circuits will provide a long time duration output signal once a magnetic mark is detected. Since the "antireset signal" performs this function for all of the read circuits, the output signals from all of the read circuits which have detected magnetic marks will be turned off (go to "0") at the same time. (However, these output signals may not all be turned on (go to "1") at the same time because of skew.)

Now referring back to FIG. 5, the leading edge of the pulse generated from the "skew delay one-shot" 133 energizes a "$P_o$ one-shot" 134 (FIG. 5A). The trailing edge of the $P_o$ pulse, shown in FIG. 9G, is utilized to advance a character counter 135 (FIG. 5A), which produces five output signals designated PW1, PW2, PW3, PR3+6 and PW3+6. A "permit writing pulse" (PWP) is generated from an AND gate 142 to strobe the character counter 135 for producing the character counter output signals PW1, PW2, PW3, and PW3+6. These are utilized by the tape control circuits to read or write data on the tape. When reading data from the tape, it is necessary to not generate these "permit writing pulses" (PWP) until after the read circuits for all of the tape tracks have had enough time to determine if there is a magnetic mark in their respective tracks. To this end, when reading data off of the tape for transmission, the "crosstalk inhibit signal" is inverted by an inverter 137 to produce a positive going pulse whose leading edge energizes a delay one-shot 138 by way of an AND gate 139. The AND gate 139 is enabled during the reading of data by a read-write switch 140 which is in the "read" position for transmission of data. The trailing edge of the output pulse from the delay one-shot 138 energizes a "P one-shot" 141 whose output pulse shown in FIG. 9J, is supplied to the AND gate 142 to produce the PWP pulses. (In the transmit mode of operation, the "permit writing" input signal to AND gate 142 is always at the "1"level.) By this means, the PW1, PW2, and PW3 pulses which are coincident with the PWP pulses, will not be generated to read data off of the tape until it is insured that the read circuits for each track have had an opportunity to detect whether or not a magnetic mark is present. The description of how these PWP pulses are generated when data is to be written on tape will be deferred until the receiving mode of operation is discussed.

Figure 10:
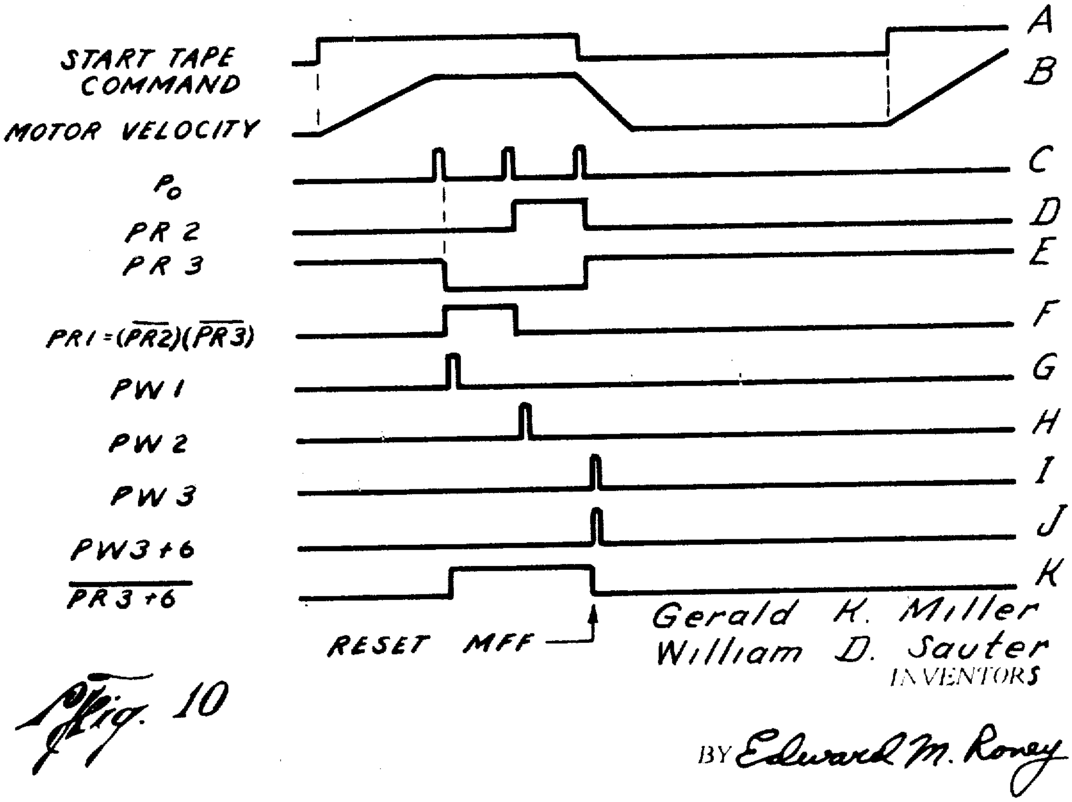

Now concerning how data is read from the tape, when Regular or CDM data is being processed, the character counter 135 will generate a separate inscribing pulse in response to each $P_o$ pulse, and thus in response to each magnetic mark detected on the tape. Looking at FIGS. 10A—10C, there are shown the "start tape command," motor velocity, and $P_o$ pulses respectively. The inscribing pulses, designated PW1, PW2, and PW3 to correspond with character 1, character 2 and character 3 are shown in FIGS. 10G—10I respectively. In addition, the character counter 135 generates a pulse PW3+6, shown in FIG. 10J, which is coincident with the third character inscribing pulse PW3 in the Regular and CDM modes of operation. The character counter 135 also generates a pulse designated $\overline{PR3+6}$ which is at the "1" level from the leading edge of the first character inscribing pulse PW1 to the leading edge of the third character inscribing pulse PW3.

Now referring back to FIGS. 5A and 5B, the trailing edge of the $\overline{PR3+6}$ pulse resets the motor flip-flop 98 via an OR gate 143. (FIG. 5A) Thus, it can be seen that, in the regular and CDM modes, each time the motor flip-flop 98 is set, the three inscribing pulses PW1, PW2 and PW3 will be generated from the character counter 135 and the motor flip-flop 98 will be reset substantially simultaneously with the generation of the third character inscribing pulse PW3.

Now returning to the discussion of the initiation of a transmission, it will be recalled that, to begin a transmission, the tape was first set in the middle of the initial erased section and the start-stop switch 95 was moved to the start position to set the motor flip-flop 98. Since the tape heads are now in the middle of the initial erased section, no magnetic marks will be detected and thus there will be no $P_o$ pulses to advance the character counter 135. Thus, the motor flip-flop 98 will not be reset by the trailing edge of $\overline{PR3+6}$, there being no $\overline{PR3+6}$.

The tape control circuits act to inform the dataphone interface that a data gap in the tape was detected, and additionally, whether the gap was a record or file gap. To this end, a gap delay circuit 144 produces an output signal indicative of the detection of a gap by determining if the tape has moved for a given time (and thus for a given distance) without detecting a magnetic mark. To accomplish this, the normal output of the motor flip-flop 98 is supplied to the gap delay circuit 144 via an inhibit gate 145 which inhibits the application of a voltage to the gap delay circuit 144 if detected character pulses are being generated from the read circuits of FIG. 8. The gap delay circuits 144 could suitably comprise a shunt capacitor which charges up through a series resistor connected to the output of the inhibit gate 144 at a desired rate, and a Schmitt trigger for generating an output signal upon the charge on the capacitor building up to a given voltage level. This output signal from the gap delay circuit 144 energizes a detected gap one-shot 146 which supplies a signal designated "detected gap" to the dataphone interface 43 of FIG. 1.

Another delay circuit 147, designated "file gap delay circuit," is responsive to the motor flip-flop 98 being set for a sufficiently long time interval to energize a "file gap one-shot" 148 to supply a signal designated "detected file gap" to the dataphone interface. The file gap delay circuit 147 is identical in construction to the gap delay circuit 144 except that the delay time is substantially greater. In effect, a "detected gap" signal is generated for the case of record gas and both this signal and the "detected file gap" signal are generated when file gaps on the magnetic tape are detected since file gaps are substantially longer than record gaps. By this means, the tape control circuits of FIG. 5 can indicate to the dataphone interface what sort of a gap is presently being read.

Eventually the first file (i.e., the identification file) will reach the tape heads. When this happens, the "detected character pulses" from the read circuits of FIG. 8 will cause the generation of $P_o$ pulses from one-shot 134 to advance the character counter 135. After three such characters on the tape have been detected, the "motor flip-flop" 98 will be reset to stop the tape motion. These first three characters represent the first data word of the identification file, which are read from the tape and stored in the tape read register 63. To accomplish this, the tracks 1—4 read circuit outputs from the read circuits of FIG. 8 are supplied to a decoder 149 which acts to place the bits read off of the tape in the proper stages of the tape read register 63 in response to the three character inscribing pulses PW1, PW2 and PW3.

Figures 11A, 11B, 11C, 11D, 11E, 11F:
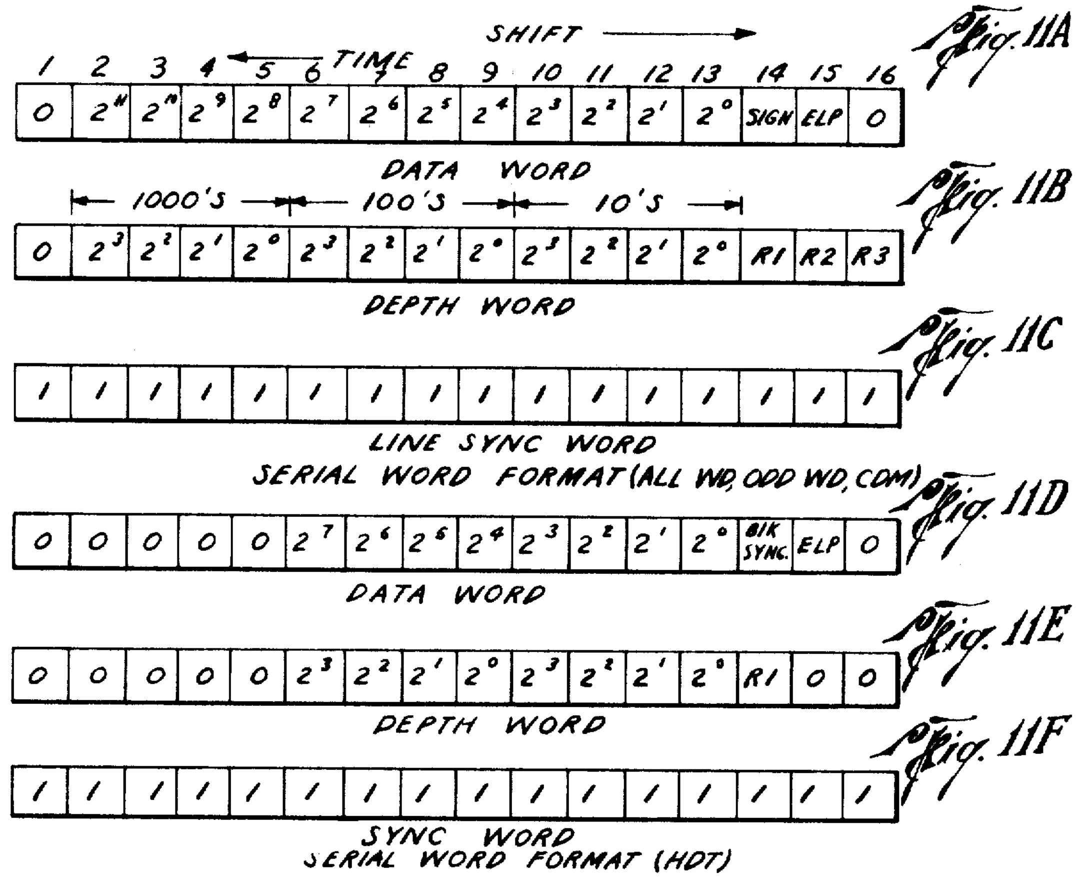

Before proceeding with the description of the circuits for converting the data read off of the tape from the tape format to the serial or shift register format for transmission, it would first be desirable to understand what the serial format is. Referring to FIG. 11A, there is shown the serial format for a well logging data word. It can be seen that the first and 16th shift register stages are superfluous, always having "0's" contained therein. The second through 13th stages contain the weighted binary representations $2^0$—$2^{11}$ and the 14th and 15th stages contain the signal and even line parity bit respectively. (The even line parity bit is not inserted until each data word reaches the X/R register 67.) In the serial format, word parity is even as opposed to the tape format where the character parity is odd.

Referring to FIG. 11B, there is shown the serial word format for the depth word, which is always word 1. It can be seen that the last three stages are set aside for the run 01, run 02 and run 03 designations respectively. Stages 2—13 are set aside for the binary coded decimal representations, as shown. The sync word, as shown in FIG. 11C, has a "1" in all 16 stages.

Now referring to FIGS. 3A—3C, 5B, 11A and 11B in conjunction, it can be seen that the character 1 inscribing pulse PW1 energizes the decoder 149 so as to connect the tracks 4—1 read circuit outputs to the tape read register stages 2—5 respectively; the PW2 inscribing pulse energizes the necessary gates of decoder 149 so as to connect the tracks 4—1 read circuits to shift register stages 6—9 respectively; and the character 3 inscribing pulse PW3 energizes those gates in the decoder 149 that connect the tracks 4—1 read circuits to shift register stages 10—13 respectively. The sign bit which is recorded in track 5 of character 2 (See FIG. 3A) is placed in stage 14 via an OR gate 150a by the character 2 inscribing pulse PW2 strobing an AND gate 150 so as to connect the track 5 read circuit to the 14th shift register stage. The even line parity bit of stage 15 is inserted into the serial word by the dataphone interface circuits and thus, while in the tape read register 63, the 15th stage always has a zero contained therein for data words.

For depth words, the decoder circuits 149 are again responsive to the three character inscribing pulses PW1, PW2 and PW3 to convert the tape depth word format of FIG. 3B to the serial format of FIG. 11B in the same manner as for data words. However, from FIG. 3B it can be seen that there are depth marks recorded in one or more characters of track 6 to designate the run number. The three character inscribing pulses PW1, PW2 and PW3 strobe three AND gates 151, 152 and 153 respectively to connect the track 6 read circuit to each one of the first three shift register stages in accordance with the depth word format of FIG. 11B.

Recalling from FIG. 3C that sync marks are recorded in tracks 5 and 6 of character 3 to designate a sync word, a complemented track 5 read output, $\overline{TR\text{-}5\ READ}$, from an inverter 128 of FIG. 8 is also connected to the inputs of all three AND gates 151, 152 and 153 to inhibit these AND gates if a magnetic mark is detected in both tracks 5 and 6. This will prevent a sync word being mistaken for a depth word. An OR gate is responsive to stages 14—16 of the tape read register 63 to supply a signal designated "detected depth read" to the dataphone interface to inform it when a depth word has been read off of the tape.

To detect a sync word on the tape, the tracks 5 and 6 read circuits are connected to the input of AND gate 54 as well as the "read" signal from the read-write switch 140. The AND gate 154 is strobed by the "permit writing pulse" (PWP) to produce the signal designated "detected tape sync." This "detected tape sync" signal is supplied to the dataphone interface for purposes to be discussed later and is also utilized to reset the character counter 135 to the proper state via an OR gate 155 and to reset the "motor flip-flop" 98. By so doing, a periodic check is maintained on the states of the character counter 135 and the motor flip-flop 98. At the time the sync marks are detected, the character counter 135 should be in the condition such that the next $P_o$ pulse will cause the generation of the first character inscribing pulse PW1 and the tape should be stopped. It should also be mentioned here that the "start pulse" STP generated from the "start pulse one-shot" 96 also resets the character counter 135 to its initial condition state via the OR gate 155 to insure that the first inscribing pulse generated is PW1.

At this point in time, with the first data word of the identification file sitting in the tape read register 96 and the motor flip-flop 98 in the reset state because of the $\overline{PR3+6}$ signal from the character counter 135, nothing else happens until a "-transmit next file" button is pushed. However, before continuing with the operation, it would first be desirable to briefly discuss how the telephone company dataset operates. By utilizing a phase comparison technique where the phase of one signal is compared with the phase of the last preceding received signal, two bits at a time are transmitted over the telephone line. This is called "dibit transmission." When transmission is initiated, the transmitting and receiving datasets must establish phase synchronism, perhaps better defined as bit synchronism. The dataset provides the dataphone interface with a serial clock which is used to shift data to or from the dataset. Since two bits at a time are transitted, the dataphone interface starts supplying bits to the dataset in synchronism with a "dibit clock" which the dataset provides it (not the "serial clock").

Concerning now the next step to be taken to transmit the data over the telephone line, refer to FIG. 12 which shows transmit control circuits for controlling the transmission of data over the telephone line and FIGS 13A—13K which show the timing diagrams of the operation of the FIG. 12 circuits. When the start-stop switch 95 of FIG. 5A was in the stop position, the start signal which is supplied to one input of a NAND gate 163 was at the "0" level, thus forcing the output of NAND gate 163 to the "1" level. This output of NAND gate 163 is supplied to one input of another NAND gate 164, the other input thereto being supplied from the "transmit next file button" 165 which supplies a "0" to the NAND gate 164 when closed. The NAND gates 163 and 164 comprise a "-transmit next file flip-flop."

With both inputs to the NAND gate 164 at the "1" level (an open circuit constitutes a "1" for NAND gates), the output of NAND gate 164 is at the "0" level. After inversion by an inverter 166, the "transmit next file flip-flop" will hold an "end of transmission flip-flop" 167 and "request to send flip-flop" 168 in the reset states. The complementary output of the "request to send flip-flop" 168 will then hold a "synchronized clear to send flip-flop" 172 and "transmit data flip-flop" 173 reset.

Figure 13:
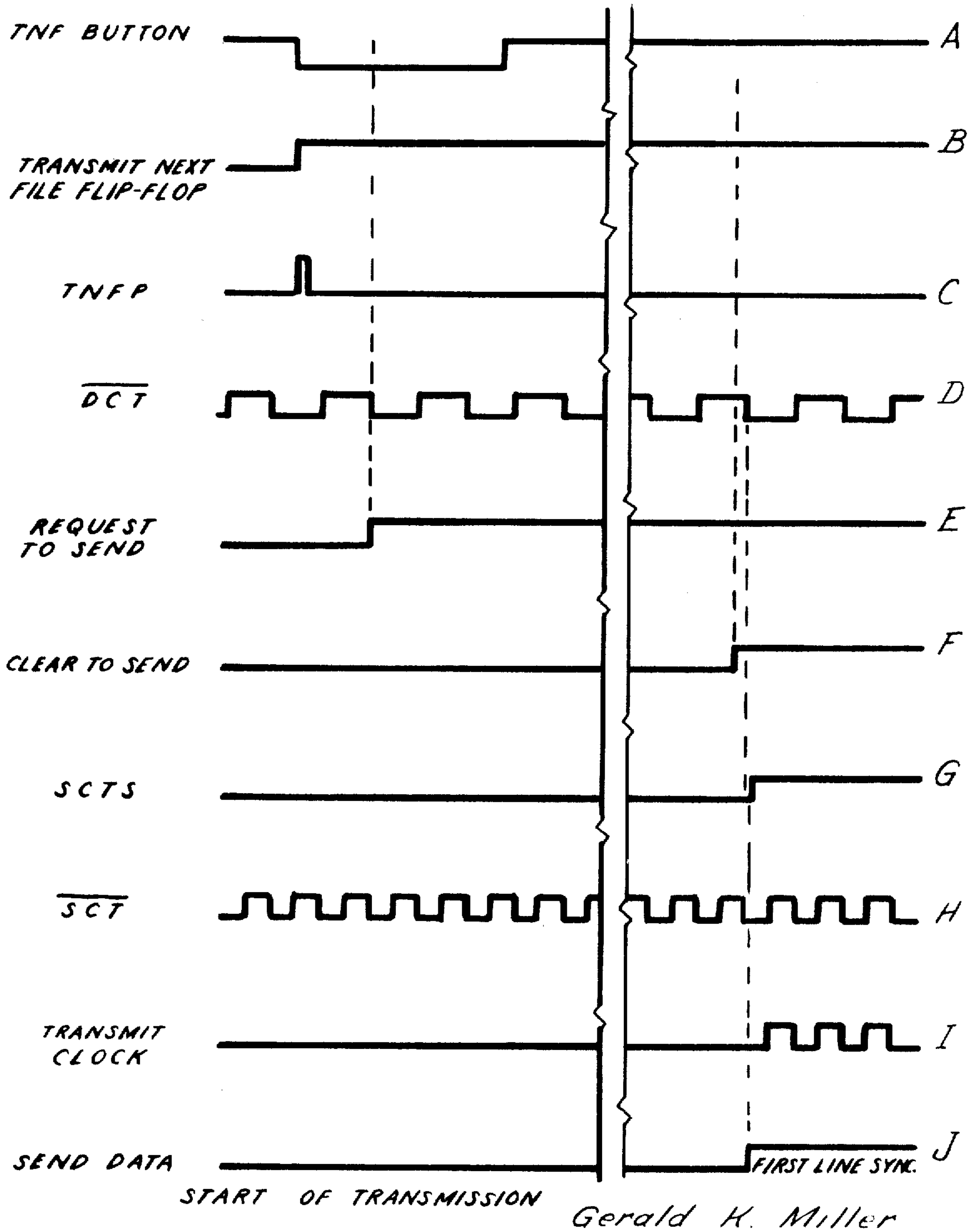

Now when the start-stop switch 95 of FIG. 5A is moved to the start position, the "transmit next file flip-flop" 169 will still be in the reset state because the normal output of the "request to send flip-flop" 168 is still at the "0" level (the normal output of the "request to send flip-flop" 168 is another input to NAND gate 163). When the "transmit next file button" 165 is pressed down, as represented in FIG. 13A, the output of the NAND gate 164, and thus the output of the "transmit next file flip-flop" 169 will go to the "1" level as shown in FIG. 13B. This will remove the resets on the "end of transmission flip-flop" 67 and "request to send flip-flop" 168. The rising edge of the output of the "transmit next file flip-flop" also energizes a "transmit next file one-shot" 170 which generates the "-transmit next file pulese" of FIG. 13C to reset various circuits within the dataphone interface. The output of the NAND gate 164 going to "1" enables an AND gate 171 whose other input is the dibit clock transmit ($\overline{DCT}$) signal from the telephone company dataset. (See FIG. 13D)

To synchronize with the dibit (two bits at a time) transmission, the first falling edge of the $\overline{\text{dibit clock transmit}}$ signal sets the "request to send flip-flop" whose normal output supplies the "request to send" signal of FIG. 13E to the telephone company dataset. (A mode selector switch 70G grounds the "request to send" line in the "received" mode of operation.) The "request to send" signal also causes the "transmit next file flip-flop" 169 to remain in the set state even after the "-transmit next file button" 165 is released. (It is therefore necessary to hold the transmit next file button 165 down for a short time interval to insure that the "transmit next file flip-flop" 169 has been set.) When the telephone company dataset receives the "request to send" signal from the dataphone interface, it places a carrier signal on the telephone line to establish bit synchronism with the receiver at the other end. As soon as synchronism between the transmitter and receiver is established, the telephone company dataset will supply a "clear to send" signal, shown in FIG. 13F, to one input of an AND gate 174 which enables the $\overline{\text{dibit clock transmit}}$ signal from the dataset to set the "synchronized clear to send flip-flop" 172 on its first falling edge.

The normal output of the "synchronized clear to send flip-flop" 172 enables an AND gate 175 which passes a signal designated "serial clock transmit" ($\overline{SCT}$), shown in FIG. 13H, from the telephone company dataset. The output of AND gate 175 is designated "transmit clock" and is utilized to shift the data contained in the transmit/receive register 67 (hereinafter called X/R register) to the telephone company dataset on its falling edges. This "transmit clock" signal is shown in FIG. 13T. To insure that the dataphone interface circuits have sufficient time to stabilize before the first bit is shifted out of the X/R register 67, a capacitor 176 is placed on the output of the AND gate 174 so that the "synchronized clear to send flip-flop" 172 is not set until after the falling edge of the $\overline{DCT}$ signal, which sets it in the first place, has passed. This delay can be seen in FIG. 13C which shows the "synchronized clear to send signal" and FIG. 13I which shows the delay before the "transmit clock" signal is generated. By utilizing the $\overline{DCT}$ signal to set the "synchronized clear to send flip-flop" 172, the shifting of bits to the dataset will be in synchronism with the dibit transmission.

Before describing how the first data word which is still sitting in the tape read register 63 of FIG. 5B is transferred to the X/R register 67, it is first necessary to describe various circuits contained in the dataphone interface 43. The dataphone interface is shown on three separate sheets of the drawings. FIG. 14 shows how the dataphone interface circuits of FIGS. 15A, 15B and 15C are to be positioned with respect to one another to make a complete diagram of the dataphone interface circuits.

Now referring to FIG. 15B of the dataphone interface circuits, the transmit control circuits 182 of FIG. 12 make up a portion of the interface circuits of FIG. 15B. The "transmit clock" signal generated from the transmit control circuits 182 is supplied to the X/R register 67 via an OR gate 183 (FIG. 15C) so as to shift the data out of the X/R register 67 back to the transmit control circuits 182 for application to the telephone company dataset. Remembering from FIGS. 11A—11C that the serial word format utilizes 16 bits per word, to keep track of the words that are being transmitted, the "transmit clock" pulses are counted by a bit counter 184 which receives them by way of an OR gate 185. (FIG. 15A) Since the X/R register 67 shifts data on the trailing edge of the transmit clock pulses, the bit counter 184 advances in response to the trailing edge of the "transmit clock" signal also. The bit counter 184 can comprise a suitable four stage binary counter with the normal output of the last stage comprising the output of the bit counter itself. Thus, the output of the bit counter will change states every eight bits and thus the falling edge of the output pulse will occur every 16 bits.

As seen in FIG. 15A, this trailing edge from the bit counter 184 energizes a delay one-shot 185 via the "X-MIT" (transmit position of a mode selector switch 70*b*, which is mechanically ganged with the mode selector switch 70*a* of FIG. 1. The signal on the wiper arm of the mode selector switch 70*b* is designated $X_0$, the trailing edge of the output pulse $X_1$ from delay one-shot 185 energizes a "$X_2$ one-shot" 186 which generates a pulse designated $X_2$. The trailing edge of the $X_2$ pulse energizes a "$X_3$ one-shot" which generates a pulse designated $X_3$ and the trailing edge of $X_3$ energizes a "$X_4$ one-shot" which generates a pulse designated $X_4$. These pulses $X_0$, $X_1$, $X_2$, $X_3$ and $X_4$ are utilized for various timing functions in the dataphone interface circuits, which will be discussed later.

Figure 16:
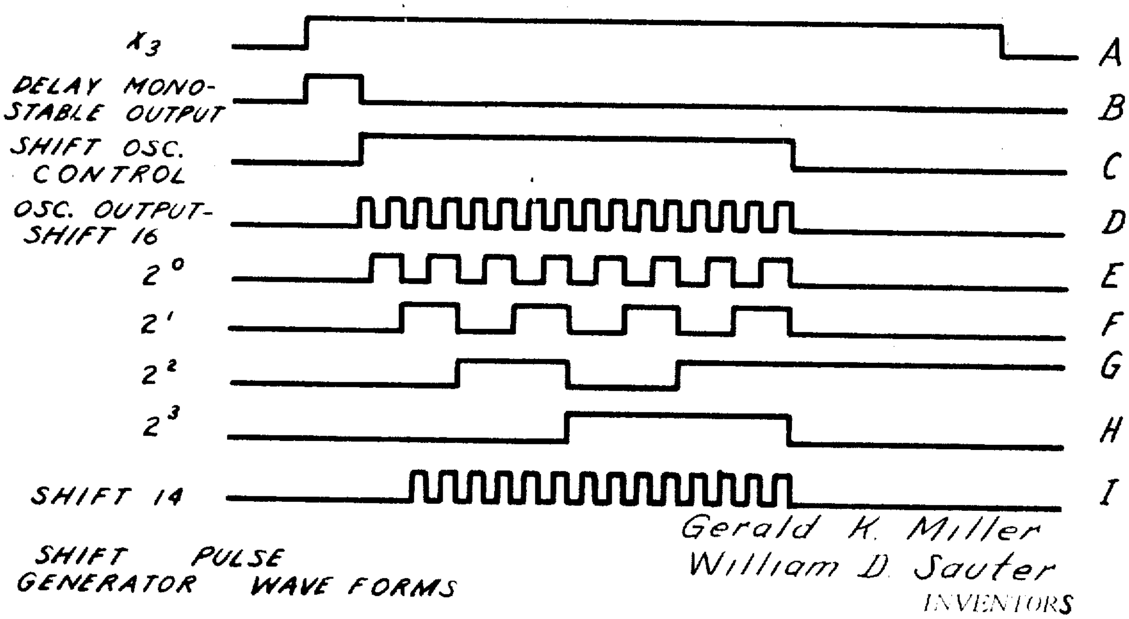

The dataphone interface circuits of FIG. 15B also include circuitry for generating high frequency shift pulses for shifting data between the dataphone interface 43, tape control circuits 42, playback circuits 50, and display circuits 52. To this end, the leading edge of the timing control pulse $X_3$, shown in FIG. 16A, sets a "shift oscillator control flip-flop" 201 after a suitable delay by a delay one-shot 200, as shown in FIGS. 16B and 16C. Since $X_3$ is utilized as a data transfer window, the delay insures that the generated shift pulses occur after the initiation of the window. The normal output of the "shift oscillator control flip-flop" 201 enables a "shift pulse oscillator" 202 to generate a plurality of shift pulses shown in FIG. 16D. These shift pulses are counted by a four stage binary counter 203, whose fourth stage resets the "shift oscillator control flip-flop" 201 after 16 shift pulses have been counted. The output pulse waveforms from the four stages of binary counter 203 are shown in FIGS. 16E—16H respectively. As will become apparent later, it is also desirable to generate 14 shift pulses coincident with the last 14 shift pulses from the shift pulse oscillator 202. To accomplish this, the last three stages of binary counter 203 are combined in an OR gate 204 to enable an AND gate 205 to pass only the third through 16th shift pulses from oscillator 202. These 14 shift pulses from AND gate 205 are shown in FIG. 16I. By comparing FIGS. 16D—16I, it can be seen how this occurs.

The dataphone interface circuits also keep track of which word is being processed in the transmission equipment during any given time interval. To accomplish this, a sequence counter 189 (FIG. 15A) is utilized to count each serial word indication (i.e., falling edge of $X_0$) from the bit counter 184. To this end, a first "divide by 2" stage 190 of the sequence counter 189 is triggered on the trailing edge of the $X_0$ pulses. The trailing edge of the output pulses from the divide by 2 stage 190 energizes a three stage "divide by 6" counter 191 via an AND gate 192 and OR gate 193. For regular and CDM tapes, the $\overline{odd}$ signal applied to the other input of the AND gate 192 will be at the "1" level. The output of the AND gate 192 as well as the outputs from the three stage "divide by 6" counter 191 are applied to a binary-to-decimal matrix 194 (FIG. 15A) which converts the binary representations from the sequence counter 189 to decimal representations. Thus, the sequence 1 output only will be at the "1" level during the 16 bits corresponding to sequence 1; the sequence 2 output line only will be at the "1" level during the next 16 bits corresponding to the next sequence, etc.

Before proceeding with the discussion of the remainder of the FIG. 15 circuitry, it would first be desirable to explain the distinction between a sequence and a word. A "sequence" is a basic unit of time utilized in the transmission equipment of the present invention, while a "word" is data written on the tape or being processed in the transmission circuits, or transmitted. The transmission equipment utilizes 12 sequences in all, 12 sequences being equal to one "frame" of data. There will always be 12 sequences during each frame but there may not always be a word processed in each sequence (one exception to this will be discussed later). To establish uniformity of nomenclature between the words and sequences, the sequence at the transmitter during which a word is transmitted over the telephone line will be numbered the same as the word. On the other hand, at the receiver, the sequence during which a word is recorded on tape will be numbered the same as the word being recorded. Since the telephone transmission equipment of the present invention reads a word off of tape one sequence before it is transmitted, word 5, for example, would be read off of the tape during sequence 4 and transmitted during sequence 5. At the receiver, word 5 will be received during the receiver's sequence 4 and recorded during the receiver's sequence 5. Thus, the receiver is one sequence behind the transmitter.

Referring to FIG. 15B, the trailing edge of the sequence 12 output signal from the matrix 194 triggers an "even frame flip-flop" 195, which is the first stage of a frame counter 180. Each time the normal output of the "even frame flip-flop" 195 falls, a binary counter 196 is advanced by one count. The normal output of the "even frame flip-flop" and the outputs of the various stages of the binary counter 196 are applied to a binary-to-decimal matrix 197 which produces a "1" on three output leads designated 3, 4 and 20 during the third, fourth and 20th frames respectively. These third, fourth and 20th frame signals are supplied to the transmit control circuits 182 and to the receive control circuits 195.

The sequence counter 189 and frame counter 180 are initially placed in their proper initial states by the "start pulse" STP from the tape control circuits. For regular or CDM logging tapes, the STP pulse sets the sequence counter 189 to sequence 12 by way of an AND gate 206, whose other input is the control signal "$\overline{\text{ODD WORD}}$" from an inverter 207, which in turn is responsive to the control signal "ODD WORD" from the selector switch 181. When the format selector switch 181 is in the CDM position, an AND gate 208 is enabled to allow STP to set the "even frame flip-flop" 195 to the even frame position. The "transmit next file pulse" (TNFP) from the transmit control circuits 182 then resets the sequence counter 189 to sequence 1 by way of a pair of OR gates 178 and 179 and the frame counter 196 to zero ("even frame flip-flop" 190 to "odd frame") by way of the OR gate 178 so that the first transmitted word will be word 1 of frame 1. Additionally, the bit counter 184 is reset to zero by way of the OR gate 178 and another OR gate 177. Both the STP and TNFP resets occur once at the initiation of transmission (TNFP at initiation of each file). (Actually, the STP reset is not absolutely necessary since TNFP resets these circuits again.)

The counters are periodically checked for synchronism by the "detected tape sync" signal from the tape control circuits. It will be recalled that for regular logging tapes, this tape sync occurs every word 12 and for CDM tapes, it occurs during word 12 of odd frames only. The "detected tape sync" signal from the tape control circuits resets the sequence counter 189 to sequence 11 by way of an AND gate 222 which is enabled by the control signal "$\overline{\text{ODD WORD}}$" for regular, CDM and HDT tapes. (The sequence counter 189 is reset to sequence 11 since word 12 is read off of tape one sequence earlier, i.e., during sequence 11.) Since the tape sync is recorded only in odd frames of CDM tapes, the "detected tape sync" signal, in addition to resetting the sequence counter 189 to sequence 11, resets the "even frame flip-flop" 195 to the "odd frame" position by way of an AND gate 232 enabled by the control signal CDM.

Now concerning the transmission of line sync words, when transmitting a regular logging tape, a line sync word consisting of all 1's is transmitted as word 1 during every sequence 1 unless a depth word is transmitted. To this end, the sequence 1 signal from the matrix 194 is supplied to the transmit control circuits 182 via an AND gate 198 as the "line sync sequence" signal. The other input to AND gate 198 is derived from the output of an OR gate 199, whose inputs are the control signal $\overline{\text{CDM}}$ derived from the transmission format switch 181 and the complementary output of the "even frame flip-flop" 195. When regular well logging data is being transmitted, the $\overline{\text{CDM}}$ signal will be at the "1" level and thus the "line sync sequence" signal will 1"1" during every sequence 1. On the other hand, during the transmission of a CDM tape, the $\overline{\text{CDM}}$ control signal is at the "0" level so that the "line sync sequence" signal will be generated only during sequence 1 of every odd frame during transmission of CDM tapes.

Now referring back to the transmit control circuits of FIG. 12, it will be recalled that the discussion left off with the first data word of the identification file still sitting in the tape read register 63 of the tape control circuits, and the transmit next file button 165 had been energized to allow the transmitter and receiver to obtain synchronism with one another. After synchronism was established, the "synchronized clear to send flip-flop" 170 was set shortly after the "clear to send" signal was received from the dataset, thus allowing the "transmit clock" to be supplied to the transmit receive register 67 and the bit counter 184 of FIG. 15. It will also be recalled that the tape control circuits of FIG. 5 had generated both a "detected gap" signal and a "detected file gap" signal to the dataphone interface since the tape had initially been placed with the tape heads in the middle of the initial erased section.

The leading edge of the "detected gap" signal from the tape control circuits is utilized to set a "gap detector flip-flop" 210 whose normal output is supplied to one input of a NAND gate 211 and one input of an AND gate 212. The leading edge of the "detected file gap" signal from the tape control circuits resets the "gap detector flip-flop" 210 which causes its complementary output to enable an AND gate 213. Thus, the "gap detector flip-flop" 210 memorizes whether the detected gap was a record gap or a file gap.

Every time a transmission is initiated, the receiving equipment will automatically make a gap on the magnetic tape at the receiving end until the transmitter tells it to start writing data on the tape. During the transmission of a gap, the transmitter will transmit a sync word during sequence 1 of every frame but will transmit all "0's" during sequences 2—12. The transmitter signals the receiver whether a record or file gap is being transmitted by the presence or absence of a sync word during the third frame of transmission. The absence of a sync word during the third frame indicates a record gap and the presence of a sync word during the third frame indicates a file gap. By so doing, the receiver can prepare itself to begin writing data at precisely the right time.

Now with the "synchronized clear to send flip-flop" 172 in the set state and the "transmit data flip-flop" 173 still in the reset state, an AND gate 220 is enabled to produce a "1" every time the "line sync sequence" signal goes to the "1" level at this time. The other input to the AND gate 211 is at the "1" level. The output of the AND gate 220 is supplied to one input of an OR gate 221 whose output is the "send data" signal which is supplied to the telephone company dataset. This "send data" signal constitutes the PCM data to be transmitted by the dataset 44. Another way of saying this is that the dataset 44 periodically samples the voltage on the "send data" line.

Since, for regular logging tapes, the "line sync sequence" signal is "1" during every sequence 1 of every frame, which is the sequence during which word 1 is transmitted, word 1 will consist of 16 "1's" (i.e., a sync word). When transmitting CDM tapes on the other hand, the "line sync sequence" signal will go to the "1" level during sequence 1 of odd numbered frames only and thus the CDM sync word will be transmitted during sequence 1 of odd numbered frames only.

To terminate the transmission of a gap at the right time, one of the AND gates 212 or 213 is enabled by either the normal or complementary outputs of the "gap detector flip-flop" 210 to allow the trailing edge of either the "4th frame" or "20th frame" signals from the matrix 197 to set the "transmit data flip-flop" 173. Thus, if a record gap is being transmitted, data can be transmitted after a 4 frame gap and if a file gap is being transmitted, data can be transmitted after a 20 frame gap.

If a record gap was detected on the tape, the normal output of the "gap detector flip-flop" 210 supplies a "1" to the input of the NAND gate 211 so that during sequence 1 of frame 3 (the sequence 1 and frame 3 signals are the other two inputs to NAND gate 211), the AND gate 220 is disabled so as to inhibit the generation of the sync word during frame 3. On the other hand, if a file gap was detected, the normal output of the gap detector 210 is at the "0" level thus maintaining the AND gate 220 enabled during sequence 1 of frame 3 so as to transmit a sync word at that time. By so ding, the receiver is informed of what type of gap is being transmitted.

Now with the "transmit data flip-flop" 173 set, the AND gate 220 is permanently disabled by the complementary output of the "transmit data flip-flop" 173 going to "0" and a plurality of AND gates 214—217, 233 and 234 are enabled to supply various control signals throughout the transmission equipment and to enable the transmission of data. The AND gate 215 is enabled to pass the timing control signal $X_2$ to produce the pulse designated "step tape (X-MIT)," which is utilized to set the "motor flip-flop" of the tape control circuits. The AND gate 216 passes the timing control pulse $X_3$ to produce the signal designated "shift tape read register window." The AND gate 214 passes the timing control pulse $X_4$ to produce the signal designated "transfer X/R register pulse." The AND gate 217 produces the signal designated recorder motion (X-MIT)," except when in either the CDM or HDT mode. This $\overline{CDM+HDT}$ is derived in FIG. 15B from an inverter 218 whose input is derived from the CDM and HDT positions of the format selector switch 181 via an OR gate 219.

Referring back to FIGS. 15A—C, the "step tape command (X-MIT)" signal from the transmit control circuits 182 is passed via the X-MIT position of a mode selector switch 70*c*, which is mechanically ganged with the mode selector switches 70*a* and 70*b*, to produce the "step tape command" signal which is passed to the tape control circuits. The "shift tape read register window (X-MIT)" is passed via the X-MIT position of a mode selector switch 70*d*, which is mechanically ganged to the mode selector switches 70*a*—70*c*, to produce the "shift tape read register window" for application to the tape control circuits.

Now referring back to the tape control circuits of FIGS. 5A and 5B, the "step tape command" signal from the dataphone interface is passed via an inhibit gate 223, which is disabled at this time, and an AND gate 224 and OR gate 100 to the set input of the "motor flip-flop" 98. The other input to AND gate 224 is the normal output of the "file length flip-flop" 97 which was set by the start pulse STP. With the motor flip-flop 98 set, the tape begins moving again. Now, with the tape moving, before any "detected character pulses" are generated from the read circuits of FIG. 8, the "shift tape read register window" from the dataphone interface enables an AND gate 225 which applies the 16 shift pulses from the oscillator 202 of the dataphone interface to the tape read register 63. This "shift tape read register window" also enables an AND gate 226 which passes the read PCM data from the tape read register 63 to the dataphone interface of FIG. 15.

Referring back to the dataphone interface circuits of FIG. 15C, the read PCM data from the tape control circuits of FIG. 5 is serially shifted to the transmit buffer register 66. The shift pulses for the transmit buffer register 66 are derived from an AND gate 228 which is enabled by the timing control pulse $X_3$ to pass 16 shift pulses from the oscillator 202. It will be recalled that the "shift tape read register window" occurred during $X_3$ to shift the data word out of the tape read register 63. Next, the "transfer X/R register window" from the transmit control circuits 182 enables a plurality of parallel gates 229 to parallel shift the data contained in the transmit buffer register 66 to the X/R register 67. Recalling from FIG. 11A that the shift register stage 015 contains the even line parity bit, an "even line parity X-MIT flip-flop" is triggered on the falling edge of each pulse of the read PCM data from the tape control circuits. This read PCM data is combined with the 16 shift pulses from AND gate 228 in an AND gate 227 for application to the trigger input of the parity flip-flop 230. Thus, the parity flip-flop 230 will change states one time for each "1 " in the read PCM data word from tape control circuits.

The parity flip-flop 230 is initially placed in the reset state by the timing control pulse $X_2$ which passes via an OR gate 231 to reset it. Thus, the normal output of the "even line parity flip-flop" will be "1 " at the end of the shifting operation if an odd number of 1's were present in the Read PCM data word transferred from the tape control circuits. This normal output of the parity flip-flop 230 is transferred via the parallel gates 229 to stage 015 of the X/R register 67 resulting in an even number of 1's therein. For depth words, the "even line parity flip-flop" 231 is held reset by the sequence 1 signal via the OR gate 231 so that the run 02 depth mark (see FIG. 11B) can be placed in stage 015 of the X/R register 67 for depth words. With the first data word contained in the X/R register 67, the shift pulses from the OR gate 183, which in the transmit mode are the "transmit clock" pulses, shifts the data out of the X/R register 67 back to the transmit control circuits 182.

Turning to the transmit control circuits 182 of FIG. 12, the X/R data from the X/R register 67 is supplied to one input of an AND gate 233, which is enabled by the "transmit data flip-flop" 173 which was set at the end of the gap. The PCM transmit data from AND gate 233 is supplied via the OR gate 213 to the telephone company dataset for transmission. A better way of looking at this is to say that the output of OR gate 221 rises or falls with each falling edge of the "transmit clock" shift pulses in accordance with the serial data word, and the dataset samples the output of OR gate 221 sometime between each shift.

To trânsmit the sync word in response to the "line sync sequence" signal from the AND gate 198 of FIG. 15B, the AND gate 234 is utilized. When the "transmit data flip-flop" 173 becomes set, the AND gate 234 is enabled to generate a sync word via the OR gate 221 whenever the "line sync sequence" signal goes to "1 ". This sync word is transmitted as word 1 of every frame in the transmission of regular logging tapes and in every odd frame during the transmission of CDM tapes, unless a depth word has been read off of the tape. Recalling from the discussion of FIG. 5B, that a signal designated "detected depth read" from the OR gate 157 is generated whenever a "1 " is placed in one of the last three stages of the tape read register 63, this "detected depth read" signal from the tape control circuits is supplied to one input of an AND gate 236 in the dataphone interface circuits of FIG. 15A. The other inputs to this AND gate are the sequence 1 signal from the matrix 194 and the timing control signal $X_1$. Thus, the AND gate 236 will reproduce the $X_1$ timing pulse only if the tape control circuits indicate that a depth word has been read off of the tape during sequence 1.

This $X_1$ pulse sets a "depth display flip-flop" 237 which is held reset during every sequence but $\overline{\text{sequence 1}}$ by sequence 1 signal from an inverter 238. (Recall that depth words are transmitted only during sequence 1. ) The complementary output of the "depth display flip-flop" 237 supplies a signal designated $\overline{depth}$ to the transmit and control circuits of FIG. 12 to disable the AND gate 234 so that a sync word cannot be transmitted if a depth word has been read off of the tape. It will be recalled from the discussion of FIG. 3B that a 1 is recorded in track 6 of every word 1 in the identification file. Thus, a "detected depth read" signal will be generated from the tape control circuits during the first word of each frame of the ID file so that each word 1 of the ID file will be transmitted instead of the sync word. Now returning to the tape control circuits of FIGS. 5A and 5B, at the same time that this first data word was being transmitted, the "step tape command" ($X_2$) from the dataphone interface had caused the tape to move. This tape movement produced "detected character pulses" which advanced the character counter 135. The character counter 135, as discussed earlier, generates the three character inscribing pulses PW1, PW2 and PW3 for reading the next data word off of tape and placing it in the tape read register 63. After the third magnetic mark is detected on the tape, the trailing edge of the PR3+6 signal resets the motor flip-flop 98 again.

Referring to FIGS. 15A—15C, after the last bit of the first data word has been transmitted, the falling edge of $X_0$ (i.e., the 16th bit) again causes the generation of the $X_2$, $X_3$ and $X_4$ timing control pulses and advances the sequence counter so that the matrix 194 will remove the sequence 1 signal and replace it with the sequence 2 signal. As before, the tape motor is started again by $X_2$ ("step tape command") and the word contained in the tape read register 63 is shifted to the transmit buffer register 66 by $X_3$, ("shift tape read register window"), which also causes generation of the high frequency shift pulses. The $X_4$ pulse ("transfer X/R register window") then transfers the data to the X/R register 67 for application to the telephone company dataset for transmission. This process continues over and over again until the end of the file is reached.

Figure 17:
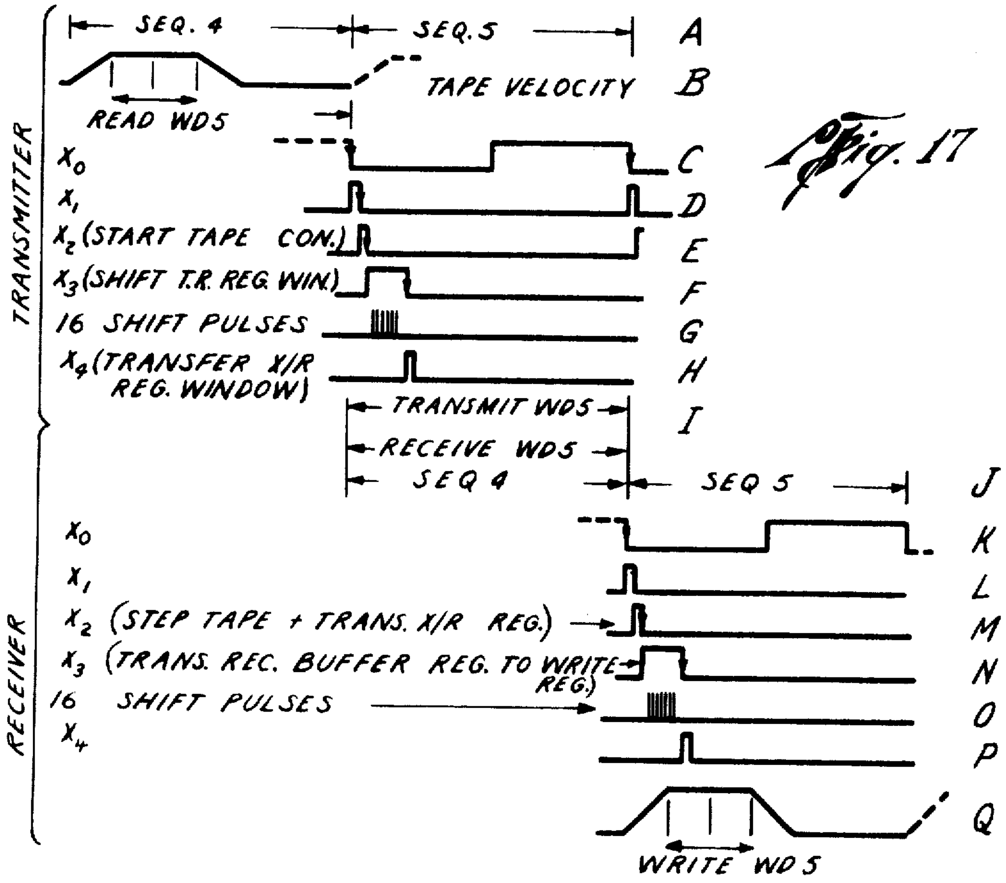

Referring to FIGS. 17A—17I, there are shown timing diagrams useful in explaining how the data words are read off of the tape and transmitted. FIG. 17B shows the tape movement during which each character is read off of the tape and stored in the tape read register 63 of FIG. 5B. As represented in FIG. 17A, word 5 is read from the tape during sequence 4. While word 5 was being read from the tape, the "transmit clock" signal (not shown in FIG. 17) was shifting word 4 to the dataset for transmission. After the 16th bit of word 4 is shifted out of the X/R register 67 to the dataset, $X_0$ goes from the "1" to "0" level, as shown in FIG. 17C to produce the timing control pulses $X_1$, $X_2$, $X_3$, and $X_4$ of FIGS. 17D—F and H respectively, as well as the shift pulses of FIG. 17G. Since the falling edge of $X_0$ advances the sequence counter 189 of FIG. 15A, the sequence changes to sequence 5 as shown in FIG. 17A. The initiation of tape movement, transfer of data from the tape read register 63 of FIG. 5B to the transmit buffer register 66 of FIG. 15C, and then to the X/R register 67 all occurs between the falling edge of the "transmit clock" pulse which produced the $X_0$ falling edge and the next rising edge of the "transmit clock." Because of space considerations on the FIG. 17 drawing, this time interval had to be explained in FIGS. 17D—H.

When the end of a file is reached, the dataphone interface will cause the termination of transmission, but the tape motor will continue running until the tape has moved through the file gap, which precedes every file. The first word of the next file will be read off of the tape and stored in the tape read register 63 of FIG. 5B before the tape stops.

Referring now to the tape control circuits of FIG. 5 and FIGS. 18A—D in conjunction, the trailing edge of $X_0$ in FIG. 18A causes the generation of the "step tape command" of FIG. 18B which causes tape motion as shown in FIG. 18C. Now, assuming that the tape reads the last word of a file at this time, when the file gap is reached, there will be no "detected character pulses" for advancing the character counter 135 to reset the "motor flip-flop" 98. Thus, the "motor flip-flop" 98 will remain in the set state long enough to cause the "gap delay circuit" 144 and "file gap delay circuit" 147 to energize the "detected gap one-shot" 146 and "file gap one-shot" 148. The tape then advances through the file gap and stops after reading the first word of the next file and storing it in the tape read register 63 of FIG. 5B, as represented in FIG. 18C.

Referring back to the transmit control circuits of FIG. 12, the leading edge of the "detected gap" signal of FIG. 18D sets both the "gap detector flip-flop" 210 and the "end of transmission flip-flop" 167, as shown in FIG. 18E. The "detected file gap" signal will then reset the "gap detector flip-flop" 210 which memorizes that a file gap has been detected. When the "end of transmission flip-flop" 167 is set, it enables an AND gate 241 so that the falling edge of $X_0$ can reset the "request to send flip-flop" 168 as shown in FIG. 18F. By waiting until the falling edge of $X_0$, it is insured that the data word being presently transmitted has been completely transmitted before terminating transmission. When the "request to send flip-flop" 168 is reset, the "synchronized clear to send flip-flop" 172, the "transmit data flip-flop" 173, and the "transmit next file flip-flop" 169 are all reset. The resetting of the "transmit next file flip-flop" 169 causes the output of the inverter 166 to reset the "end of transmission flip-flop" 167 (in readiness for the next "end of transmission"). The resetting of the "request to send flip-flop" 168 removes the "request to send" signal from the dataset 44, thus shutting down the transmission. The resetting of the "transmit data flip-flop" 173 disables AND gates 214—217, 233 and 234 to inhibit the data reading and shifting operations and enables the AND gate 220 for transmitting the file gap just detected when the "transmit next file button" 165 of FIG. 12 is again pushed.

At this time, the first word of the next file is sitting in the tape read register and the transmission is terminated. To initiate the transmission again, the "transmit next file button" 165 is pushed down. This causes the same operation to occur as previously discussed. That is to say, after synchronism is established between the transmitter and receiver, the "synchronized clear to send flip-flop" 172 is set by the trailing edge of the $\overline{\text{dibit clock transmit}}$ signal from the dataset which enables the AND gate 211 to begin transmitting sync words during sequence 1 of every frame. Again, the presence or absence of a sync word in frame 3 will indicate to the receiver whether a record or file gap was detected and the "transmit data flip-flop" 173 will be set after four or 20 frames depending on whether a record or file gap was detected. With the "transmit data flip-flop" 173 set, the AND gates 214—217, 233 and 234 are again enabled and the transmission of the next file of data begins. This process continues over and over again until every file has been transmitted.

Now concerning how data is displayed during the transmission of a tape, the 12 sequence outputs of the binary-to-decimal matrix 194 (see FIG. 15A) are connected to 12 separate switch positions of a data display selector switch 244 (see FIG. 15B). For data display of regular logging tapes, one sequence per frame can be selected for display. On the other hand, for CDM tapes, one sequence per every other frame is selected for display since the "slow signals" show up only every other frame. The wiper arm of the data display selector switch 244 enables an AND gate 245 during the selected display sequence which allows the timing control pulse $X_3$ to pass to the data display circuits 52 of FIG. 1 as the "data display window." When CDM data is to be displayed, an even-odd frame selector switch 246 selects either the "even frame" or "odd frame" signal from the even frame flip-flop 195 for application to the AND gate 245 via an OR gate 247. To insure that the AND gate 245 can be enabled during every frame of regular logging tapes, the control signal $\overline{CDM}$ is also supplied to OR gate 247. Thus, for CDM tapes, data can be displayed during a selected sequence of either the even or odd frames, not both. As seen in FIG. 15C, the "read PCM data" from the tape control circuits is supplied via the transmit position of the mode selector switch 70a (this is the same switch 70a shown in FIG. 1) to the data display circuits 52 of FIG. 1.

Now referring to FIG. 19, there is shown the depth and data display circuits 52 of FIG. 1 in greater detail. The "data display window" (just discussed) from the dataphone interface enables an AND gate 249 to pass the 14 shift pulses from the AND gate 205 of the dataphone interface. It will be recalled that these 14 shift pulses, designated "shift 14," represent the third through 16th shift pulses (i.e., last 14) generated from the oscillator 202 of FIG. 15A. These 14 shift pulses shift the PCM data from the mode selector switch 70*a* of FIG. 15 into a 14 stage data display register 250. Referring back to FIG. 11A for a moment, it will be recalled that stage 16 is an overflow stage always containing a "0." It will also be recalled that stage 15 contains the even line parity bit which is not inserted into the serial PCM data until it arrives at the X/R register 67. Thus, the "read PCM data" supplied to the data display circuits always contains "0's " in the last two stages. Since only the third through 16th shift pulses are applied to entry register 250, the first two bits, i.e., the bits that would ordinarily be placed in shift register stages 15 and 16, have already passed before the data display register 250 receives the first shift pulse. Thus the data contained in the data display register 250 represents stages 1 through 14 of FIG. 11A. The data stages of the register 250 are applied to a binary-to-decimal converter 251 which converts the data into decimal quantities for display by a suitable data display unit 252. The sign bit from the data display register 250 is supplied directly to the data display unit 252. If desired, the data display arrangement shown in the aforementioned Miller et al. U.S. Pat. No. 3,457,544 could be utilized for the data display circuits in place of those shown in FIG. 19.

Concerning the display of depth, it will be recalled from FIG. 15A that the "depth display flip-flop" 237 is set each time a depth word is detected by the tape control circuits of FIG. 5. The normal output of this "depth display flip-flop" 237 is passed via the X-MIT, INT, and RDP positions of a mode selector switch 70*e*, which is mechanically ganged to the mode selector switches 70*a*—70*d*, to the data display circuits as the "command shift depth display" signal. Referring back to FIG. 19, this "command shift depth display window" from the dataphone interface enables an AND gate 253 every time a depth word is read off of the tape. Additionally, the "depth display window" from the dataphone interface, which is the timing control pulse $X_3$, is supplied to the AND gate 253 to pass the 16 high frequency shift pulses from the oscillator 202 of FIG. 15A to the shift input of a 13 stage depth display register 254.

Looking at FIG. 11B for a moment, it can be seen that stages 14, 15 and 16 contain the depth run number marks and stages 2 through 13 contain the binary coded decimal depth data. Since the depth display register 254 has only 13 stages, it can be seen that the run number depth marks will, in effect, pass out the other end of the depth display register 254 leaving only the binary coded decimal portion of the depth word. This binary coded decimal portion of the depth word is converted to decimal indications by a binary coded decimal-to-decimal converter 255 for display by a depth display unit 256.

The transmission equipment of the present invention also has the capability of making a film recording of the data as it is being transmitted, as discussed in connection with FIG. 1. It will be recalled from the transmit control circuits of FIG. 12 that the recorder is started when data transmission begins by supplying the "recorder motion (X-MIT)" signal from AND gate 217 to the recorder drive circuits 77 of FIG. 1 by way of the "X-mit" positions of a mode selector switch 70K. Referring to FIG. 15C the timing control pulse $X_3$ is passed via an AND gate 261 to produce a signal designated "playback window" which is applied to the playback circuits. Another input to the AND gate 261 is the signal designated $\overline{CDM+HDT}$ which inhibits playback when either HDT or CDM dipmeter data is being processed. (It is not necessary to have a photographic log of dipmeter data.) The other input to AND gate 261 is the normal output of a flip-flop 262 designated "even line parity receive flip-flop." This flip-flop is set by the timing control pulse $X_4$ during each sequence and while in the transmit mode of operation, it never changes to the reset state.

Now referring to FIG. 20, there is shown the playback circuits 50 of FIG. 1 in greater detail. The "playback window" (just discussed) enables 14 shift pulses from the dataphone interface to pass through an AND gate 264 to shift the PCM data from the mode selector switch 70*a* of FIG. 15 into an entry register 265. The fact that the 14 shift pulses are appropriately timed in relation to the 16-bit data word will insure that the first two bits are not entered into the entry register 265 for the same reasons as discussed earlier in connection with the data display circuits. Thus, the word contained in the entry register 265 at this time corresponds to stages 1—14 of FIG. 11A.

Since well logging data words are not normally negative, the playback circuits have the capability of detecting a negative word and making its value zero. To this end, the normal output of the 14th or sign-bit stage (representing a minus sign) resets the entry register 265 by way of an AND gate 266 which is strobed by a "sign strobe one-shot" 267 on the trailing edge of the "playback window." (Recall that the "1" means negative) Since the AND gate 266 is not strobed until the trailing edge of the playback window, this insures that the sign-bit is truly in the last stage of the entry register 265 before it is interrogated.

The data contained in the entry register 265 is converted to an analog quantity by a digital-to-analog converter 268 whose analog output signal is supplied to a suitable driver amplifier 269. The output signal from the driver amplifier 269 is connected at the appropriate times to one of a plurality of parallel capacitors 270 via a plurality of parallel decommutator gates 271. The drive capability of the amplifier 269 is sufficient for any capacitor 270 to be quickly charged or discharged to the amplitude level of the converted analog signal. The voltages on these capacitors 270 are supplied via a plurality of parallel buffer amplifiers 272 to the multichannel photographic recorder 49. The input impedance of each one of the parallel buffer amplifiers 272 is high enough to draw very little charge from the capacitors 270.

To connect the output of the driver amplifier 269 in the proper order to capacitors 270, the "channel selection signals" from the dataphone interface are supplied to the inputs of individual ones of 12 parallel AND gates 273. The 12 parallel gates 273 are all strobed by an output pulse from a "-data strobe one-shot" 275 which is energized on the trailing edge of the sign strobe one-shot 267 output pulse. By so doing, the output signal from driver amplifier 269 will not be connected to the selected capacitor 270 until the entire word has been entered into entry register 265. To insure accuracy, the time duration of the data strobe pulse is long enough for the capacitors 270 to have sufficient charging and discharging time periods.

Figure 21:
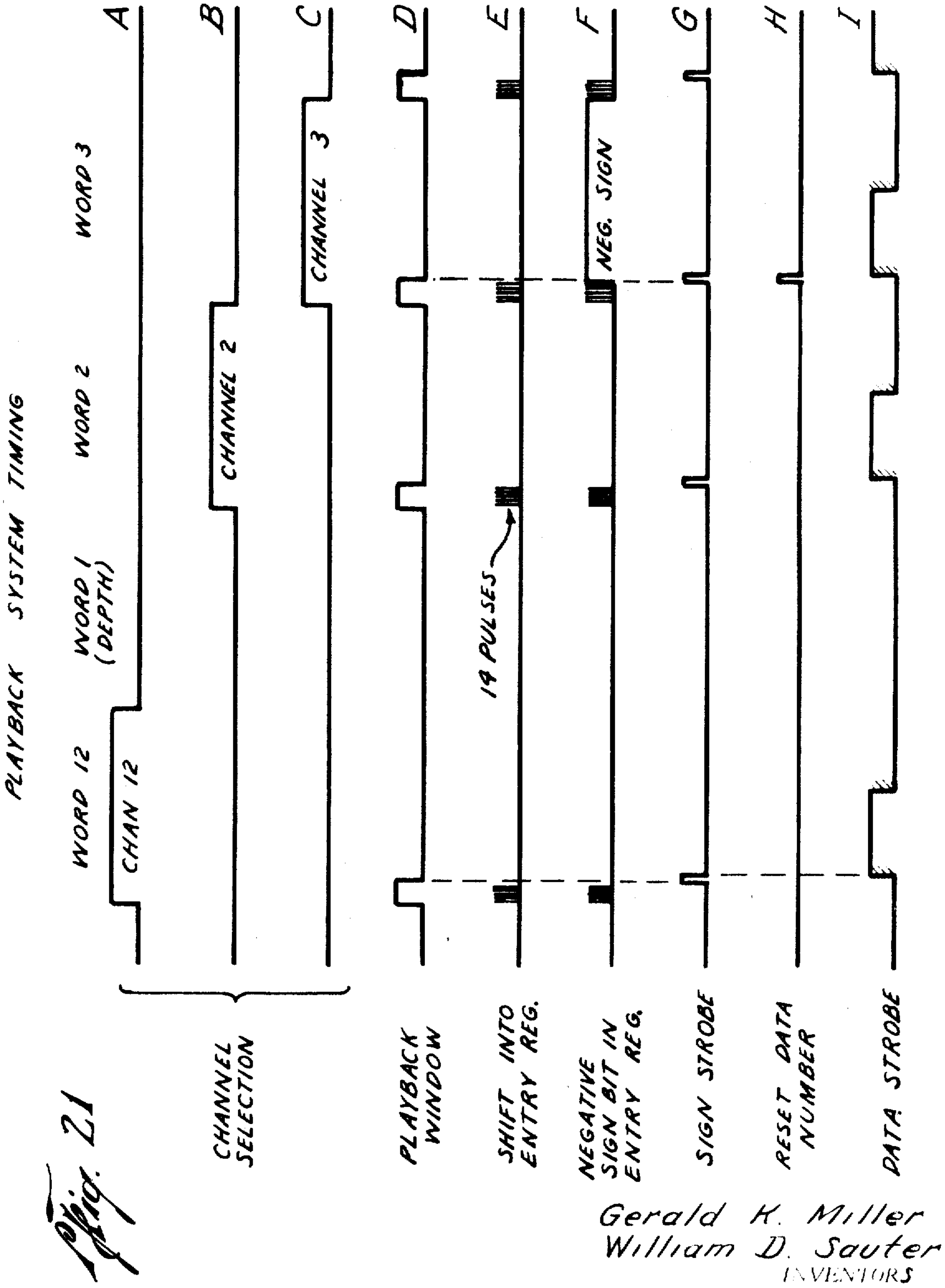

Now referring to FIG. 21 for an example of the operation of the playback circuits of FIG. 20, FIGS. 21A, 21B and 21C represent the channel selection signals from the dataphone interface. There is a channel selection signal for every word except the depth word (word 2). FIGS. 21D and 21E show the playback windows which enable AND gate 264 and the PCM data shifted into the entry register 265 respectively. FIG. 21F represents the output of the sign bit stage of the entry register 265. Since the last data word entered into the entry register 265 is being shifted out (and lost) while the new data word is being shifted in, the sign bit stage will fluctuate accordingly. However, the sign strobe pulse of FIG. 21G waits until the data of the last word has been shifted out and the new data word shifted in before interrogating the sign bit stage of register 265.

It can be seen from FIGS. 21A and 21B that words 12 and 2 have positive signs. Thus, the output of the sign bit stage of entry register 265 will go to "0" before the sign strobe pulses of FIG. 21G for words 12 and 2 are generated. Thus, words 12 and 2 will be converted to analog signals for charging or discharging the capacitors 270 during the time period of the data strobe pulses of FIG. 21K. Now, assuming that word 3 is a negative number, it can be seen from FIG. 21F that the sign bit stage of entry register 265 will remain at the "1" level after the new data word has been shifted therein. Thus, the sign strobe pulse of FIG. 21G will produce the "reset data number" pulse of FIG. 21H from the output of AND gate 266 for resetting the entry register 265 to "0." During the time period of the data strobe pulse of FIG. 21I for word 3, the capacitor 270 for channel 3 will therefore discharge to zero volts. (In the playback of well logging data, it is usually assumed that a negative number is, in fact, zero.)

Now concerning the operation of the transmission equipment of the present invention for the receiving of information, refer first to the tape control circuits of FIGS. 5A and 5B. Before a transmission is started, the operator at the receiving end makes an initial erased section on the tape. To accomplish this, the erase switch 280a is energized and the start-stop switch 95 is moved from the stop to the start position, various circuits in the tape and the motor flip-flop 98 are set by STP. The erase switch 280 grounds the "detected character pulse" line so that the character counter 135 will not be able to advance to reset the motor flip-flop 98. Since current is flowing through the write heads during this time, (the read-write switch 140 is now in the "write" position) an erased section will be created until the erase switch 280 is released.

Having now created the initial erased section, the remainder of the operation at the receiving end is slaved to the operation of the transmitting end of the transmission link. Referring to FIG. 22, there is shown the receive control circuits 195 of FIG. 15 in greater detail. The receiving dataset detects a carrier on the telephone line from the transmitter and indicates this fact to the receiving dataphone interface by a signal designated "carrier on." However, before the carrier was placed on the line by the transmitter, the "carrier on" signal was at "0" which a "permit stepping flip-flop" 280 reset and a "record gap flip-flop" 281 set after inversion by an inverter 282. This "carrier on" line is grounded by a mode selector switch 70H in the "transmit" mode of operation.

Figure 23:
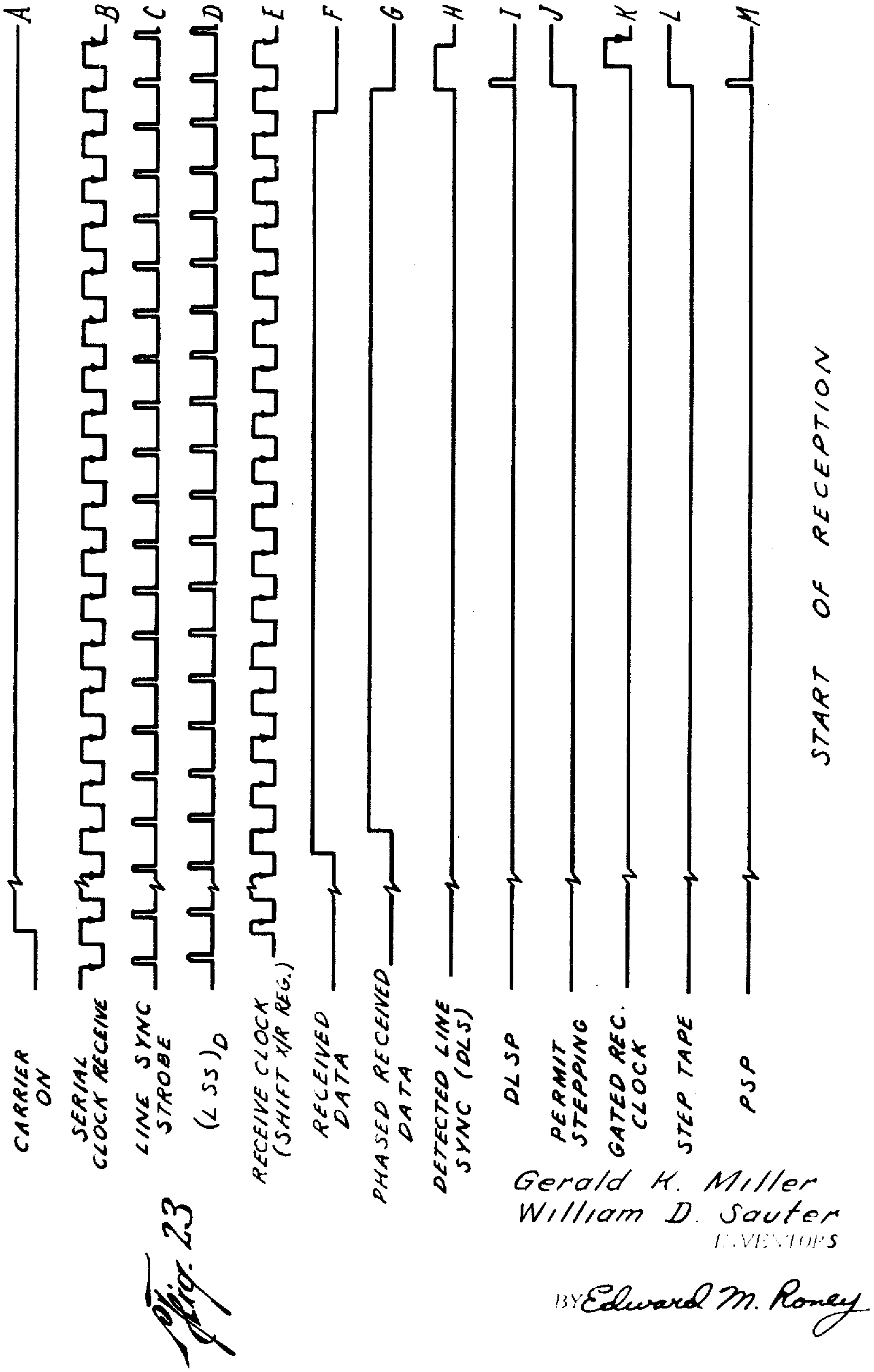

The "carrier on" signal of FIG. 23A going to "1" causes the "serial clock receive" (SCR) signal from the dataset, shown in FIG. 23B, to be supplied to the OR gate 183 of FIG. 15 to shift the X/R register 67, on each pulse falling edge, the same as SCT does in the transmitter. The falling edge of each pulse of the "serial clock receive" signal causes the "line sync strobe pulse" shown in FIG. 23C to be generated from a "line sync strobe one-shot" 284 after a delay by a delay one-shot 285. As its name would imply, the "line sync strobe pulse" is utilized to strobe the circuits which interrogate the received data for a line sync word. The delay by delay one-shot 285 insures that the received data is not interrogated until after each bit is shifted. The "line sync strobe pulse" is passed by an AND gate 286 when the "carrier on" signal is generated from the dataset. (This is a safety feature since sync words cannot be received unless there is a carrier on the telephone line). Referring to FIG. 15C, the received data, shown in FIG. 23F, does not appear until a short time interval after the carrier has been detected by the receiver. This time delay corresponds to the time for the datasets at the receiving and transmitting ends to become synchronized with one another. The first stage of the X/R register 67, designated phased received data (PRD), is an extra stage to provide the X/R register 67 with 17 stages. The received data from the dataset changes at the positive going edges of the "serial clock receive" signal from the dataset. The dataphone interface therefore samples or shifts the received data into the X/R register at the negative going edges of the "serial clock receive" signal. Since the received data signal is not in phase with the data in the X/R register, the PRD stage is superimposed in order to obtain a properly phased signal which will be suitable for the determination of the parity of the received word as will be explained later. In FIG. 23G, there is shown the phased receive data corresponding to the data being received by the X/R register 67. The dataphone interface circuits examine these stages, 1—16, for data words and sync words. A "Line sync detector" 289 (a 16 input AND gate) interrogates stages 1—16 of the X/R register 67 for the presence of a sync word, i.e., 16 "1's." To insure that the X/R register 67 does not arbitrarily have all "1's" contained therein when the power is turned on, the carrier on signal from the dataset resets the PRD and first stage of the X/R register 67 via the "receive" position of the mode selector switch 70I so that there will always be a "0" in at least one stage thereof during the initiation of transmission until a true sync word is received. The "detected line sync" (DLS) output pulse from the line sync detector 289, shown in FIG. 23H, is supplied to the receive control circuits 195.

Now referring back to the receive control circuits of FIG. 22, this DLS signal is supplied to the other input of the AND gate 286 via an AND gate 303 (FIG. 22) to produce a pulse designated "detected line sync pulse" (DLSP), shown in FIG. 23I, when the line sync strobe pulse is generated. When "carrier on" went to the "one" level, the "transmission initiation" one-shot generated a negative output which inhibits DLS in gate 303 until bit synchronism is established. The "detected line sync pulse" resets various circuits in the dataphone interface and is also utilized to set the "permit stepping flip-flop" 280. As can be seen in FIGS. 22 and 23H—23K, with the "-permit stepping flip-flop" 280 set, an AND gate 290 is enabled to pass the "serial clock receive" signal (SCR). The output of the AND gate 290 is designated "gated receive clock" and is utilized to advance the bit counter 184 via the OR gate 185 (see FIG. 15A) on its falling edges as shown in FIG. 23K. The setting of the "permit stepping flip-flop" 280 also causes a "-permit stepping one-shot" 294 to generate a "permit stepping pulse" (PSP) in response to the rising edge of the normal output of the "permit stepping flip-flop" 280. This "permit stepping pulse" is utilized to reset the same circuits in the dataphone interface as did the "transmit next file pulse" (TNFP) in the transmit mode. (In FIGS. 15B and 15C, it is supplied to the OR gate 178). PSP is also passed via an OR gate 291 to produce the signal designated "step tape command-receive." The first tape step is initiated when the "step tape" signal of FIG. 23L rises to the "1" level. Referring briefly to FIGS. 15B and 15C, this "step tape-receive" signal from the receive control circuits 195 is passed via the receive position of the mode selector switch 70c to produce the "step tape command" signal supplied to the tape control circuits of FIGS. 5A and 5B for stepping the magnetic tape.

The receive control circuits of FIG. 22 also include a "permit writing flip-flop" 293 which is initially reset by the "start pulse" STP from the tape control circuits and the "permit stepping pulse" PSP via an OR gate 288. The normal output of the permit writing flip-flop 293 is supplied via the receive position of a mode selector switch 70c, which is mechanically ganged with the mode selector switches 70a—70e, as the "permit writing" signal to the tape control circuits.

At this point in time, with the first sync word having been detected, the "permit stepping flip-flop" 280 enables an AND gate 292 to pass the timing control pulse $X_8$ via the OR gate 291 and mode selector switch 70c as the "step tape command" signal to begin stepping the tape. However, since the "-permit writing flip-flop" 293 has not yet been set, data cannot be written on tape. With AND gate 292 now enabled, $X_8$ can initiate tape motion each time it occurs.

This can better be seen in the tape control circuits of FIGS. 5A and 5B, where the step tape command generated by the "-permit stepping pulse" sets the motor flip-flop 98 to initiate tape motion as before. Since the tape has magnetic marks prerecorded thereon, the "detected character pulses" will be generated from the read circuits of FIG. 8 to produce the $P_0$ pulses for advancing the character counter 135. However, since the "permit writing flip-flop" 293 of FIG. 22 is still reset, the "permit writing" signal input and the AND gate 142 will be at the "O" level and thus the "permit writing pulses" (PWP) will not be generated. Thus, data will not be written on tape until the "permit writing" signal goes to the "1" level since the inscribing pulses PW1, PW2, PW3 cannot be generated until PWP is generated.

It will be recalled from the discussion of the transmission operation that whenever the "transmit next file button" 165 of FIG. 12 was pushed, a gap was first transmitted (either a record gap or a file gap.) It will also be recalled that the presence or absence of the line sync word in the third frame was the key to whether the gap was a record or file gap. In the receive control circuits, it will be recalled that the "record gap flip-flop" 281 was initially placed in the set state by the $\overline{\text{carrier on}}$ signal. If a line sync word is detected during the third transmitted frame, the "record gap flip-flop" 281 is reset to memorize the fact that a file gap is being transmitted. To this end, the third frame signal from the frame counter matrix 197 of FIG. 15B enables an AND gate 294 to reset the "record gap flip-flop" 281 during frame 3 if a line sync word is detected. As a safety measure, the normal output of the "permit stepping flip-flop" 280 is also supplied to one input of the AND gate 294 since this flip-flop 280 must be set before any data can be received. The AND gate 294 is strobed by the "-delayed line sync strobe" pulse ($LSS_0$) output of a "delayed sync strobe one-shot" 295 which is energized on the trailing edge of the "line sync strobe" pulse. Since the "permit stepping pulse" (PSP) is generated when the first line sync word is detected and since PSP resets frame counter 196, a "-delayed sync strobe" is used to check for the sync in frame 3 in order to allow the frame counter 196 to stabilize after the initial reset. To insure that a sync word is not inadvertently detected when the carrier is first placed on the telephone line, the "transmission initiation one-shot" 302 inhibits the "detected line sync" pulse through the action of an AND gate 303.

Now recalling that a record gap is of 4 frame duration, the normal output of the record gap flip-flop 281 enables an AND gate 296 to pass the fourth frame signal from the frame counter matrix of FIG. 15B to set the "permit writing flip-flop" 293 via an OR gate 297 on the pulse trailing edge. On the other hand, if a file gap is being transmitted, the complementary output of the "record gap flip-flop" 281 will enable an AND gate 298 to pass the 20th frame signal from the frame counter matrix via the OR gate 297 to set the "permit writing flip-flop" on the pulse trailing edge. Thus, after a file gap or record gap has been transmitted, the "permit writing" signal will go to the "1" level to allow data to be written on tape.

When the "permit writing flip-flop" 293 is set, a signal designated "recorder motion receive" is generated from an AND gate 299. When reception of a file has been completed, the "permit writing flip-flop" 293 is not reset until a new transmission starts. To stop the recorder therefore, the "permit stepping flip-flop" 280 normal output enters another input of AND gate 299. At the end of a transmission, this flip-flop is reset when the "$\underline{\text{carrier on}}$" signal returns to zero. Additionally, the signal $\overline{HDT+CDM}$ is another input to the AND gate 299 since dipmeter tapes are not recorded on film.

At this point in time, the gap has been received and written on tape and the receiving equipment is now ready to start writing the first received file on tape. Referring to FIG. 15C, the "received data" from the dataset is shifted to the X/R register 67 by the "receive clsck" shift pulses from OR gate 183. The first word entered into the X/R register after the initial file gap will be the sync word (word 01). The resulting "detected line sync" pulse from the "line sync detector" 289 enters the receive control circuits 195 where it causes the generation of the "detected line sync pulse," (DLSP) in the same manner as discussed earlier. DLSP resets the sequence counter to sequence 1 via the OR gate 179 and when receiving a CDM tape, resets the "even frame flip-flop" 195 to the "odd frame" state via an AND gate 300.

For the reception of data, the sequence number corresponds to the word being written on tape. Thus, word 05 is received during the receiver's sequence 04 and written on tape during the receiver's sequence 05. However, the sync word is not detected until the entire word has been entered into the X/R register 67, and thus the sequence has already advanced before DLSP is generated. Thus, DLSP resets the sequence counter to sequence 01.

After each word is entered into the X/R register 67, the shift pulse which shifted the last bit of any given word into the register causes a generation of the $X_0$—$X_4$ timing control pulses via the "gated receive clock" input to the bit counter 184. As in the transmission operation, the $X_1$—$X_4$ pulses occur well before the "receive clock" signal changes from "O" back to "1." The complete data word contained in the X/R register 67 is parallel transferred to the receive buffer register 81 via a plurality of parallel gates 304 in response to the timing control pulse $X_2$ passed to the gates 304 via an AND gate 305. An AND gate 311 inhibits the transfer of the "even line parity bit" from stage 015 to the receive buffer register 81 except during sequence 1 (from FIG. 11B, stage 015 contains the run 2 depth mark for depth words.) Since data should not be transferred to the receive buffer register 81 until the "permit stepping " (PS) signal is at the "1" level, the "permit stepping" signal from the receive control circuits 195 is another input to the AND gate 305. Additionally, the "detected line sync" (DLS) signal from the line line sync detector" 289 is inverted and supplied to the AND gate 305 so that sync words will not be transferred to the receive buffer register 81.

Recalling from FIG. 11B that the 14th, 15th, and 16th stages contain the depth marks the outputs of these stages in the receive buffer register 81 are supplied via an OR gate 306 to one input of an AND gate 307. Provided that the "permit writing" signal is at the "1" level, (which is necessary before any depth words can be received) the $X_2$ timing control pulse sets the "depth command flip-flop" 308 whenever a depth word is placed in the receive buffer register 81. This flip-flop is continuously held reset by the $\overline{\text{SEQ 1}}$ signal except during sequence 1 which is the only time that a depth word is expected. The normal output of the "depth command flip-flop" 308 is supplied to the receive position of the mode selector switch 70$a$ to produce the "command shift depth display" signal which instructs depth display circuits to receive the depth word and display it. Referring briefly to FIG. 5A, this "-command shift depth display" signal is combined in an AND gate 333 with the "sequence 1" signal to cause a "depth audible one-shot" 334 to energize a "sona-alert" (audible frequency oscillator) to produce the audible beep from loudspeaker 78 of FIG. 1. Since depth words occur every 10 feet of borehole depth, the handcrank of FIG. 1 can be turned to make the units digit register zero.

To compute even line parity at the receiver, the output of the "phased receive data" (PRD) stage of the X/R register 67 in conjunction with the "receive clock" triggers the "even line parity receive flip-flop" 262 via an AND gate 309. Since the X/R register stage outputs (of which the PRD stage is one) have no transitions during continuous runs of "1's" or "0's," the PRD stage output is combined with the "receive clock" signal in AND gate 309 in order to provide a negative going edge of each "1" which will therefore trigger the "even line parity receive flip-flop" 262. Thus, if the parity of the received word, after all 16 bits have been shifted into the X/R register 67, is at the "1" level, the parity of the received word will be "even" and thus correct. Since the normal output of the "even line parity receive flip-flop" 262 enables the "playback window" AND gate 261, it can be seen that the "playback window" will only be generated if parity is correct. Referring briefly to the playback circuits of FIG. 20, it can be seen that if the playback window is not generated, data will not be entered into the entry register 265 and thus the particular capacitor 270 corresponding to that data word will not be updated, i.e., the voltage corresponding to the last received data word for that channel will be retained.

The data contained in the receive buffer register 81 is shifted to the tape control circuits during the time interval $X_3$ by way of an AND gate 310 which is enabled by the "permit writing" signal from the receive control circuits 195. This received PCM data from AND gate 310 is supplied via the receive position of the mode selector switch 70$a$ to the data display, tape control, and playback circuits. The data is displayed by the depth and data display circuits of FIG. 19 in the same manner as discussed earlier. Additionally, each data word can be supplied to the playback circuits to be recorded on photographic film in the same manner as discussed previously provided parity is correct. In the receive mode of operation, the signal "recorder motion-receive" is generated from AND gate 299 of FIG. 22 and passed to the recorder drive circuits by way of the mode selector switch 70k when "permit writing" goes to "1."

The dataphone interface circuits of FIG. 15B also generate a signal designated "tape sync sequence" which informs the tape control circuits when to write sync marks on tape. Recalling that, for Regular logging tapes, sync marks are recorded in word 12 of every frame, the "sequence 12" signal from matrix 194 is passed by way of AND gates 312 and 313 to produce the "tape sync sequence" signal. The AND gate 312 is enabled for Regular logging tapes by the "1" output from an OR gate 314 produced by the control signal $\overline{CDM}$. The AND gate 313 is enabled by the control signal $\overline{ODD\ WORD}$ during the processing of Regular logging tapes. For CDM tapes, the $\overline{CDM}$ input to SR gate 314 is "0" so that the "tape sync sequence" signal will only be at the "1" level during sequence 12 of odd frames. (The other input to OR gate 314 is the "odd frame" output from flip-flop 195.)

Now referring to the tape control circuits of FIGS. 5A and 5B, the PCM data from the mode selector switch 70A of the dataphone interface is entered into the write register 82. To shift the write register 82 at the proper time, the "tape write and depth display window" ($X_3$) enables an AND gate 116 which passes the 16 shift pulses from the oscillator 202 of FIG. 15A to the write register 82. While the PCM data is being shifted into the write register 82 under control of the timing control pulse $X_3$, the tape is already moving since the timing control pulse $X_2$ ("step tape command") had already set the "motor flip-flop" 98. The resulting "detected character pulses," as before, advance the character counter and produce the "permit writing pulses" (PWP) (the "permit writing" signal is now at the "1" level) so that the character counter 135 can produce the three character inscribing pulses PW1, PW2, and PW3.

Before discussing how the data is written on tape, it would first be desirable to discuss the generating of the "permit writing pulses" (PWP) when writing data on tape. When writing, the read-write switch 140 is in the "write" position, thus enabling an AND gate 301 to pass the output pulse from the "-skew delay one-shot" 133. Thus, when writing, PWP is generated right after each "detected character pulse" is generated without any delay for skew. (The delay one-shot 138 provides the same delay as in the reading operation, which when writing, allows the character counter 135 to stabilize before PWP strobes it.) By this arrangement, the packing density of data on the tape can be more uniform, as well as denser. This operation can be better seen in FIGS. 9D, 9G, and 9I. This technique is possible when writing since there is no need to wait until the last detected magnetic mark to write. When reading, it is of course necessary to wait until the last detected magnetic marks before reading, since otherwise, some of the bits may not be read from the tape.

The three character inscribing pulses PW1, PW2 and PW3 energize selected gates of the encoder gates 317 for connecting the outputs of selected stages of the write register 82 to the tracks 1—4 write circuits of FIG. 6. This converts the serial data of FIGS. 11A and 11B in the write register 82 to the tape format for data and depth words shown in FIGS. 3A and 3B. The depth marks from the write register stages 14, 15 and 16 are written in the proper character of track 6 by the PW1, PW2, and PW3 inscribing pulses strobing AND gates 322, 323, and 324 respectively. The sequence 1 signal from the dataphone interface is connected to the input of all three AND gates since depth words occur only in word 1 and are only written on tape during sequence 1. The outputs of all three AND gates 322, 323, and 324 are supplied to the track 6 write circuit via an OR gate 325.

From FIG. 3C it will be recalled that sync marks are recorded in tracks 5 and 6 of character 3 of word 12 for regular logging tapes and during word 12 of odd frames only for CDM tapes. Thus, since the "tape sync sequence signal" from the dataphone interface is at the "1" level at the proper time, as discussed earlier, the "tape sync sequence signal" enables an AND gate 326 which passes the signal PW3+6 (which occurs simultaneously with the third character inscribing pulse PW3 for Regular and CDM tapes) to the tracks 5 and 6 writing circuits via the OR gate 125 and another OR gate 327. It should also be mentioned here that the "detected line sync pulse" (DLSP) from the receive control circuits of FIG. 22 confirms that the "motor flip-flop" 98 is set by way of OR gates 99 and 100. DLSP also resets the character counter 135 by way of the OR gates 99 and 155 so that the next generated $P_0$ pulse will produce the first character inscribing pulse PW1. By this means, a periodic check is maintained on the state of these circuits.

It will be recalled from FIG. 3A that the sign bit is recorded in the second character of track 5 and from FIG. 11A, it is contained in stage No. 14 of each data word. Thus, the stage No. 14 output from the write register 82 is connected to the input of an AND gate 328 to which also is supplied the $\overline{\text{sequence 1}}$ signal and the second character inscribing pulse PW2. The output of AND gate 322 is another input to the OR gate 325 so as to record the sign bit in track 6. The $\overline{\text{sequence 1}}$ signal assures that a depth mark during sequence 1 will not be mistaken for a sign bit, and by the same token, the sequence 1 signal which enables AND gate 322, assures that a sign bit will not be mistaken for a depth mark during sequence 1.

From FIGS. 3A, 3B and 3C it will be recalled that track 7 is set aside for odd parity. To write parity on the tape, the outputs of the tracks 1—6 OR gates 318—321, 325 and 327 are all connected to the input of a parity computer 329 whose output is supplied to the track 7 write circuit via an AND gate 330. The parity computer 329 will continuously produce an output signal which will only be correct while the inscribing pulses are being generated. To insure that the parity bit is not written on tape until the tracks 1—6 write pulses have stabilized, an "odd parity strobe one-shot" 331 strobes the AND gate 330 a given time interval after the leading edge of each PWP pulse, the trailing edge of the parity strobe pulse occurring well before the trailing edge of PWP. A delay one-shot 332 provides the necessary delay from the leading edge of the PWP pulse to the leading edge of the "parity strobe pulse."

When all three characters of each word have been written on tape, the trailing edge of the PR3+6 pulse from the character counter 135 resets the "motor flip-flop" 98 to stop the tape movement. Looking at FIGS. 17J—17Q, while one word was being written on the tape, the next word was being entered into the X/R register 67 of FIG. 15C. After it has been completely entered therein, the output $X_0$ of the bit counter 184 of FIG. 15A changes states ("1" to "0") as shown in FIG. 17K, to produce the timing control pulses $X_1$—$X_4$ and the shift pulses of FIGS. 17L—17P. These timing control pulses cause the data to be transferred to the tape read register 63 of FIG. 5B. Meanwhile the $X_2$ pulse of FIG. 17M had initiated tape movement, shown in FIG. 17Q, to write the new data word on tape. It can be seen from FIG. 17A and 17Q that the sequences at the receiver are delayed one sequence from those at the transmitter. (The time lag for transmission is ignored in FIG. 17). This process continues over and over again until the end of the file, at which time transmission terminates.

Figure 18:
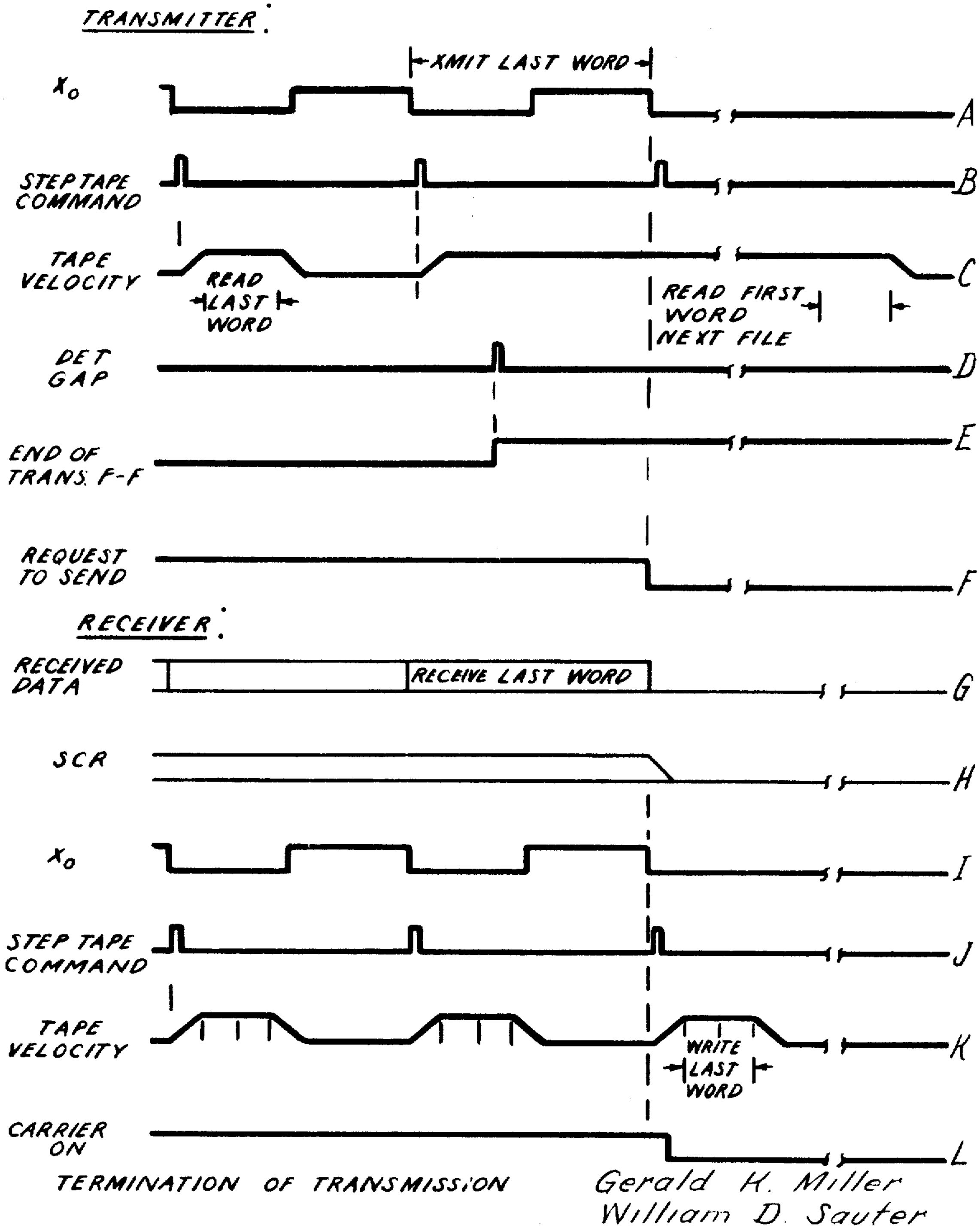

Now referring to FIGS. 18G—L and 22 in conjunction, it will be explained how transmission is terminated. It will be recalled that FIGS. 18A—18F depicted the termination of transmission at the transmitter. FIGS. 18G and 18H show the "received data" and "serial clock receive" (SCR) signal at the receiver when transmission is terminated. (Again, the transmission time lag is ignored in FIG. 18). Upon the last word being completely entered into the X/R register 67 of FIG. 15C, $X_0$ will change from "1" to "0" as shown in FIG. 18I.

The "step tape command" of FIG. 18J will then be generated in response to $X_0$ and the tape will move so as to write this last received data word on tape, and then stop as shown in FIG. 18K. At approximately the same time that SCR of FIG. 18H goes to "0" (i.e., no more clock pulses), the "carrier on" signal of FIG. 18L will go to "0" thus resetting the receive control circuits of FIG. 22 to place them in readiness to begin receiving the next file. Additionally, looking at FIGS. 5A and 5B, at the end of the tape, at the receiver, an end of tape mark is recorded after the last file has been received and the final erased section is being prepared. To prepare this final erased section, the erase switch 280a is closed and the start-stop switch 95 is moved to the start position to set the "motor flip-flop" 98. However, since the "detected character pulses" are grounded out, the "motor flip-flop" 98 will remain set. Thus, after a given time delay, the "file gap delay circuit" 147 triggers the "file gap one-shot" 148 to record the "end of tape mark" via OR gates 318—321 in tracks 1—4. The absence of the PWP pulses assures that parity is not recorded.

There is a problem of a momentary transmission interruption resetting the receive control circuits of FIG. 22. To prevent this, a "transmission interruption one-shot" 303 is responsive to the falling edge of the "carrier on" signal to disable the "permit stepping one-shot 294 and "transmission initiation one-shot" 302. If PSP were allowed to be generated when a transmission interruption occurs, the "permit writing flip-flop" 293 would reset and a file gap would then be produced on the tape. (The third frame sync word after transmission interruption would reset the "record gap flip-flop" 281 to not allow the "permit writing flip-flop" 293 to be set until after 20 frames). Additionally, since the "transmission initiation one-shot" 302 is momentarily disabled, the next sync word after transmission resumes ("carrier on" goes from "0" to "1" ) can produce DLSP to synchronize the sequence counter 189 (and "even frame flip-flop" 195 for CDM tapes).

The transmission equipment of the present invention also has the capability of playing back a tape without the transmission or reception of data to provide a photographic recording of the data as well as display of the depth and data words. With the mode selector switches *70a—70i* in the "internal" position, the third character inscribing pulse PW3 energizes an "internal oscillator one-shot" 340 (FIG. 5A) after each word is read from the tape. This one-shot 340 generates a pulse designated "internal oscillator pulse" which is supplied back to the dataphone interface of FIGS. 15A—C. Referring to FIG. 15A, this internal oscillator pulse is substituted for the output of the bit counter 184 by way of the mode selector switch 70B for causing the generation of the timing control pulses $X_2$—$X_4$.

These timing control pulses operate in the same manner as in the transmit mode of operation to initiate tape movement and transfer the data between the various subsystems. $X_2$ and $X_3$ produces the "step tape command" and "shift tape read register window" by way of the playback positions ("Int. osc." and "RDP") of mode selector switches 70c and 70d respectively. Additionally, the "permit writing" signal from switch 70b is always "1" in the playback modes and the "recorder motion" signal from switch *70k* is always "1" during playback. The data is moved between subsystems in the same manner as in the transmit mode of operation (except for transfer to X/R register 67, of course).

The handling of file or record gaps and erased sections is somewhat different when playing back a tape than when transmitting a tape. It will be recalled that, during transmission, with the tape initially placed in the middle of an erased section, the tape will move until the first data word is read and stored in the tape read register. At the end of a file, the tape moves all the way through the file gap until the first word is read and stored in the tape read register 63. In the playback mode of operation however, when playback is started with the tape in the initial erased section (or in a file gap), the tape does not stop stepping after reading the first word but continues stepping until the end of the file is reached. At the end of the file, the tape stops in the middle of the file gap.

Looking at FIGS. 5A and 5B to see how the above is accomplished, when the start-stop switch is moved to the start position, the "start pulse" STP sets the "motor flip-flop" 98 and "file length flip-flop" 97 and resets a "detected file gap enable flip-flop" 339. The tape then moves through the erased section, and after the first word is read from the tape, PW3 from the character counter 135 sets the "detected file gap enable flip-flop" 339 which enables an AND gate 338. With the "file length flip-flop" 97 set, the AND gate 224 is enabled to pass the "step tape csmmand" pulses to the "motor flip-flop" 98 and the tape steps through the file while the words from the tape are read.

Upon entering a file gap, the "file gap one-shot" 198 generates a "detected file gap" pulse which resets the "file length flip-flop" 97 and "motor flip-flop" 98 by way of the AND gate 338 and the "Int. OSC." or "RDP" positions of a mode selector switch *70j* (mechanically ganged to switches *70a—70bi*). This pulse is designated DFG*x*PB (detected file gap *x* playback). Now, to continue with the playback operation, the start-stop switch 95 is moved to the stop position and back to the start position (as opposed to the transmit mode where the "transmit next file button" is pushed). The tape then moves through the file gap without stopping since the AND gate 338 is only enabled to pass the DFG*x*PB pulse to reset the flip-flops 97 and 98 after the first word is read. The file is then read from the tape until the next file gap is reached at which time it stops and the same operation begins over again.

Now concerning the other playback mode, i.e., RDP, it will be recalled from the discussion of FIG. 1 that the recorder drive 77 moves the film 48 of the photographic recorder 49 thereby generating depth pulses from the recorder drive pulse generator 87. Looking at FIG. 15A, when the mode selector switch *70b* is in the RDP position, these depth pulses are utilized as the $X_0$ pulses to initiate all of the above described operations in the same manner as the "internal oscillator pulses" did. The start-stop operation is identical to that just described for the "internal oscillator" mode of operation. By controlling the reading of data off of the tape with the "recorder drive pulses," the tape motion will be synchronized with the film motion to insure an accurate depth scale on the film 48.

The transmission equipment of the present invention has the capability of transmitting every other word of a tape instead of every word to increase the rate at which the data on the tape can be transmitted. For this discussion, refer to FIGS. 15A, 15B and 15C. When transmitting every other word, the format switch 181 is in the "odd word" position. CDM and HDT tapes use mostly every word for data and thus, for all practical purposes, the "Reg" and "odd word" switch positions could be designated "Reg-All word" and "Reg-Odd word." When an "odd word" transmission is taking place, the signal "odd word" will enable an AND gate 340 in the sequence counter 189 to pass the $X_0$ signal directly to the input of the three stage "divide by 6" counter 191, thus bypassing the first counter stage 190. By so doing, the binary-to-decimal matrix 194 will produce output signals only on the odd numbered sequence output lines. These signals on the odd numbered sequence lines will occur one right after the other.

It will be recalled from the discussion of FIG. 3C that the frame sync marks are recorded in word 12. In transmitting odd words only, words are not read off or written on tape during sequence 12. Thus, the sequence 11 output signal from the sequence matrix 194 is selected by an AND gate 341, which is enabled during the "odd word" transmission by the signal "odd word," to produce the "tape sync sequence" signal which is used by the tape control circuits to write sync marks on the tape. This sequence 11 signal is supplied to the AND gate 341 by way of an AND gate 342 which is always enabled by the output of the OR gate 314 during "odd word" transmission. It should also be mentioned here that since words are being read from or written on the tape approximately twice as fast during "odd word" transmission, the movement of the film 48 of the photographic recorder 49 of FIG. 1 must be twice as fast. To this end, a switch 181a in FIG. 15B, mechanically ganged to switch 181, supplies a "1" to the recorder drive 77 of FIG. 1 when in the "Reg" (or "All word") position and a "0" when in the "odd word" position to cause the necessary speed change.

Now referring to FIGS. 24A—24N, there is shown a timing diagram to illustrate the transmission and reception of odd word data. FIG. 24A shows the tape velocity along with the "-detected character pulses." When operating in the "odd word" mode, the tape will step through six characters before stopping while reading or writing only the first three characters of each 6 character step. Thus assuming that the first six characters of FIG. 24A corresponds to sequence 9 and the second six characters correspond to sequence 11, as represented above in FIG. 24A, word No. 11 will be read during the first three characters of sequence 9 and transmitted during sequence 11. FIGS. 24B—24G represent the $X_0$, $X_1$, $X_2$, $X_3$, shift and $X_4$ pulses respectively. These signals represented in FIGS. 24B—24G perform the same functions as discussed earlier. Thus, each 16 bit word will be transmitted and received during each sequence, as before, except that there will now be a maximum of six data words transmitted in each frame. To avoid confusion in regard to the definition of a frame, the sequences are still numbered the same for "odd word" transmission as for "Reg" or "All word" transmission, i.e., 12 sequences per frame, except that now the 6 even numbered sequences have been omitted.

Now looking at FIGS. 24H—24N, there is shown the timing diagrams for the receiving end of the transmission link. The definition as to the numbering of sequences at the receiver established earlier also applies to odd word transmission, i.e., the sequence number at the receiver will correspond to the word number that is being written on tape. Thus, word 11 will be received during sequence 9 and written on tape during sequence 11. The $X_0$, $X_1$, $X_2$, $X_3$, shift and $X_4$ timing control pulses at the receiver, shown in FIGS. 24H—24N, perform the same functions of initiating tape movement and transferring data at the receiver as discussed earlier. FIG. 24N shows the tape velocity with the 6 "detected character pulses" during sequence 11. The word 11 will be written on tape in response to only the first three "detected character pulses" during sequence 11.

Now referring back to the tape control circuits of FIGS. 5A and 5B, these circuits operate in a similar manner during "odd word" transmission as during the "all word" (Regular, CDM and HDT) transmission except that the operation of the character counter 135 is altered. More specifically, when the tape motion is started, the PW1, PW2 and PW3 inscribing pulses are generated in response to the first three detected magnetic marks but the PW3+6 inscribing pulse is not generated until the sixth detected magnetic marks so that the tape sync marks will be recorded in word 12, as the format requires. Likewise, $\overline{PR3+6}$ does not change from "1" to "0" until after six magnetic marks have been detected so as to stop the tape motion after six detected marks.

Now referring to FIG. 25, there is shown the character counter 135 of FIG. 5A in greater detail. The character counter includes 3 gated flip-flops 346, 347, and 348. Before proceeding with the description of the character counter, it would first be desirable to explain the operation of a gated flip-flop. Each gated flip-flop has 2 set and 2 reset input terminals which are gated by a clock input. The flip-flop cannot change states unless there are "1's" on both input terminals of either the set or reset input when the flip-flop is gated on its clock input, unless there are "1's" on both input terminals of the complementary inputs. The S' and R' input terminals are DC set and reset inputs respectively and are not gated.

The reset input to the character counter 135 causes the resetting of the first gated flip-flop 346 and the setting of the second and third gated flip-flop 347 and 348 on their DC set and reset inputs. The trailing edge of the $P_0$ pulse input to the character counter is utilized to clock the first and second gated flip-flops 346 and 347. The normal and complementary outputs of all three flip-flops are cross-connected to one input terminal of their own reset or set inputs respectively. The falling edge of the normal output PR3 of the second gated flip-flop 347 is utilized to clock the third gated flip-flop 348.

To provide the various modes of operation of the character counter 135, an AND gate 349 output enters an OR gate 350 whose other input is the normal output of the first gated flip-flop 346 and also enters a second OR gate 351 whose other input is the complementary side of the second gated flip-flop 347. The outputs of the OR gates 350 and 351 are connected to set inputs of the gated flip-flops 347 and 346, respectively. The inputs to the control AND gate 349 are the signals HDT and PW ("permit writing"). Thus, for Regular and CDM tapes, HDT is at the zero level and, therefore, the OR gate 350 will connect the normal output of gated flip-flop 346 to one of the set inputs of gated flip-flop 347 and the OR gate 351 will connect the complementary output of gated flip-flop 347 to one of the set inputs of gated flip-flop 346.

Now referring to FIGS. 10C–10F to understand how the character counter of FIG. 25 operates for Regular and CDM tapes, it can be seen from FIGS. 10D and 10E that the first and second flip-flops 346 and 347 are initially placed in the reset and set stages respectively. Now when the first $P_0$ pulse arrives, its trailing edge will cause PR3 (normal output of the second flip-flop 347) to change states to the "0" level since "1's" will be applied to both input terminals of the reset input and a zero, via OR gate 350, is applied to one set input of the second gated flip-flop 347. On the other hand, PR2 (normal output of the first flip-flop 346) will not change levels since the complementary output of the second gated flip-flop 347 is at the "0" level and thus "0" will be applied to one of the set input terminals of flip-flop 346 via the OR gate 351. This can be seen by comparing FIGS. 10C— 10E.

Now when the second $P_0$ pulse arrives, the complementary output, $\overline{PR3}$, of the second gated flip-flop 347 will be at the "1" level thus setting the first gated flip-flop 346, as represented in FIG. 10D. However, PR3 will still remain at the "0" level since the normal output of the first gated flip-flop 346 was still at the "0" level. Thus, the OR gate 350 will supply a "0" to one of the set input terminals of the second gated flip-flop 347 producing no change in state. Now, when the third $P_0$ pulse arrives, both PR2 and PR3 will change states since the complementary output $\overline{PR3}$ of the second gated flip-flop 347 and the normal output PR2 of the first gated flip-flop 346 are both at the "1" level.

The complementary outputs of the first and second gated flip-flops 346 and 347 are combined in an AND gate 352 to produce the signal PR1, shown in FIG. 10F. It can be seen from FIGS. 10D, E, and F that the signals PR1, PR2 and PR3 go to the "1" level after the first, second and third $P_0$ pulses respectively. Thus, PR1, PR2, and PR3 are utilized to enable three AND gates 353, 354, and 355 which produce the three character inscribing pulses PW1, PW2 and PW3 respectively. The "permit writing pulse" (PWP) from the AND gate 142 of FIG. 5 strobes these three AND gates 353, 354, and 355 to produce PW1, PW2 and PW3. One other input to the three AND gates 353, 354, and 355 is the output of a NAND gate 358 which is always at the "1" level during the regular and CDM modes of operation since one input to NAND gate 358 is the "odd word" control signal from the dataphone interface (this signal is always at the "0" level during other than the "odd word" mode of operation).

The PR3 and PWP pulses are also applied to the input of another AND gate 357 which produces the PW3+6 character counter output pulse. The other input to this AND gate 357 is the output of a NAND gate 356 which is always at the "1" level during the regular and CDM modes of operation since one of its inputs is the "odd word" control signal from the dataphone interface. The PW3+6 pulse is shown in FIG. 10J as occurring simultaneously with the PW3 pulse of FIG. 10I. PR3 and the output of the NAND gate 356 are supplied to the input of another NAND gate 359 which produces the $\overline{PR3+6}$ signal of FIG. 10K. Since the output of NAND gate 356 is always at the "1" level, the $\overline{PR3+6}$ pulse of FIG. 10K will be the complement of the PR3 pulse of FIG. 10E.

Thus, it can be seen that in the Regular and CDM modes of operation, the PW1, PW2 and PW3 inscribing pulses will be generated in response to the "detected character pulses" from the read circuits of FIG. 8 to read and write data on the tape with the sync mark strobe pulse PW3+6 generated simultaneously with PW3. Additionally, the "motor flip-flop" 98 will be reset about the same time as the third character inscribing pulse PW3.

Figure 26:
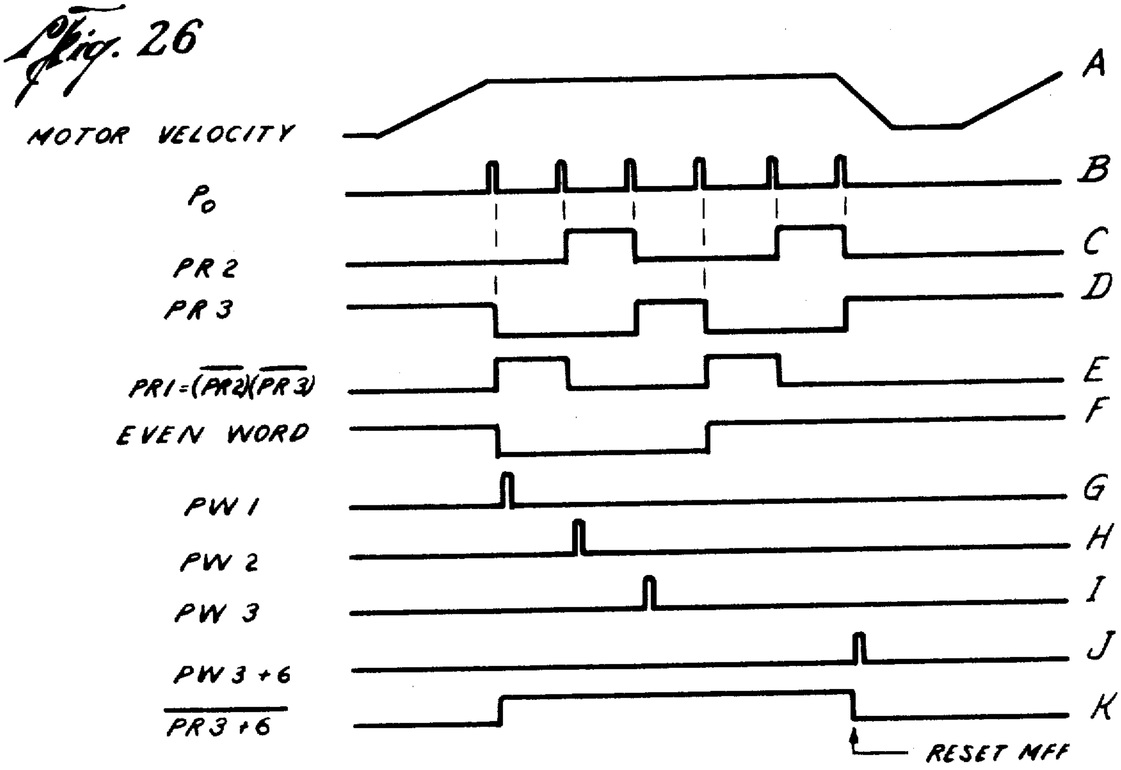

Now, for an "odd word" transmission, the AND gates 350 and 351 are enabled in the same manner as for Regular and CDM tapes and thus the gated flip-flops 346 and 347 operate in the same manner as just described. However, the "odd word" control signal will be at the "1" level for "odd word" transmission thus causing the third gated flip-flop 348 to alter the generation of the character counter output pulses. Thus referring to FIGS. 26A—K, there is shown the timing diagram of the character counter operation for an "odd word" transmission. FIGS. 26A and 26B show the motor velocity and the $P_e$ pulses generated in response to the "detected character pulses" from the read circuits of FIG. 8. FIGS. 26C and 26D show the PR2 and PR3 signals from the first and second gated flip-flops 346 and 347. Since the feedback connections are unaltered for an "odd word" transmission, the PR2 and PR3 waveforms will be the same as shown in FIGS. 10D—F.

However, now every time the second gated flip-flop 347 changes from the set or normal state to the reset or complementary state, the third gated flip-flop 348 will toggle, as can be seen by comparing FIGS. 26D and 26F (FIG. 26F shows the "even word" output from the third gated flip-flop 348). The normal output of the third gated flip-flop 348 will cause the NAND gate 358 to enable the AND gated 353, 354 and 355 to produce the three character inscribing pulses PW1, PW2 and PW3 of FIGS. 26G, H and I only during the first three characters. Once the flip-flop 348 changes to the set state, the output of NAND gate 358 goes to "0" thus disabling the generation of the three character inscribing pulses PW1, PW2 and PW3. However, the $\overline{PR3+6}$ pulse of FIG. 26K from the NAND gate 359 will remain at the "1" level until 6 $P_e$ pulses have been counted by the character counter. This can be seen from FIGS. 26D and 25F where either PR3 or the "even word" signal are at "0" until 6 $P_e$ pulses have been counted. The PW3+6 pulse of FIG. 26J from AND gate 357 will be generated when the sixth $P_e$ pulse is counted by the character counter since, by comparing FIGS. 26D and 26F, the PR3 and "even word" signals are not both at the "1" level until the sixth $P_e$ pulse arrives.

Turning now to FIGS. 15A and 15B, the resetting of counters in the "odd word" mode is different from the "Regular" and CDM modes. Namely, the "start pulse" STP resets the sequence counter 189 to sequence 11 by way of an AND gate 343 which is enabled by the "odd word" control signal. The "-detected tape sync" signal from AND gate 154 of FIG. 5B, on the other hand, resets the sequence counter 189 to sequence 9 by way of an AND gate 344 which is enabled by the "odd word" control signal. This resetting to sequence 9 is for the reason that the sync word 012 is read from the tape one odd numbered sequence earlier than word 011 is transmitted (remember, the tape steps through word 012 after reading word 011).

The transmission equipment of the present invention also has the capability of transmitting tapes whose information was derived from so-called "high resolution dipmeter tool" (HDT). As set forth in the above-mentioned copending Miller et al. application Ser. No. (60,118), an HDT tape requires 8 frames of 12 words each to produce all of the information from the "high resolution dipmeter tool" in a desired manner. Each of these 8 frames is called a block.

Due to the resolution requirements for HDT, an HDT tape utilizes words which have two characters instead of three characters.

Referring now to FIGS. 27A and 27B, there is shown the tape word format for HDT data word and HDT depth word respectively. First concerning the HDT data word of FIG. 27A, it can be seen that tracks 1—4 of character 1 correspond to the weighted binary values $2^4$—$2^7$ and tracks 1—4 of character 2 correspond to the weighted binary values $2^0$—$2^3$. Tracks 5 and 6 of character 2 are reserved for frame sync marks which are recorded in word 12 only. The block sync mark is recorded in track 5 of character 1 during sequence 12 of frame 8 and track 7 is set aside for parity as before. Referring now to the HDT depth word format of FIG. 27B, only the tens and hundreds values of depth are recorded in HDT tapes. The ten's digit is recorded in binary form in character 2 and the hundred's digit is recorded in binary form in character 1. The depth mark is recorded in track 6 of character 1 only since one run almost completely fills up the tape. Again, track 7 of both characters is reserved for parity.

Now turning to FIG. 11D, there is shown the serial word format for HDT transmission. It can be seen that shift register stages 6 through 13 are reserved for the weighted binary values $2^0$—$2^7$. Stage 14 is set aside for the block sync mark with stage 15 again set aside for even line parity. Looking at FIG. 11E, there is shown the serial format for a depth word during HDT transmission. Stages 6 through 13 are reserved for the binary coded decimal bits and stage 14 is reserved for the depth mark. The line sync word, shown in FIG. 11F, is the same as in FIG. 11C, having a "1" in all 16-bit positions.

When transmitting, receiving or playing back an HDT tape, the selector switch 181 is placed in the HDT position. Now turning to the tape control circuits of FIGS. 5A and 5B, the character counter 135 is responsive to the HDT signal from the dataphone interface to generate two character inscribing pulses before the tape movement is stopped. For HDT tapes, the PW2 inscribing pulse corresponds to character 1 and the PW3 inscribing pulse corresponds to character 2. The PW1 inscribing pulse will be inactive for HDT tapes.

Figure 28:
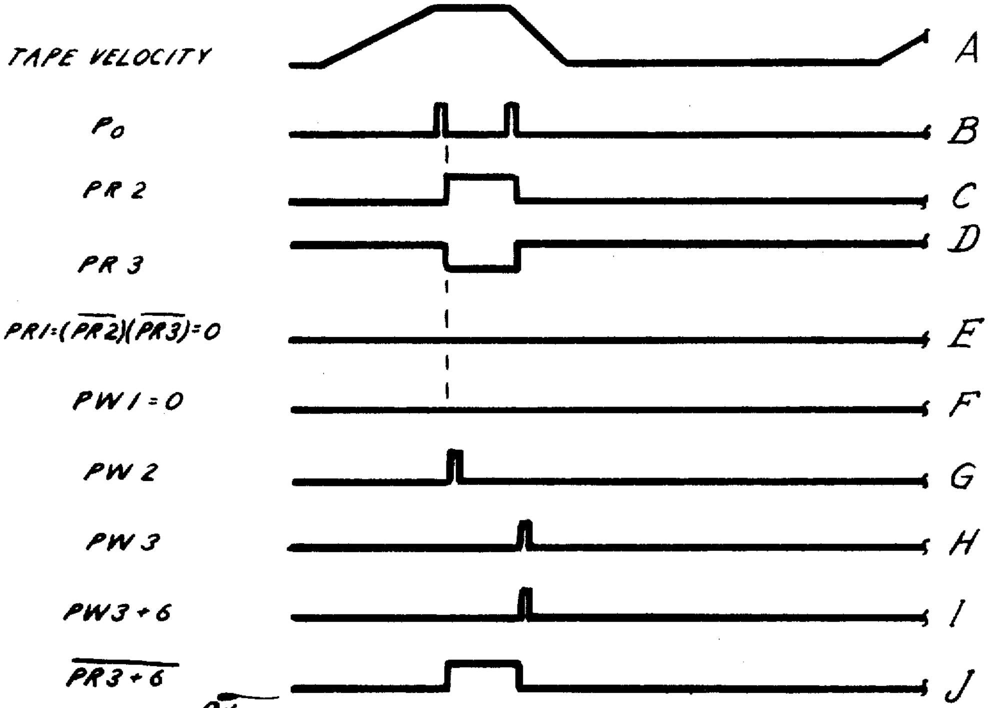

Turning now to the character counter 135 of FIG. 25, it will be explained how the character counter produces these results for HDT transmission. Utilizing the timing diagram of FIGS. 28A—28J in conjunction with FIG. 5, the output of AND gate 349 will be at the "1" level for HDT tapes provided the "permit writing" signal is at the "1" level. Since the output of the AND gate 349 is at the "1" level, the outputs of the feedback OR gates 350 and 351 will always be at the "1" level. Thus, the first and second gated flip-flops 346 and 347 will toggle in response to each applied $P_e$ pulse due to the cross-coupled feedback of each flip-flop. Thus, looking at FIGS. 28A—28D, the movement of the tape, represented in FIG. 28A will produce the $P_e$ pulses of FIG. 28B in the same manner as before. However, in the HDT mode, the PR2 and PR3 signals of FIGS. 28C and 28D will change state in response to each $P_e$ pulse due to the toggling action of the gated flip-flops 346 and 347. Since the character counter is initially reset to the position where PR2 is "0" and PR3 is "1," the PR2 and PR3 signals will be 180° out of phase with another and thus the PR1 signal will always be "0," as represented in FIG. 28E. Thus, as shown in FIG. 28F, the first character inscribing pulse PW1 will always be "0."

Since for HDT tapes, the "odd word" signal from the dataphone interface will be at the "0" level, the outputs from NAND gates 356 and 358 will always be at the "1" level thus placing a "1" at the input of AND gates 353—355 and 357 and NAND gate 359. Thus, the AND gates 354 and 355 will produce the inscribing pulses PW2 and PW3 at alternate times in response to PR2 and PR3 (and, of course, PWP) as shown in FIGS. 28G and 28H. The PW3+6 pulse will occur simultaneously with PW3 since the output from NAND gate 356 is always at the "1" level. Likewise, since the output from NAND gate 356 is always at the "1" level, the $\overline{PR3+6}$ pulse from NAND gate 359, shown in FIG. 28K, will be the complement of the PR3 pulse of FIG. 28D. Thus, it can be seen how the character counter of FIG. 25 will produce the inscribing pulses PW2, PW3 and PW3+6 each time the tape motor is started before resetting the "motor flip-flop" 98 to stop the tape.

Referring back to FIG. 5, it can be seen by comparing FIGS. 11D and 11E with FIGS. 27A and 27B how the encoder 317 will convert the data contained in the write register 315 from the HDT serial word format of FIGS. 11D and 11E to the HDT tape word format of FIGS. 27A and 27B in response to the inscribing pulses PW2 and PW3. It is to be noted from FIG. 3A that the inscribing pulse PW1 ordinarily connects tracks 1—4 to the shift register stages 2 through 5 of FIGS. 11A and 11B. From FIGS. 11D and 11E it can be seen that stages 2 through 5 will never contain data and thus the absence of PW1 is proper.

When an HDT tape is being received, the tape recorder steps through two characters per sequence as already described. It is desirable, however, that during the time that gaps are transmitted, the tape recorder at the receiver should step through three characters in order that gaps in the received tape have the proper length. To accomplish this, the "permit writing" signal, PW, enters AND gate 349 whose output enables the feedback paths in the character counter of FIG. 25 when PW is at the zero level, thus achieving the desired result.

The resetting of the various circuits in the dataphone interface and tape control circuits is identically the same for HDT tapes as for Regular logging tapes and need not be discussed further.

SUMMARY OF OPERATION

In discussing the operation of the data transmission equipment of the present invention, it will be assumed that every word of a Regular logging tape is to be transmitted. In this event, the selector switch 181 of FIG. 15B is placed in the "REG" position and the tape is positioned in the initial erased section at the transmitter. Meanwhile, an erased section is being created on tape having prerecorded magnetic marks at the receiver. To create this initial erased section, the start-stop switch 95 of FIG. 5A at the receiver is moved to the start position to reset the counting circuits at the receiver and set the "-motor flip-flop" 98 of FIG. 5A. With the erase switch 280 of FIG. 5A energized, the "detected character pulses" will be grounded out so as to not advance the character counter 135 of FIG. 5A and thus the tape will continue to move until the erase switch 280 is released. Since the erase switch 280 grounds the "detected character pulse" line and the read/write switch 140 supplies power to the write circuits of FIG. 6 when in the "write" position, an erased section is created.

Now back at the transmitter, referring to FIGS. 5A and 5B, the start-stop switch 95 is moved to the start position to reset the counter at the transmitter and set the "motor flip-flop" 98. Since the tape is positioned in the erased section, there will be no "detected character pulses" and thus the character counter 135 will not be advanced while the tape is moving through this erased section. the tape will continue to move until the first word of the first file is read and stored in the tape read register 63, at which time the trailing edge of the PR3+6 output pulse from character counter 135 resets the "motor flip-flop" 98. While the tape was advancing through the initial erased section, the "Gap delay circuit" 144 and "file gap delay circuit" 147 detected the presence of the erased section and caused the "detected gap one-shot" 146 and "file gap one-shot" 148 to supply pulses to the transmit control circuits indicative of this fact.

The reading operation is controlled by the character counter 135 generating three character inscribing or strobing pulses PW1, PW2 and PW3 which gate the tracks 1—6 read circuits to the proper stages of the read register 63. The character counter 135 is advanced in response to the detected magnetic marks on the tape. With the first word of the first file sitting in the tape read register 63, nothing else happens until the "transmit next file button" 165 of FIG. 12 is pushed.

Now turning to FIG. 12, the "start" signal from the "start-stop switch" 95 of FIG. 5A has already removed one of the resets from the "transmit next file flip-flop" 169. Before "-transmit next file flip-flop" 169 is set, it had been holding the transmit control circuits of FIG. 12 reset. Now when the "-transmit next file button" 165 is pushed, resets are removed from a portion of the transmit control circuits and the AND gate 171 is enabled so that the falling edge of the dibit clock transmit signal from the telephone company dataset can set the "request to send flip-flop" 268. This allows a "request to send" signal to be sent to the dataset and removes the final reset from the "transmit next file flip-flop" 169. The reason why the "request to send" signal is synchronized with the dibit clock transmit signal is that the telephone company dataset is transmitting two bits at a time and thus the initiation of transmission must be synchronized with the dibit clock rather than the serial clock.

The dataset at the transmitter then establishes bit synchronism with the dataset at the receiver and sends a "-clear to send" signal to the transmit control circuits representative of such synchronism having been established. This "-clear to send" signal allows the "synchronized clear to send flip-flop" 172 to be set which enables the AND gate 175 to pass the serial clock transmit signal from the dataset to the dataphone interface as the "transmit clock" signal. The setting of the "synchronized clear to send flip-flop" 172 also enables the AND gate 220 to transmit line sync words during transmission of the initial file gap.

Turning now to the dataphone interface circuits of FIG. 15, the "transmit clock" signal is utilized to advance the bit counter 184 of FIG. 15A and shift the X/R register 67 of FIG. 15C which during the transmission of the file gap, does not have data placed therein. After every 16th bit (one word) of the "transmit clock" signal, the bit counter 184 will cause the sequence counter 189 to be advanced, which in conjunction with the binary-to-decimal matrix 197, keeps track of the sequences and thus which word is being processed at any given time.

In the transmitting system of the present invention, word 1 of every frame is set aside for the line sync word unless a depth word is read off of the tape. To signal the transmit control circuits of FIG. 12 when a line sync word is to be transmitted, a "line sync sequence" signal from AND gate 198 of FIG. 15B is supplied to the transmit control circuits. In the transmission of every word of a Regular logging tape, this "line sync sequence" signal will be at the "1" level during word 1 of every 12 word frame.

The transmitter signals the receiver as to whether a file gap or a record gap is being transmitted by the presence or absence of a sync word in frame 3 of the transmitted gap. Since the tape was initially placed in the initial erased section, the tape control circuits had detected a file gap and both the "detected gap" and "detected file gap" signal were generated which results in the "gap detector flip-flop" 210 of FIG. 12 being placed in the reset or complementary state.

With the "gap detector flip-flop" reset, the output of NAND gate 211 will always be at the "1" level so that a line sync word will be transmitted by way of the AND gate 220 during frame 3 to tell the receiver that a file gap is being generated. The complementary output of the "gap detector flip-flop" 210 enables the AND gate 213 so as to set the "-transmit data flip-flop" 173 after the 20th frame, 20 frames comprising a file gap. With the "transmit data flip-flop" 173 set, the AND gates 214—217, 233 and 234 are now enabled to allow the transmission of the well logging data. The AND gates 214, 215, and 216 allow the timing control pulses $X_2$, $X_3$, and $X_4$, which are generated after each 16-bit word is transmitted, to produce the signals "step tape command-X-mit," "shift tape read register window," and "transfer X/R register window" respectively. The AND gate 234 produces the line sync words in response to the "line sync sequence" signal and the AND gate 233 passes the PCM data from the X/R register 67 of FIG. 15C to the transmitting dataset for transmission.

Upon the "transmit data flip-flop" 173 of FIG. 12 being set, the $X_6$ falling edge occurring at the same time causes the generation of the timing control pulses $X_2$—$X_4$. $X_2$ ("step tape command") seta the "motor flip-flop" 98 of FIG. 5A to initiate tape motion and $X_3$ ("shift tape read register window") causes the data to be shifted from the tape read register 63 of FIG. 5B to the transmit buffer register 66 of FIG. 15C. $X_4$ ("-transfer X/R register window") then parallel transfers the data word contained in the transmit buffer register 66 to the X/R register 67 by way of the parallel gates 229. The "transmit clock" then shifts the data out of the X/R register 67 to the AND gate 233 of FIG. 12 to be sent to the dataset for transmission.

Meanwhile, the tape movement is producing "detected character pulses" from the read circuits of FIG. 8 which advance the character counter 135 to produce the three character inscribing pulses PW1, PW2 and PW3. Through the action of PW1, PW2 and PW3, each character of the next word is read from the tape and placed in the proper shift register stages of the tape read register 63 for subsequent application to the dataphone interface for transmission. The tape movement is again stopped by the trailing edge of the character counter output pulse $\overline{PR3+6}$. This process continues over and over again until the contents of the file are transmitted.

To transmit depth words, the line sync word generating AND gate 234 of FIG. 12 is disabled whenever a depth word is read from the tape and the depth word is substituted for the line sync word. If a depth word is read from the tape, a "1" will be contained in one or more of the stages 14—16 of the tape read register 63. The resulting "detected depth read" signals is supplied to the dataphone interface of FIG. 15A to set the "depth display flip-flop" 237 and change the $\overline{\text{depth}}$ signal to the "0" level thus disabling the AND gate 234 from generating a sync word. Instead, the depth word which was read from the tape is transferred to the X/R register 67 (FIG. 15C) and from there to the OR gate 221 (FIG. 12) to be transmitted in the same manner as a Regular well logging data word.

Now concerning the operation of the circuits at the receiving end of the transmission link, it will be recalled that the initial erased section has already been made. Referring to the receive control circuits of FIG. 22, when the transmitter places the carrier on the telephone line, the "carrier on" signal from the dataset will be supplied to the receive control circuits of FIG. 22. This "carrier on" signal will enable the "-serial clock receive" signal from the dataset to pass by way of AND gate 283 to the X/R register 67 as the "receive clock" signal for shifting the X/R register 67. Meanwhile, the datasets at the transmitting and receiving ends of the transmission links establish synchronism with one another, after which, the receiver will begin receiving the first transmitted bits.

It will be recalled from the discussion of the transmitting operation that a file gap is transmitted first and the first word of the file gap is a line sync word. Thus, referring briefly to FIG. 15C, when the line sync word has been completely entered into the X/R register 67, a "detected line sync pulse" will be generated from the "line sync detector" 289 and utilized by the receive control circuits of FIG. 22 to enable an AND gate 286 to generate the "detected line sync pulse" (DLSP) when strobed by the "line sync strobe pulse" from one-shot 284. This "detected line sync pulse" resets various circuits in the dataphone interface and tape control circuits and also sets the "permit stepping flip-flop" 280. With the "-permit stepping flip-flop" 280 set, the "gated receive clock" passes via the AND gate 290 to the bit counter 184 of FIG. 15A. Thus, the bit counter will begin advancing only after the first line sync word has been received. Additionally, the "permit stepping flip-flop" enables the AND gate 292 to pass $X_2$ as the "step tape command" so that the tape can move to make the file gap.

The receive control circuits determine whether the transmitted gap is a record gap or file gap by looking at word 1 of frame 3 to determine if a line sync word has been transmitted. The AND gate 294 is enabled during frame 3 to reset the "record gap flip-flop" 281 if a file gap is being transmitted. If a record gap is being transmitted, flip-flop 281 will remain set. Since this initial gap is a file gap, the 20th frame signal from the frame counter matrix 197 of FIG. 15B will set the "permit writing flip-flop" 293 for generating the "permit writing" signal. Thus, the "permit writing" signal will go to the "1" level simultaneously with the beginning of transmission of the first data file to enable the generation of the "permit writing pulses" (PWP) from AND gate 142 to write the received data on tape.

Simultaneously with the "permit writing" signal going to "1," the data word which had been entered into the X/R register 67 is gated to the receive buffer register 81 by the timing control pulse $X_2$ via the parallel gates 304 of FIG. 15C. The data word is then shifted out of the receive buffer register 81 of FIG. 15C to the tape write register 82 of the tape control circuits of FIG. 5B by way of the AND gate 310 and mode selector switch 70*a* (FIG. 15C) in response to the timing control pulse $X_3$. Meanwhile, the timing control pulse $X_2$ had initiated tape motion by causing the generation of the "step tape command-receive" signal from OR gate 291 of FIG. 22. With the tape moving, the resulting "detected character pulses" from the read circuits of FIG. 8 advance the character counter 135 of FIG. 5A to produce the three character inscribing pulses PW1, PW2 and PW3. These inscribing pulses cause the word contained in the tape write register 82 to be written on tape.

Whenever a line sync word is received, which occurs during sequence 1 of every frame (except when a depth word is transmitted) for Regular logging tapes, the "line sync detector" 289 supplies the "detected line sync pulse" to the receive control circuits 195 and inhibits the parallel transfer of the received sync word from X/R register 67 to the receive buffer register 81 by disabling the AND gate 305. The "detected line sync pulse" is then utilized to reset various circuits in the dataphone interface and tape control circuits of FIGS. 5 and 15. If a depth word is received during sequence 1, the output of the "line sync detector" 289 will remain at "0" level and the depth word is transferred like any well logging data word.

This process continues over and over again with each word being entered into the X/R register and the bit counter 184 (FIG. 15A) output $X_0$ causing the generation of the timing control pulses $X_2$, $X_3$, and $X_4$. Thus, after each word is entered into the X/R register 67, it is shifted to the tape write register 82 to be written on tape.

Turning now to FIG. 22, when the transmission is stopped at the end of a file, the "carrier on" signal will go to "0," thus disabling the AND gate 283 from passing the "receive clock" signal to the X/R register and resetting the "permit stepping flip-flop" 280. With the "permit stepping flip-flop" 280 reset, the AND gates 290 and 292 are disabled to prevent the "gated receive clock" from being applied to the bit counter 184 of FIG. 15A and the "step tape command" from setting the "motor flip-flop" 98 of FIG. 5A. The $\overline{\text{"carrier on"}}$ signal also sets the record gap flip-flop to place it in the proper state to detect whether a file or record gap is transmitted when the transmission starts again.

During both the transmission and reception of data, the logging data for one channel, i.e., one word, can be displayed by the data display circuits in FIG. 19. To this end, the data display selector switch 244 selects one sequence and thus one word for the data display by enabling an AND gate 245 to pass the timing control pulse $X_2$ to the data display circuits as a window. This window enables the data display circuits to receive the PCM data being shifted out of the tape read register 63 in the transmit mode or out of the receive buffer register 81 in the receive mode.

The display circuits of FIG. 19 are also adapted to display depth words. A depth word is recorded on the tape every 10-feet as word 1 and is identified by a 1 in either the 14th, 15th or 16th shift register stages. Thus, during the transmit mode, the 14th, 15th and 16th stages of the tape read register 63 of FIG. 5B are interrogated by OR gate 157 which supplies a "-detected depth read" signal to the dataphone interface of FIG. 15A for setting the "depth display flip-flop" 237 during sequence 1. The "depth display flip-flop" 237 then supplies a "command shift depth display" signal to the depth and data display circuits of FIG. 19 via the mode selector switch 70E to enable the data being read out of the tape read register to be entered into the depth display circuits. During the receive mode, on the other hand, the 14th, 15th and 16th stages of the receive buffer register are interrogated by an OR gate 306 to set the depth command flip-flop 308 which produces the "-command shift depth display" signal by way of the receive position of the mode selector 70E to enable the data to be entered into the depth display circuits.

The data being transmitted or received can be recorded on film by the playback circuits of FIG. 20. To this end, a playback window is generated during the timing interval $X_3$ by way of the AND gate 261 to cause the data to be shifted into the entry register 265 of FIG. 20. The digital data word contained in the entry register 265 is then converted to an analog signal and supplied to the proper storage condensers 270 through the action of the parallel decommutator gates 271. The proper decommutator gate is selected through the action of the sequence signals from the sequence counter matrix 194 of FIG. 15B energizing the proper decommutator gate. The playback circuits of FIG. 20 will cause a zero voltage to be placed on the particular capacitor 270 if the sign bit stage indicates a negative quantity by resetting the data in the entry register 265 by way of the AND gate 266. In the receive mode of operation, the "even line parity receive flip-flop" 262 of FIG. 15 will inhibit the playback window from being generated if the parity of the received data word is wrong. In this event, the playback circuits will effectively use the last received data word for that particular channel since new data will not be entered into the entry register 265 of FIG. 20, i.e., the capacitor 270 for that channel will not be updated.

The transmission apparatus of the present invention also has the capability of playing back a tape to make a film recording and/or display the depth and data words. To accomplish this playback, either an internal oscillator circuit contained within the transmission equipment can be utilized for advancing the tape or advancement of the tape can be synchronized to the movement of the film recorder drive. Taking first the internal oscillator mode, the internal oscillator one-shot 240 of FIG. 5 is responsive to the third and last character inscribing pulse PW3 for generating a pulse which is substituted for the output $X_0$ of the bit counter 184. This internal oscillator pulse causes the generation of the timing control pulses $X_1$, $X_2$, $X_3$ and $X_4$ for advancing the tape and transferring the data in the same manner as when the system was operating in the transmit mode.

When the movement of the magnetic tape is synchronized to the recorder film drive, i.e., the RDP position of the mode selector switches 70A—70G, the recorder drive pulse generating circuits 87 of FIG. 1 will generate depth pulses in response to the rotation of the optical slotted drum 86 of FIG. 1. These depth pulses are then substituted for the output signal $X_0$ from the bit counter 184 to again generate the timing control pulses $X_1$—$X_{4a}$. The tape is then moved and the data shifted between subsystems in the same manner as in the internal oscillator mode. Since the well logging data written on the tape is evenly distributed along the tape as a function of borehole depth and the magnetic tape movement is synchronized with the film movement, the analog well logging signals will be recorded on the photographic film as a function of borehole depth.

The transmission equipment of the present invention also has the capability of transmitting, receiving and playing back dipmeter tapes derived from the so-called "continuous dipmeter tool" and "high resolution dipmeter tool." The various features of the so-called CDM tool are described in U.S. Pat. No. 2,427,950 and 2,746,162. The various features of a high resolution dipmeter type of tool are described in copending application Ser. No. 219,619, filed Aug. 27, 1962 in the name of A. Vezin. First concerning the CDM tapes, with the selector switch 181 in the CDM position, the operation will be substantially the same as when the selector switch is in the regular logging position. However, the CDM tapes have sync marks recorded every odd frame instead of every frame. Thus, an even frame flip-flop 195 causes the "tape sync sequence" signal to be generated in the dataphone interface circuits only during every odd frame. This is accomplished through the operation of the OR gate 314 which produces a "1" output only during odd frames as indicated by the "even frame flip-flop" 195. In the tape control circuits of FIG. 5, this "tape sync sequence" signal enables the AND gate 326 to place the sync marks in tracks 5 and 6 only during odd frames in the CDM mode.

Now concerning the operation of the equipment in the HDT mode, the dataphone interface circuits of FIG. 15 operate in the same manner as in the Regular logging mode. However, the transmitted HDT tape utilizes a two character per word format instead of three. Thus, the character counter 135 of FIG. 5 is responsive to the HDT signal from the dataphone interface to alter its operation so that the data is read from and written on magnetic tape in accordance with this HDT format.

The transmission circuits of the present invention also have the capability of transmitting every odd word of a tape, instead of every word, to substantially speed up the transmission of the tape. Thus, with the selector switch 181 in the "odd word" position, the character counter 135 of FIG. 5 is responsive to the "odd word" signal from the dataphone interface to cause the tape to step through six characters before stopping while only reading or writing during the first three characters. Since word 12 is utilized as the tape sync word in all tapes, the sync strobing pulse PW3+6 is generated in response to the sixth "-detected character pulse" so that work 12 will be the sync word on the tape recreated at the receiver.

The reset signals for Regular logging, CDM, and HDT tapes as well as "odd word" transmission differ from one another because of the different formats used.

We claim:

1. In apparatus for transmitting data derived from a magnetic tape having data recorded in side-by-side positions thereon, the combination comprising:

a. a transmitter for transmitting data to a remote location at a given bit rate and producing a clock signal representative of the transmission bit rate;
b. means for counting the cycles of said clock signal and repetitively generating a control signal each time after a selected number of cycles have been counted.
c. a magnetic tape having data recorded thereon;
d. means for repetitively initiating movement of said tape in response to each control signal;
e. a buffer memory;
f. means for reading the data on the tape as it moves and storing said read data in said buffer memory in a manner to produce a transmission word suitable for transmission by said transmitter for each tape movement initiated by each control sign.
f. means for terminating movement of said tape after data from a predetermined number of said side-by-side positions has been read; and
g. means responsive to said clock signal for shifting said data to said transmitter at a rate dependent on said transmission bit rate for transmission to a remote location.

2. In apparatus for receiving data transmitted over a transmission link between remote locations and recording the data on a magnetic tape having magnetic marks recorded along a length thereof, the combination comprising:

a. means for receiving the data from the transmission link at a given bit rate;
b. means for counting the received bits and initiating the movement of the tape after a given number of bits have been received;
c. means for detecting the magnetic marks recorded on the tape as the tape moves; and
d. means responsive to the detected magnetic marks for writing the received data in increments along the magnetic tape and stopping the movement of the tape after a predetermined number of magnetic marks have been detected.

3. In apparatus for transmitting data derived from a magnetic tape having data gaps recorded thereon between remote locations, the combination comprising:

a. means for moving the tape;
b. means for detecting the presence of a data gap including means for detecting the relative length of the gap as the tape moves and generating at least one signal representative thereof;
c. transmitter means adapted for transmitting data to a remote location;
d. means for periodically generating a synchronization word and transferring said synchronization word to said transmitter means for transmission to the remote location; and
e. means responsive to said at last one signal representative of a data gap and adapted to inhibit the generation of a selected synchronization word in dependence on the detected length of said gap to thereby inform the remote location of the length of the data gap.

4. In apparatus for receiving data words, having a parity bit, transmitted over a transmission link between remote locations and recording the data at the receiving end of the transmission link, the combination comprising:

a. means for receiving the data from the transmission link at a given bit rate;
b. means adapted for recording each received data word;
c. means for examining each received data word for parity and generating a parity error signal if parity is incorrect; and
d. means responsive to the parity error signal for inhibiting the recording of the received data word whose parity was incorrect and substituting the information content of another selected data word whose parity is correct in place of the received data word whose parity was incorrect.

5. In apparatus for transmitting well logging data derived from a magnetic tape having well logging data words and borehole depth words recorded thereon between remote locations over a transmission link, the combination comprising:

a. means for repetitively initiating the movement of the tape;
b. means for reading the data off of the tape as it moves;
c. means for shifting the data read from the tape to the transmission link at a given bit rate for transmission to the receiving end of the transmission link;
d. means for periodically shifting a synchronization word, in exclusion of a data word, to the transmission link for transmission to the remote location, said synchronization word adapted to synchronize the transmitting and receiving ends of the transmission link with each other;
e. means for periodically interrogating the data read from the tape to determine the presence of a depth word; and
f. means for substituting a detected depth word for a synchronization word if a depth word is detected for transmission to the remote location.

6. In apparatus for receiving data transmitted over a transmission link between remote locations and recording the data on a magnetic tape wherein synchronization words are periodically transmitted, the combination comprising:

a. means for receiving the data from the transmission link at a given bit rate;
b. means for interrogating the received data for the presence of a coding pattern which signifies a synchronization word;
c. means adapted for moving the magnetic tape;
d. writing means adapted for writing the received data on the magnetic tape as the tape moves; and
e. means responsive to a selected one of the synchronization words for disabling the writing means from writing data on the tape until a selected cumulative number of bits have been received, including means for counting said received bits to enable the writing means to write data on the tape upon the selected number of bits being received.

7. In apparatus for receiving data including well logging data words and depth words transmitted over a transmission link between remote locations and recording the data on a magnetic tape, the combination comprising:

a. means for receiving the data from the transmission link at a given bit rate;
b. means for periodically generating a plurality of control pulses after a selected number of bits have been received;
c. sequencing means responsive to a periodically recurring one of said control pulses for generating sequence signals representative of which words are being received and recorded;
d. means responsive to another periodically recurring one of said control pulses for moving the magnetic tape;
e. means for writing the well logging data words and the depth words on tape, the tape format for a well logging data word differing from the tape format for a depth word; and
f. means responsive to the sequence signals for changing the writing format of the data written on tape in accordance with whether a well logging dataword or depth word is being recorded.

8. In apparatus for transmitting data read from a magnetic tape having magnetic marks recorded along a length thereof from a transmitting location to a receiving location and writing the data on magnetic tape having magnetic marks recorded along a length thereof, the combination comprising:

a. means at the transmitting location for moving the tape;
b. means at the transmitting location for detecting the magnetic marks as the tape moves;
c. means at the transmitting location responsive to the detected magnetic marks for reading the data on the tape;
d. means at the transmitting location for supplying the data to the transmission link for transmission to the remote location;
e. means at the receiving location for receiving and storing the transmitted data;
f. means at the receiving location location moving the magnetic tape;
g. means at the receiving location for detecting the magnetic marks as the tape moves; and
h. means at the receiving location responsive to the detected magnetic marks for writing the stored data at incremental positions along the length of the magnetic tape as determined by the prerecorded magnetic marks located thereon.

9. A method of transmitting data derived from a magnetic tape having data recorded in side-by-side positions thereon between remote locations over a transmission link, comprising:

a. moving the tape;
b. reading the data off of the tape as the tape moves;
c. terminating movement of the tape after data from a predetermined number of the side-by-side positions has been read; and
d. transferring the data read from said predetermined number of side-by-side positions on the tape to the transmission link at a given bit rate for transmission to the remote location; and thereafter initiating movement of the tape after data from said predetermined number of side-by-side positions has been substantially transferred and repetitively repeating the steps of initiating tape movement, reading data, and terminating tape movement until a selected portion of the data on the tape is transmitted.

10. A method of receiving data transmitted over a transmission link between remote locations and recording the data on a magnetic tape having magnetic marks recorded along a length thereof, comprising:

a. receiving the data from the transmission link at a given bit rate;
b. counting the received bits and initiating the movement of the tape after a given number of bits have been received;
c. detecting the magnetic marks recorded on the tape as the tape moves; and d. writing the received data in increments along the magnetic tape in response to the detected magnetic marks and stopping the movement of the tape after a predetermined number of magnetic marks have been detected.

11. A method of transmitting data derived from a magnetic tape having data gaps recorded thereon between remote locations, comprising:
a. moving the tape;
b. detecting the presence of a data gap and the relative length of the gap as the tape moves and generating at least one signal representative thereof;
c. periodically generating a synchronization word and transferring said synchronization word to a transmission link at a given bit rate for transmission to the remote location; and
d. inhibiting the generation of a selected synchronization word in response to said at least one signal representative of the detection of a data gap to inform the remote location of the length of the data gap.

12. A method of receiving data words, having a parity bit, transmitted over a transmission link between remote locations and recording the data at the receiving end of the transmission link, comprising:
a. receiving the data from the transmission link at a given bit rate;
b. recording each received data word;
c. examining each received data word for parity and generating a parity error signal if parity is incorrect; and
d. inhibiting the recording of the received data word whose parity was incorrect in response to the parity error signal and substituting the information content of another selected data word whose parity is correct in place of the received data word whose parity was incorrect.

13. A method of transmitting well logging data derived from a magnetic tape having well logging data words and borehole depth words recorded thereon between remote locations, comprising:
a. periodically initiating the movement of the tape;
b. reading the data off of the tape as the tape moves;
c. transferring the data read from the tape to a transmission link for transmission to the remote location;
d. periodically shifting a synchronization word, in exclusion of a data work, to the transmission link for transmission to the remote location, said synchronization word adapted to synchronize the transmitting and receiving ends of the transmission link with each other; and
e. periodically interrogating the data read from the tape to determine the presence of a depth word and substituting a detected depth word for a synchronization word for transmission to the remote location.

14. A method of receiving data transmitted over a transmission link between remote locations and recording the data on a magnetic tape and wherein synchronization words are periodically transmitted, comprising:
a. receiving the data from the transmission link at a given bit rate;
b. interrogating the data for the presence of a synchronization word;
c. moving the magnetic tape;
d. writing the received data on the magnetic tape;
e. counting the received bits; and
f. disabling the writing of data on the tape until a selected cumulative number of bits have been received in response to a selected one of the synchronization words.

15. A method of transmitting data read from a magnetic tape having magnetic marks recorded along a length thereof from a transmitting location to a receiving location and writing the data on magnetic tape having magnetic marks recorded along a length thereof at the receiving location, comprising:
a. moving the tape at the transmitting location;
b. detecting the magnetic marks as the tape moves at the transmitting location;
c. reading the data from the tape in response to the detected magnetic marks at the transmitting location;
d. supplying the data to the transmission link at a given bit rate for transmission to the receiving location;
e. receiving the transmitted data at the receiving location;
f. moving the magnetic tape at the receiving location;
g. detecting the magnetic marks as the tape moves; and
h. writing the data at incremental positions along the length of the magnetic tape at the receiving location in response to the detected magnetic marks.

16. In apparatus for transmitting data derived from a magnetic tape wherein each data word is recorded in a given number of side-by-side character positions thereon, the combination comprising:
a. a transmitter for transmitting data to a remote location at a given bit rate and producing a clock signal representative of the transmission bit rate;
b. said magnetic tape having data recorded thereon;
c. means responsive to a given number of cycles of said clock signal for initiating movement of the tape;
d. a buffer memory;
e. means for reading the data bits for each character on the tape as it moves and storing said read data bits for each character in selected positions of said buffer memory in a manner to produce transmission words suitable for transmission by said transmitter;
f. means for terminating movement of said tape after a predetermined number of said side-by-side characters have been read;
g. means responsive to said clock signal for shifting said stored data in said buffer memory to said transmitter at a rate dependent on said transmission bit rate for transmission to a remote location.

17. In apparatus for transmitting data derived from a magnetic tape having data words recorded in side-by-side character positions thereon, the combination comprising:
a. a transmitter for transmitting data to a remote location at a given bit rate and producing a clock signal representative of the transmission bit rate;
b. control means responsive to said clock signal for producing control signals;
c. means responsive to at least one of said control signals for initiating movement of said tape;
d. a buffer memory;
e. means responsive to at least a portion of said control signals for reading the data on the tape as it moves and storing said read data in said buffer memory in a manner to produce transmission words suitable for transmission by said transmitter;
f. means responsive to at least one of said control signals for terminating movement of said tape after data from a predetermined number of said side-by-side character positions has been read;
g. means responsive to at least one of said control signals for shifting said data to said transmitter at a rate dependent on said transmission bit rate for transmission to a remote location.

18. In apparatus for transmitting data derived from a magnetic tape having data words recorded in side-by-side character positions thereon, the combination comprising:
a. a transmitter for transmitting each data word to a remote location at a given bit rate and producing a clock signal representative of the transmission bit rate;
b. means responsive to a given number of cycles of said clock signal which correspond to the number of bits to be transmitted for each data word for initiating movement of the tape;
c. means responsive to the data on said tape as it moves for producing a tape read signal for each one of said side-by-side character positions;
d. means for counting said tape read signals to produce control signals representative of which characters of each data word are being read at any given time;
e. a buffer memory;
f. means responsive to certain ones of said control signals for reading the data on the tape as it moves and storing said read data in said buffer memory in a manner to produce transmission words suitable for transmission by said transmitter;

g. means responsive to at least one of said control signals for terminating movement of said tape after data from a predetermined number of said side-by-side positions corresponding to one data word has been read;

h. means responsive to said clock signal for shifting said stored data word to said transmitter at a rate dependent on said transmission bit rate for transmission to a remote location.

19. In apparatus for receiving data transmitted over a transmission link and writing the received data on a magnetic tape having magnetic marks prerecorded thereon, the combination comprising:

a. a receiver for receiving data from a remote location at a given bit rate and producing a clock signal representative of the transmission bit rate;

b. means responsive to a given number of cycles of said clock signal for initiating movement of the tape;

c. a buffer memory;

d. means responsive to said clock signal for shifting the received data to the buffer memory at said given bit rate;

e. means for detecting the prerecorded magnetic marks on the tape as the tape moves;

f. means responsive to said detected magnetic marks for writing said data word contained in said buffer memory on tape in side-by-side positions while said tape moves, and means for terminating movement of said tape after writing data in a predetermined number of side-by-side positions on said tape.

20. The apparatus of claim 2 and further including buffer storage means for storing a selected portion of said received data; and wherein said means for writing the received data in increments along the tape includes means for counting said detected magnetic marks and generating control signals representative of the number of detected marks since tape movement was initiated, means responsive to certain ones of said control signals for writing data in increments along said tape and stopping tape movement after data has been written in a predetermined number of side-by-side positions on said tape.

21. The apparatus of claim 3 wherein said means for detecting the presence and length of a gap includes tape reader means for detecting magnetic marks on the tape and producing tape read signals representative thereof, first timing means responsive to the absence of said tape read signals for a first time period for generating a first gap signal, second timing means responsive to the absence of said tape read signal for a second period of time for generating a second gap signal; and wherein said means adapted to inhibit generation of a synchronization word includes means responsive to only one of said gap signals for inhibiting generation of a selected synchronization word, the generation of the other gap signal allowing said selected synchronization word to be generated.

22. In apparatus for receiving data words, having a parity bit, transmitted over a transmission link between remote locations and recording the data at the receiving end of the transmission link, the combination comprising:

a. receiving means for receiving the data from the transmission link at a given bit rate;

b. means for examining each received data word for parity and generating a parity error signal if parity is incorrect;

c. a first buffer storage means;

d. means for transferring selected data words from said receiving means to said first buffer storage means;

e. recording means adapted for recording representations of said received data words;

f. a second buffer storage means;

g. means for gating data representations from said first buffer storage means to said second buffer storage means;

h. means responsive to the parity error signal for inhibiting said gating means from gating representations of said data word whose parity was incorrect so that the information content of the data word representation previously in said second buffer storage means will be substituted in place of the received data word whose parity was incorrect.

23. The apparatus of claim 22 wherein said second buffer storage means comprises a capacitor and said data word representations stored therein are voltages representative of the received data words.

24. The method of claim 13 and further including the steps of receiving the transmitted data at the remote location, generating control signals at the remote receiving location with a control means which control signals are representative of the identity of each received data word, interrogating the received data for the presence of a synchronization word and using any detected synchronization words to reset said control means to a proper state, further interrogating said data words for the presence of a depth word and producing depth signals representative thereof, and numerically displaying each depth word in response to said depth signals.

25. The method of claim 11 and further including the steps of receiving the data at the remote location, interrogating the received data for the presence of said selected synchronization word.

26. In apparatus for receiving data including well logging data words, depth words and synchronization words transmitted over a transmission link between remote locations, the combination comprising:

a. a buffer memory;

b. means for receiving the data from the transmission link at a given bit rate and entering a given number of bits into said buffer memory;

c. means for periodically generating a plurality of control pulses each time after a selected number of bits have been received;

d. sequencing means responsive to a periodically recurring one of said control pulses for generating sequence signals representative of which words are being received at any given time;

e. means responsive to one of said control pulses for interrogating the contents of said buffer memory for a coding pattern which signifies the presence of a synchronization word, and generating a synchronization signal whenever such a coding pattern is detected;

f. means for resetting said sequencing means to a predetermined state in response to said control signal; and g. means responsive to the sequence signal generated during the time period when a synchronization word is expected for interrogating a predetermined portion of the contents of said buffer memory for the presence of a coding pattern which signifies a depth word and generating a depth indication signal to indicate the reception of such a depth word.

27. The apparatus of claim 26 and further including numerical display means, means responsive to said depth indication signal for transferring the contents of said buffer memory to said display means to thereby give a numerical indication of said depth words.

28. In apparatus for receiving data including well logging data words, and synchronization words transmitted over a transmission link between remote locations, apparatus for producing a data gap on magnetic tape at the receiving end of the transmission link in response to the presence or absence of a synchronization word in a predetermined frame of data where a predetermined number of words makes up one frame of data, comprising:

a. a buffer memory;

b. means for receiving the data from the transmission link at a given bit rate and entering a given number of bits into said buffer memory;

c. means for periodically generating a plurality of control pulses each time after a selected number of bits have been received;

d. sequencing means responsive to a periodically recurring one of said control pulses for generating sequence signals representative of which words are being received at any given time;

e. frame indicating means for counting said sequence signals and producing frame signals indicative of which frame of data is being received at any given time;

f. means responsive to one of said control pulses for interrogating the contents of said buffer memory for a coding pattern which signifies the presence of a synchronization word and generating a synchronization signal whenever such a coding pattern is detected;

g. means for resetting said sequencing means to a predetermined state in response to said control signal;

h. means responsive to the sequence signal generated during the time period when a synchronization word is expected and the frame signal generated during said predetermined frame for producing a signal representative of the length of the data gap;

i. writing means adapted for writing data on magnetic tape;

j. transfer means for repetitively transferring data from said buffer memory to said writing means;

k. inhibiting means for inhibiting said transfer means from transferring said data from the initiation of a transmission and reception of a selected file of data until a permit writing signal is applied to said inhibiting means; and l. means responsive to said gap signal for selecting one of said frame signals for use in producing said permit writing signal whereby a data gap of a given length can be produced on the magnetic tape.

29. In apparatus for transmitting well logging data words and depth words derived from a magnetic tape having plural channel data words recorded in side-by-side positions thereon, the combination comprising:

a. a transmitter for transmitting data to a remote location at a given bit rate and producing a clock signal representative of the transmission bit rate;

b. a buffer memory;

c. means for moving the tape;

d. means for reading the data on the tape as it moves and storing said read data in said buffer memory in a manner to produce transmission words suitable for transmission by said transmitter;

e. means for counting the cycles of said clock signal and generating sequence signals representative of which word is being read at any given time;

f. means responsive to said clock signal for shifting said stored data to said transmitter at a rate dependent on said transmission bit rate for transmission to a remote location;

g. means responsive to a periodically recurring one of said sequence signals for interrogating the contents of said buffer memory for the presence of a coding pattern which signifies a depth word and generating a depth word detection signal representative thereof;

h. means responsive to said one periodically receiving sequence signal for supplying a synchronization word having a given coding pattern to said transmitter in exclusion of data stored in said buffer memory; and i. means responsive to said depth word detection signal for inhibiting the transference of said synchronization word to said transmitter and instead transferring said depth word from said buffer memory to said transmitter.

30. Apparatus for reading data from a magnetic tape, comprising:

a. means for moving said magnetic tape;

b. a plurality of sensing means located in a line across said tape for sensing magnetic indications on said tape as it moves and producing a read pulse in response to each sensed indication;

c. means responsive to the first generated read pulse for producing a delayed pulse; and d. means responsive to said delayed pulse for inhibiting substantially all of said sensing means from detecting other magnetic indications on said tape in a time period proximate to said first magnetic indication detection.

31. In apparatus for transmitting data derived from a magnetic tape having data recorded in side-by-side positions thereon with a transmitter for transmitting data to a remote location at a given bit rate and producing a clock signal representative of the transmission bit rate, the combination comprising:

a. means responsive to a given number of cycles of said clock signal for initiating movement of the tape;

b. a buffer memory;

c. means for reading the data on the tape as it moves and storing said read data in said buffer memory in a manner to produce a transmission word for each movement of said tape suitable for transmission by said transmitter;

d. means for counting the number of said side-by-side positions and terminating movement of said tape after data from a predetermined number of said side-by-side positions has been ready and counted; and e. means responsive to said clock signal for shifting said data to said transmitter at a rate dependent on said transmission bit rate for transmission to a remote location.